(12) United States Patent
Kwak et al.

(10) Patent No.: US 12,368,558 B2
(45) Date of Patent: Jul. 22, 2025

(54) DYNAMIC DEMODULATION SIGNAL RESOURCE ALLOCATION

(71) Applicant: InterDigital Patent Holdings, Inc., Wilmington, DE (US)

(72) Inventors: Young Woo Kwak, Woodbury, NY (US); Moon-il Lee, Melville, NY (US); Paul Marinier, Brossard (CA); Ghyslain Pelletier, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 291 days.

(21) Appl. No.: 17/908,565

(22) PCT Filed: Mar. 5, 2021

(86) PCT No.: PCT/US2021/021068
§ 371 (c)(1),
(2) Date: Sep. 1, 2022

(87) PCT Pub. No.: WO2021/178788
PCT Pub. Date: Sep. 10, 2021

(65) Prior Publication Data
US 2023/0396385 A1    Dec. 7, 2023

Related U.S. Application Data

(60) Provisional application No. 63/134,859, filed on Jan. 7, 2021, provisional application No. 62/985,994, filed on Mar. 6, 2020.

(51) Int. Cl.
*H04L 5/00* (2006.01)
*H04W 72/232* (2023.01)

(52) U.S. Cl.
CPC .......... *H04L 5/0051* (2013.01); *H04L 5/0053* (2013.01); *H04L 5/0094* (2013.01); *H04W 72/232* (2023.01)

(58) Field of Classification Search
None
See application file for complete search history.

(56) References Cited

U.S. PATENT DOCUMENTS

2018/0368116 A1    12/2018  Liao et al.
2019/0199477 A1*   6/2019   Park .......................... H04L 5/00
(Continued)

FOREIGN PATENT DOCUMENTS

CN         110535616 A        12/2019

OTHER PUBLICATIONS

3rd Generation Partnership Project; Technical Specification Group Radio Access Network;Study on New Radio access technology; 60 GHz unlicensed spectrum (Release 14); 3GPP TR 38.805 V14.0.0 (Mar. 2017); 17 pages.

(Continued)

*Primary Examiner* — Jamaal Henson
(74) *Attorney, Agent, or Firm* — Jamie T. Nguyen

(57) ABSTRACT

Systems, apparatus and methods are described for dynamic demodulation signal resource allocation. PDSCH/PUSCH DMRS enhancement is provided. A dynamic indication of reference signal functionality may be provided in a slot for an additional DM-RS. A configured CSI-RS/SRS may be dynamically indicated to use as an additional DM-RS in a slot. Frequency shift/hopping of DM-RS as a function of OFDM symbol and/or the order of OFDM symbol containing DM-RS may increase frequency density within a slot. DM-RS antenna port aggregation may increase DM-RS frequency density. One or more DM-RS antenna ports may be used to demodulate the same layer. PDCCH DMRS enhancement is provided. Frequency shift/hopping of PDCCH DMRS may be provided as a function of a REG index within an REG bundle, OFDM symbol index, etc. Use of multiple types of REG (e.g., low and high DM-RS) and (Continued)

REG type may be determined based on subcarrier spacing, operating frequency band, etc.

19 Claims, 56 Drawing Sheets

(56) References Cited

U.S. PATENT DOCUMENTS

| | | | |
|---|---|---|---|
| 2020/0021419 A1* | 1/2020 | Taherzadeh Boroujeni | H04L 5/0091 |
| 2020/0045708 A1 | 2/2020 | Hwang et al. | |
| 2020/0119874 A1* | 4/2020 | Liu | H04W 72/23 |

OTHER PUBLICATIONS

3rd Generation Partnership Project; Technical Specification Group Radio Access Network; NR; Medium Access Control (MAC) protocol specification (Release 15); 3GPP TS 38.321 V15.1.0, Mar. 2018, 67 pages.

3rd Generation Partnership Project; Technical Specification Group Radio Access Network; NR; Physical layer procedures for control (Release 15), 3GPP TS 38.213 V15.3.0, Sep. 2018, 101 pages.

3rd Generation Partnership Project; Technical Specification Group Radio Access Network; Study on requirements for NR beyond 52.6 GHZ (Release 16); 3GPP TR 38.807 V16.0.0 (Dec. 2019), 68 pages.

Third Generation Partnership Project, "Technical Specification Group Radio Access Network; Study on Scenarios and Requirements for Next Generation Access Technologies; (Release 16)," 3GPP TR 38.913 V16.0.0 (Jul. 2020).

3rd Generation Partnership Project; Technical Specification Group Radio Access Network; NR; Radio Resource Control (RRC) protocol specification (Release 15); 3GPP TS 38.331 V15.4.0 (Dec. 2018); 142 pages.

"New SID: Study on NR beyond 52.6GHz", 3GPP Tdoc RP-181435, 3GPP TSG RAN Meeting #80, La Jolla, USA, Jun. 11-14, 2018, 4 pages.

English language translation of CN110535616A, 28 pages.

"New WID on Extending current NR operation to 71 GHz", 3GPP Tdoc RP-193229, 3GPP TSG RAN Meeting #86, Sitges, Spain, Dec. 9-12, 2019, 5 pages.

"New SID: Study on supporting NR from 52.6GHz to 71 GHz", 3GPP Tdoc RP-193259, 3GPP TSG RAN Meeting #86, Sitges, Spain, Dec. 9-12, 2019, 3 pages.

* cited by examiner

```
-- ASN1START
-- TAG-NZP-CSI-RS-RESOURCESET-START
NZP-CSI-RS-ResourceSet ::=          SEQUENCE {
    nzp-CSI-RS-ResourceSetId            NZP-CSI-RS-ResourceSetId,
    nzp-CSI-RS-Resources                SEQUENCE (SIZE (1..maxNrofNZP-CSI-RS-ResourcesPerSet)) OF
                                            NZP-CSI-RS-ResourceId,
    repetition                          ENUMERATED { on, off }              OPTIONAL,   -- Need S
    aperiodicTriggeringOffset           INTEGER(0..6)                       OPTIONAL,   -- Need S
    trs-Info                            ENUMERATED {true}                   OPTIONAL,   -- Need R
    additionalDMRS-Info                 ENUMERATED {true}                   OPTIONAL,   -- Need R
    ...
}
-- TAG-NZP-CSI-RS-RESOURCESET-STOP
-- ASN1STOP
```

FIG. 12

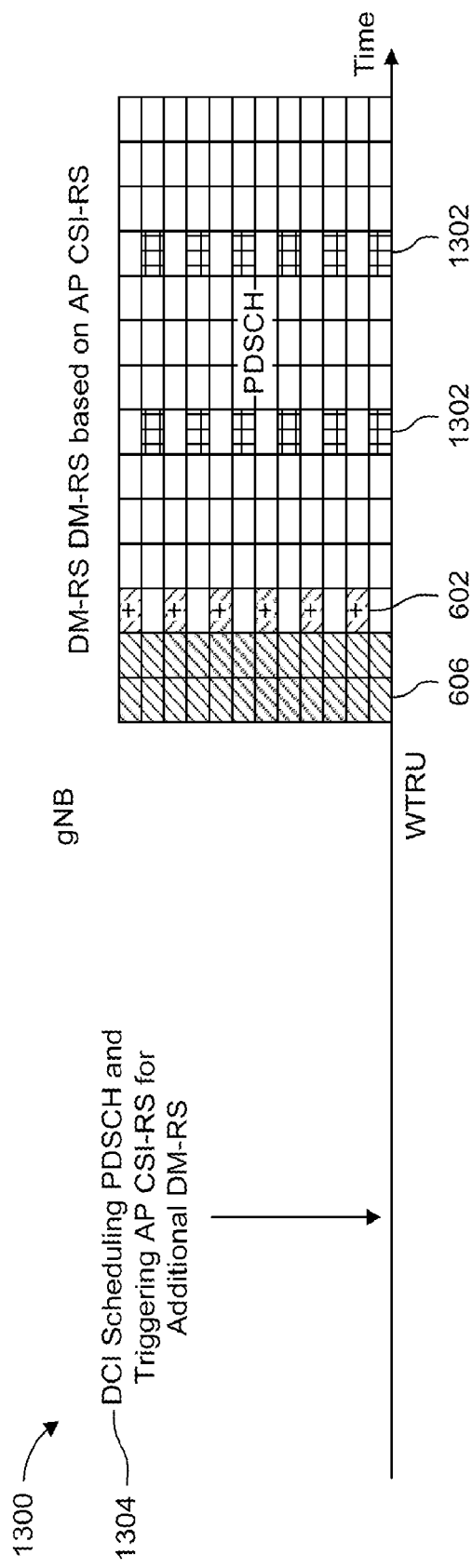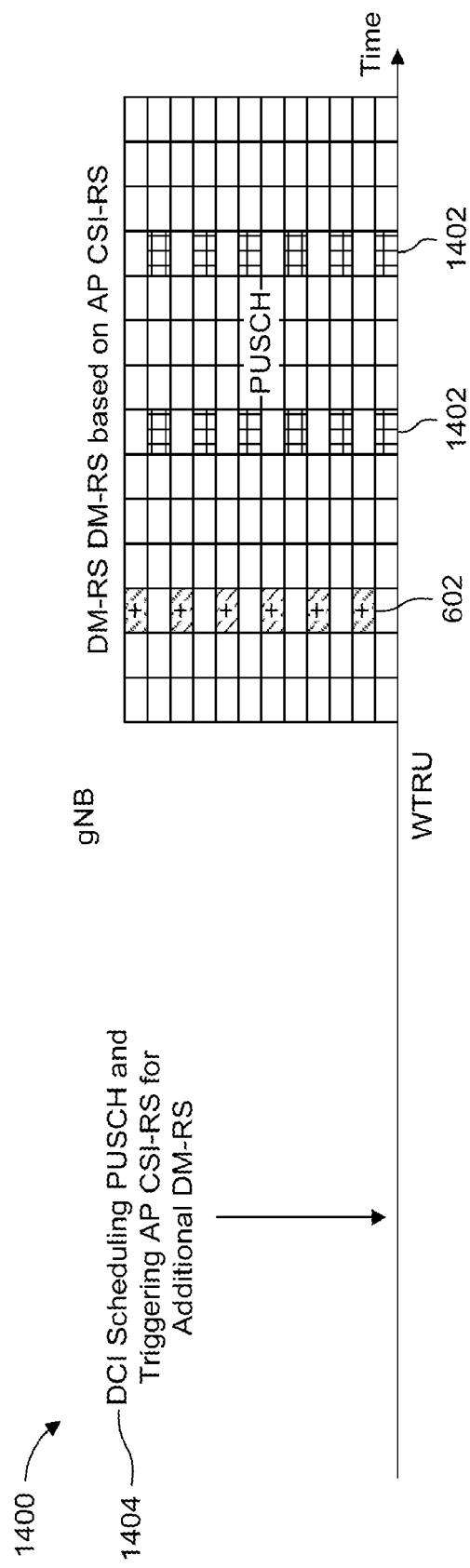

```
-- ASN1START
-- TAG-CSI-REPORTCONFIG-START

CSI-ReportConfig ::=        SEQUENCE {
    ...
    reportQuantity              CHOICE {
        none                        NULL,
        cri-RI-PMI-CQI              NULL,
        cri-RI-i1                   NULL,
        cri-RI-i1-CQI               SEQUENCE {
            pdsch-BundleSizeForCSI      ENUMERATED {n2, n4}
        OPTIONAL    -- Need S
        },
        cri-RI-CQI                  NULL,
        cri-RSRP                    NULL,
        ssb-Index-RSRP              NULL,
        cri-RI-LI-PMI-CQI           NULL
    },
    ...
}
```

FIG. 16

```
SRS-ResourceSet ::=         SEQUENCE {
    ...
    usage                       ENUMERATED {beamManagement, codebook,
                                nonCodebook, antennaSwitching, additionalDM-RS},
    ...
}
```

FIG. 17

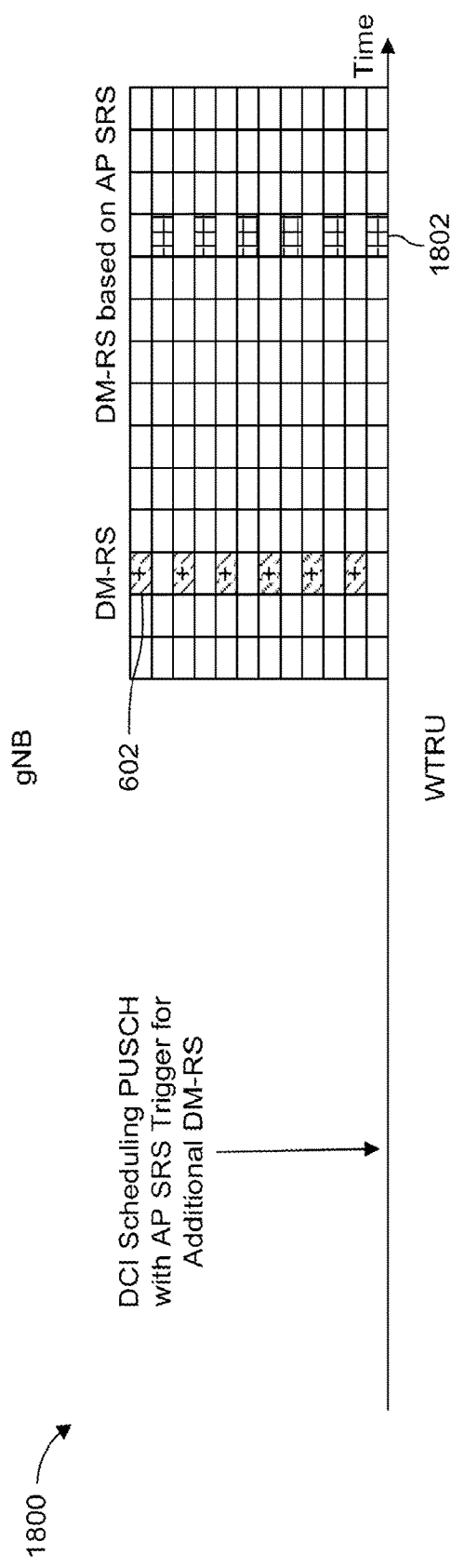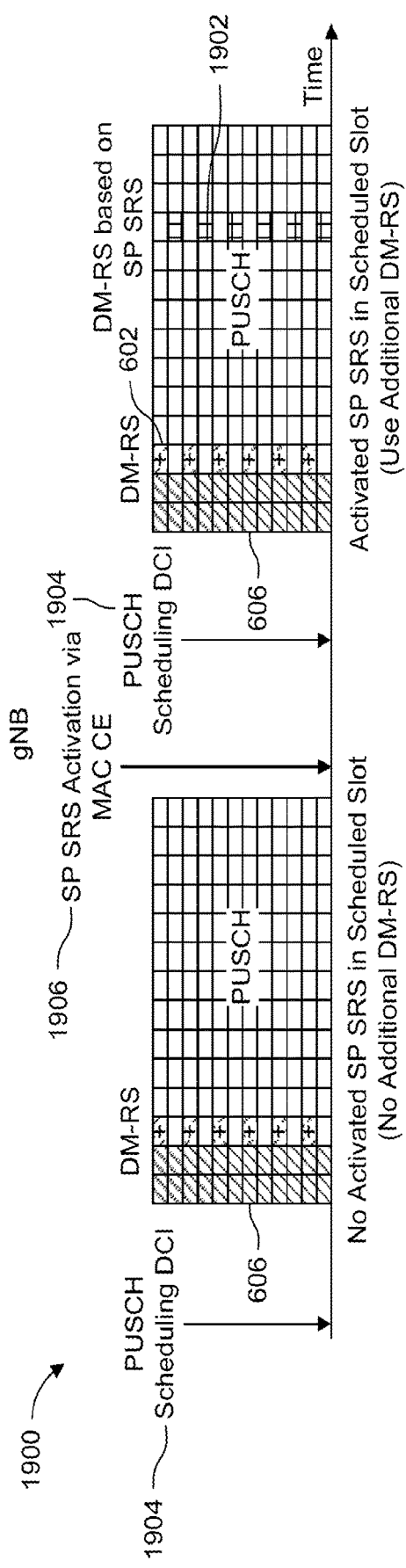
FIG. 18
FIG. 19

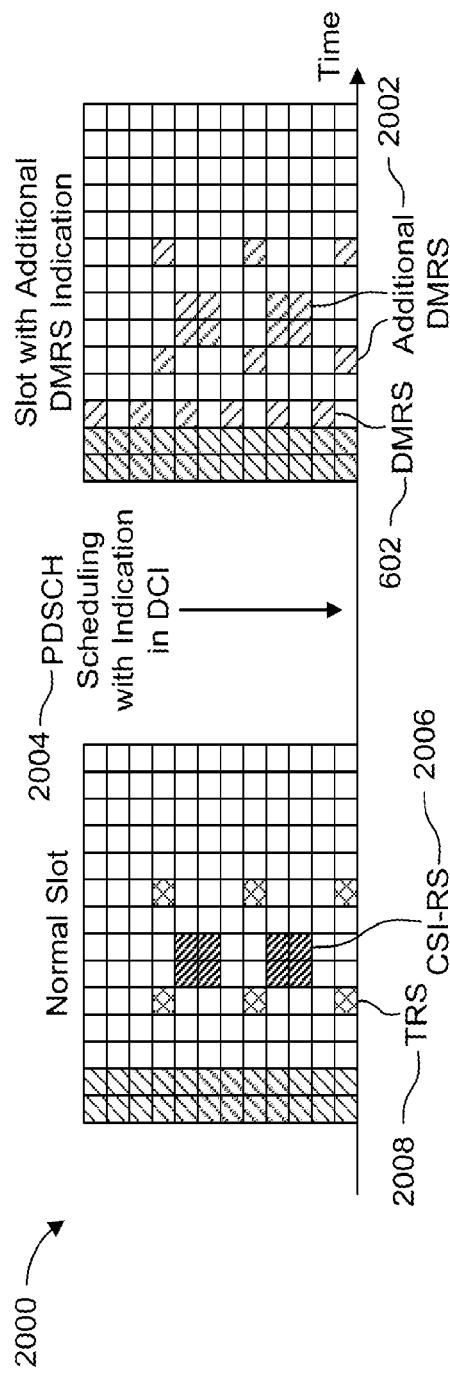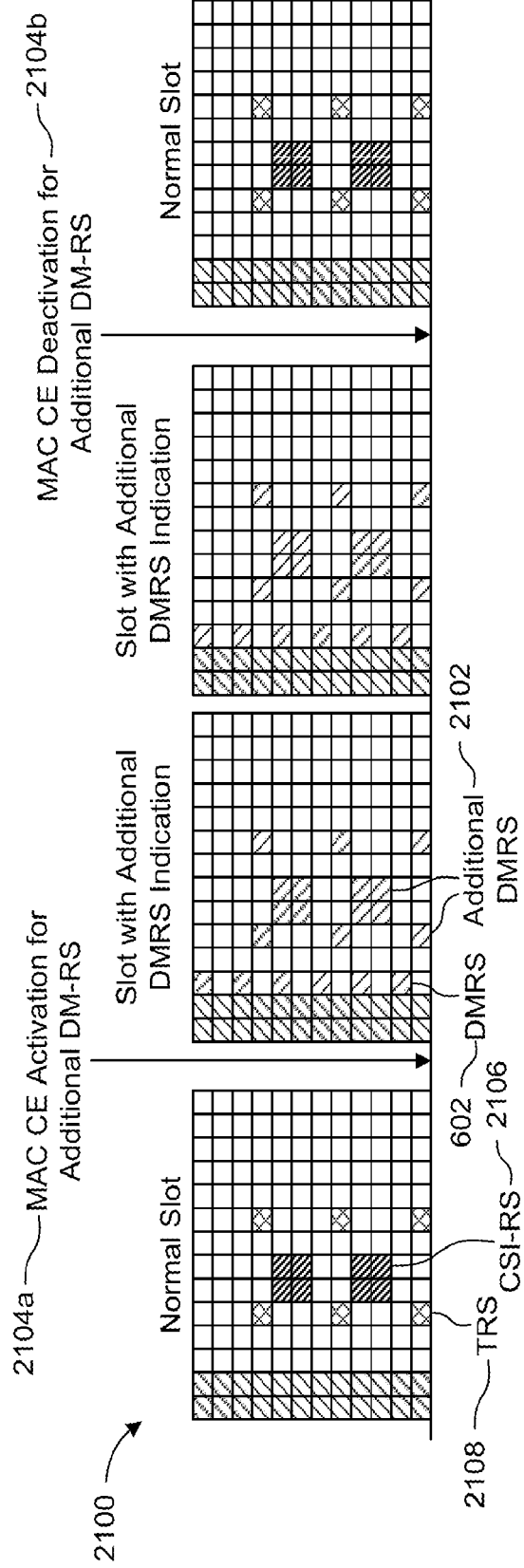
FIG. 20
FIG. 21

2200

| | One Codeword: Codeword 0 Enabled, Codeword 1 Disabled | | |
|---|---|---|---|
| Value | Number of DMRS CDM Group(s) without Data | DMRS Port(s) | Density |
| 0 | 1 | 0 | 2 |
| 1 | 1 | 1 | 2 |
| 2 | 1 | 0,1 | 2 |
| 3 | Reserved | Reserved | - |

FIG. 22

Antenna Port(s) Table for Single Symbol Type-1 DM-RS

| Value | One Codeword: Codeword 0 Enabled, Codeword 1 Disabled | |
|---|---|---|
| | Number of DMRS CDM Group(s) without Data | DMRS Port(s) |
| 0 | 1 | 0 |
| 1 | 1 | 1 |
| 2 | 1 | 0,1 |
| 3 | 2 | 0 |
| 4 | 2 | 1 |
| 5 | 2 | 2 |
| 6 | 2 | 3 |
| 7 | 2 | 0,1 |
| 8 | 2 | 2,3 |
| 9 | 2 | 0-2 |
| 10 | 2 | 0-3 |
| 11 | 2 | 0,2 |
| 12-15 | Reserved | Reserved |

Antenna Port(s) Table for Higher Density DM-RS

| Value | One Codeword: Codeword 0 Enabled, Codeword 1 Disabled | | |
|---|---|---|---|
| | Number of DMRS CDM Group(s) without Data | DMRS Port(s) | Density |
| 0 | 1 | 0 | 1 |
| 1 | 1 | 1 | 1 |
| 2 | 1 | 0,1 | 1 |
| 3 | 2 | 0 | 1 |
| 4 | 2 | 1 | 1 |
| 5 | 2 | 2 | 1 |
| 6 | 2 | 3 | 1 |
| 7 | 2 | 0,1 | 1 |
| 8 | 2 | 2,3 | 1 |
| 9 | 2 | 0-2 | 1 |
| 10 | 2 | 0-3 | 1 |
| 11 | 2 | 0,2 | 1 |
| 12 | 1 | 1 | 2 |
| 13 | 1 | 1 | 2 |
| 14 | 1 | 0,1 | 2 |
| 15 | Reserved | Reserved | |

First Set of Indices

Second Set of Indices

FIG. 23

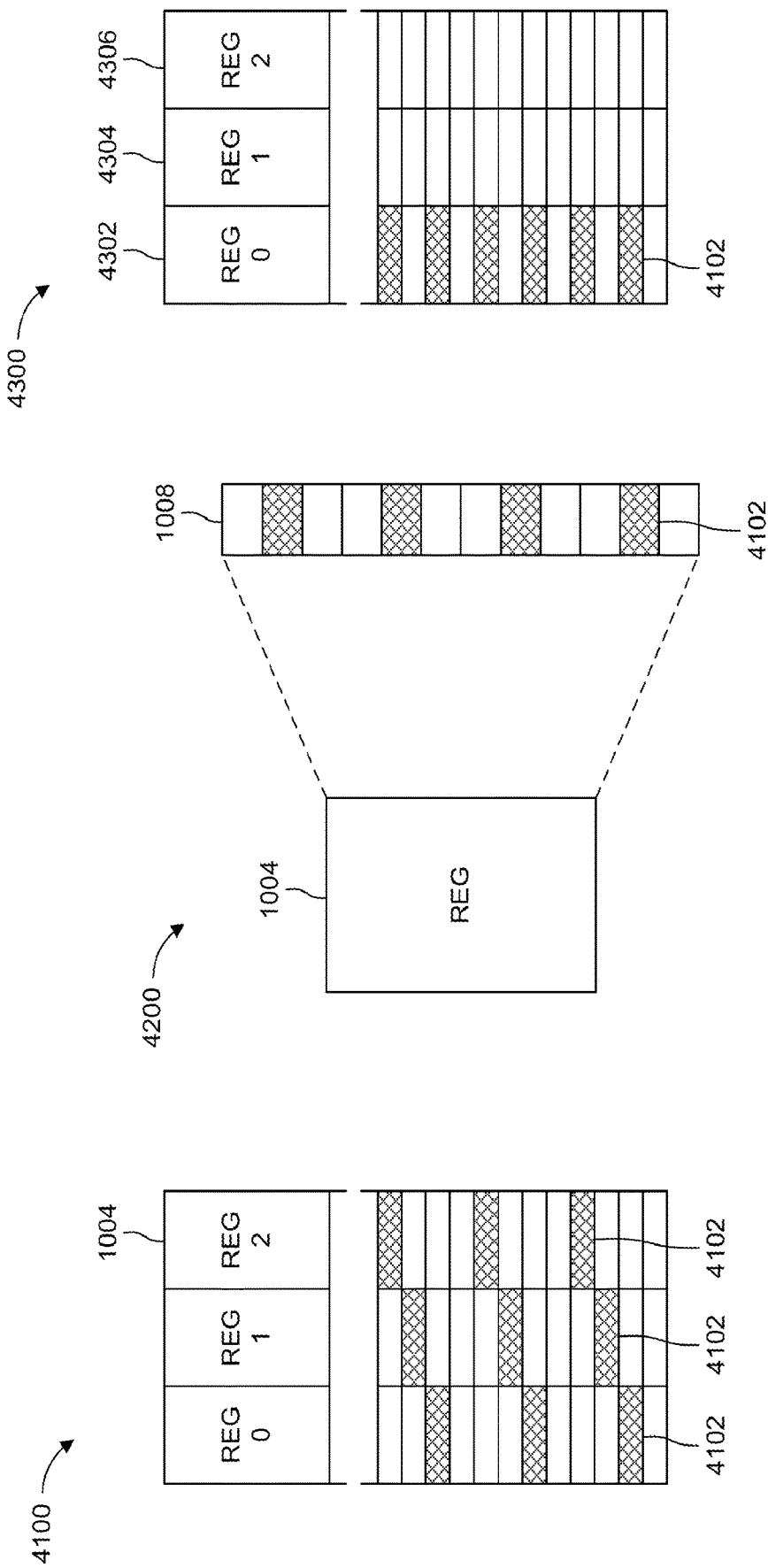

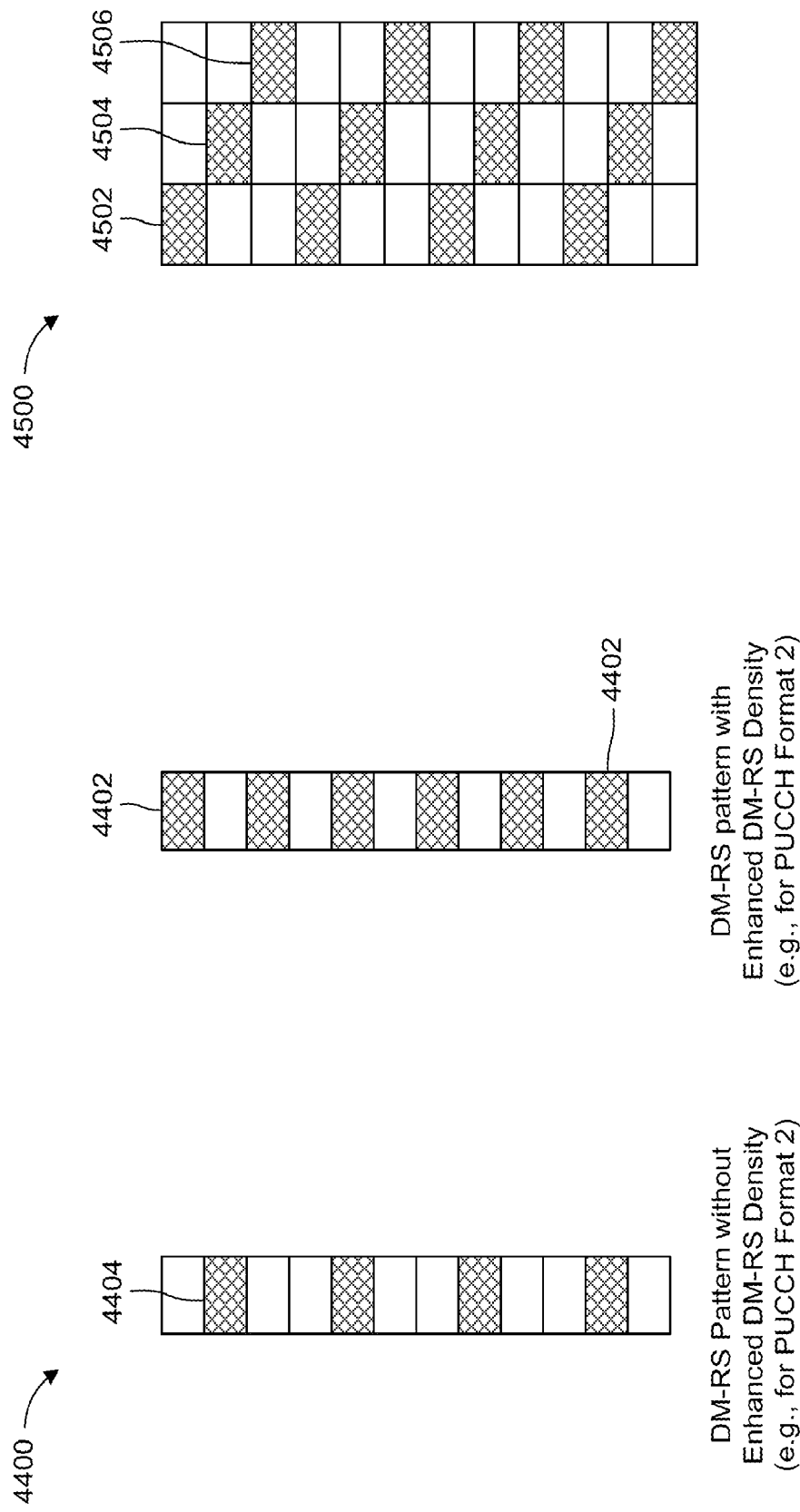

DYNAMIC DEMODULATION SIGNAL RESOURCE ALLOCATION

CROSS REFERENCE TO RELATED APPLICATIONS

The application is a U.S. National Stage Application under 35 U.S.C. §371 of International Patent Application No. PCT/US2021/021068, filed Mar. 5, 2021, which claims the benefit of priority to U.S. Provisional Patent Applications Ser. No. 62/985,994, filed Mar. 6, 2020, and Ser. No. 63/134,859, filed Jan. 7, 2021, the contents thereof being incorporated by reference as if fully set forth herein.

FIELD

Embodiments disclosed herein generally relate to communications and, for example to methods, apparatus and systems for dynamic demodulation reference signal (DM-RS) resource allocation and/or DM-RS enhancement.

RELATED ART

Mobile communications using wireless communication continue to evolve. A fifth generation may be referred to as 5G and a sixth generation may be referred to as 6G. A previous (legacy) generation of mobile communication may be, for example, fourth generation (4G) long term evolution (LTE).

SUMMARY

Systems and methods are described herein for dynamic demodulation signal resource allocation. PDSCH/PUSCH DMRS enhancement is provided. A dynamic indication of reference signal functionality may be provided in a slot for an additional DM-RS. For example, a configured CSI-RS/SRS may be dynamically indicated to use as an additional DM-RS in a slot. Frequency shift/hopping of DM-RS as a function of OFDM symbol and/or the order of OFDM symbol containing DM-RS may increase frequency density within a slot or bundled slots. DM-RS antenna ports aggregation may increase DM-RS frequency density. One or more DM-RS antenna ports may be used to demodulate the same layer. DM-RS pattern determination may be performed for normal scheduling and/or slot bundling. PDCCH DMRS enhancement is provided. Frequency shift/hopping of PDCCH DM-RS may be provided as a function of a REG index within an REG bundle, OFDM symbol index, etc. Use of multiple types of REG (e.g., low DM-RS density and high DM-RS density) and the REG type may be determined, for example, based on subcarrier spacing, operating frequency band, etc. PUCCH DMRS enhancement is provided. Frequency shift/hopping of PUCCH DM-RS may be provided based on any of PUCCH format, symbol length, number or PRBs, etc. Multiple types of PUCCH DM-RS may be used (e.g., low DM-RS density and high DM-RS density) and may be determined based on any of subcarrier spacing, operating frequency band, etc.

In certain representative embodiments, a method may be implemented by a wireless transmit/receive unit (WTRU) to receive information indicating a control resource set (CORESET) configuration of a CORESET. The CORESET configuration including a symbol duration and/or an indication of physical downlink control channel (PDCCH) demodulation reference signal (DM-RS) frequency hopping or density changing. The WTRU may receive information indicating a search space configuration of a search space associated with the CORESET. The search space configuration may include one or more downlink control information (DCI) formats to be monitored and/or one or more aggregation levels associated with each of the one or more DCI formats. The WTRU may determine or more DM-RS positions in one or more resource element groups (REGs) of the CORESET and/or the search space associated with the CORESET. The WTRU may receive a physical downlink control channel (PDCCH) transmission in the search space associated with the CORESET. The WTRU may decode the received PDCCH transmission using one or more PDCCH DM-RSs in the determined one or more DM-RS positions. The WTRU may receive a physical downlink shared channel (PDSCH) transmission or send a physical uplink shared channel (PUSCH) transmission based on one or more DCI fields of the decoded PDCCH transmission.

In certain representative embodiments, a WTRU may include circuitry including a processor, a transmit/receive unit and/or a storage unit. The transmit/receive unit may be configured to receive information indicating a control resource set (CORESET) configuration of a CORESET, the CORESET configuration including a symbol duration and/or an indication of physical downlink control channel (PDCCH) demodulation reference signal (DM-RS) frequency hopping or density changing. The transmit/receive unit may be configured to receive information indicating a search space configuration of a search space associated with the CORESET, the search space configuration including one or more downlink control information (DCI) formats to be monitored and/or one or more aggregation levels associated with each of the one or more DCI formats. The processor may be configured to determine one or more DM-RS positions in one or more resource element groups (REGs) of the CORESET and/or the search space associated with the CORESET. The transmit/receive unit may be configured to receive a PDCCH transmission in the search space associated with the CORESET. The processor may be configured to decode the received PDCCH transmission using one or more PDCCH DM-RSs in the determined one or more DM-RS positions. The processor and transmit/receive unit may be further configured to receive a physical downlink shared channel (PDSCH) transmission or send a physical uplink shared channel (PUSCH) transmission based on one or more DCI fields of the decoded PDCCH transmission.

In certain representative embodiments, the WTRU may determine the one or more DM-RS positions in time and/or frequency in the one or more REGs of the CORESET and/or the search space associated with the CORESET based on (1) any of: the indication, the symbol duration, the one or more DCI formats and/or the one or more aggregation levels, and (2) a respective REG index of each of the one or more REGs.

In certain representative embodiments, the resource element groups (REGs) of the CORESET and/or the search space associated with the CORESET may include a first REG and a second REG. The one or more DM-RS positions of the first REG may be different in the frequency domain than the one or more DM-RS positions of the second REG.

In certain representative embodiments, the first REG and the second REG may belong to a same REG bundle.

In certain representative embodiments, the CORESET configuration may include the symbol duration and/or the indication of PDCCH DM-RS density changing.

In certain representative embodiments, the resource element groups (REGs) of the CORESET and/or the search space associated with the CORESET may include a first REG and a second REG. The one or more DM-RS positions may each occur in the first REG in a time domain and the one or more DM-RS positions do not occur in the second REG.

In certain representative embodiments, the first REG and the second REG may be associated with a same REG bundle.

In certain representative embodiments, the first REG may correspond to a first symbol of a same REG bundle in the time domain.

In certain representative embodiments, the CORESET configuration may include the symbol duration and/or the indication of PDCCH DM-RS frequency hopping.

In certain representative embodiments, the one or more REGS may be associated with a same control channel element (CCE).

BRIEF DESCRIPTION OF THE DRAWINGS

FIG. 12 shows an example of an additional DM-RS configuration based on a CSI-RS resource set.

FIG. 13 shows an example of an additional DM-RS with an AP CSI-RS for PDSCH decoding.

FIG. 14 shows an example of an additional DM-RS with an AP CSI-RS for PUSCH decoding.

FIG. 16 shows an example of a CSI report config for an additional DM-RS based on a CSI-RS.

FIG. 17 shows an example configuration for an additional DM-RS based on an SRS resource set.

FIG. 18 shows an example of an additional DM-RS with an AP SRS for a PUSCH.

FIG. 19 is an example of an additional DM-RS with an SP SRS for a PDSCH decoding.

FIG. 20 shows an example of an additional DM-RS with a DCI.

FIG. 21 shows an example of an additional DM-RS with a MAC CE.

FIG. 22 shows an example of a defined antenna port(s) indication table for a higher density DM-RS.

FIG. 23 is an example of an antenna port(s) indication table for normal density and higher density DM-RS based on an antenna port(s) indication table.

FIG. 41 shows an example of frequency hopping of a PDCCH DM-RS.

FIG. 42 shows an example of a REG for an enhanced PDCCH DM-RS.

FIG. 43 is an example of PDCCH DM-RS skipping with an enhanced PDCCH DM-RS.

FIG. 44 is an example of PUCCH DM-RS with an enhanced DM-RS frequency density and an example of another PUCCH DM-RS without enhancement.

FIG. 45 is an example of frequency hopping of a PUCCH DM-RS.

DETAILED DESCRIPTION

Example Networks for Implementation of the Embodiments

Figure 1A:
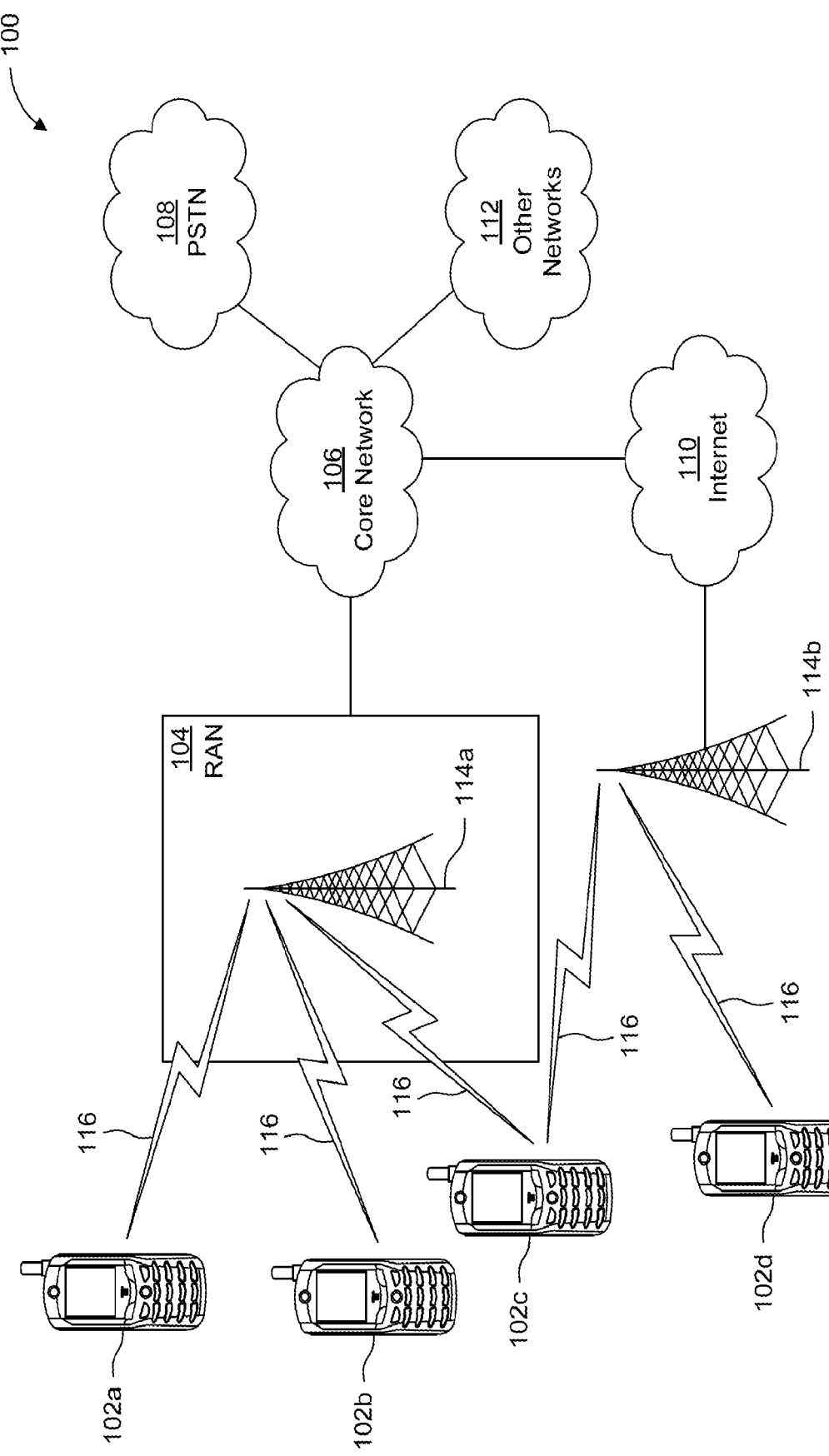
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114*a* and/or the base station 114*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114*a* may be divided into three sectors. Thus, in one embodiment, the base station 114*a* may include three transceivers, i.e., one for each sector of the cell. In an embodiment, the base station 114*a* may employ multiple-input multiple output (MIMO) technology and may utilize multiple transceivers for each sector of the cell. For example, beamforming may be used to transmit and/or receive signals in desired spatial directions.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104/113 and the WTRUs 102*a*, 102*b*, 102*c* may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114*a* and the WTRUs 102*a*, 102*b*, 102*c* may implement a radio technology such as NR Radio Access, which may establish the air interface 116 using New Radio (NR).

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g., an eNB and a gNB).

In other embodiments, the base station 114*a* and the WTRUs 102*a*, 102*b*, 102*c* may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114*b* may have a direct connection to the Internet 110. Thus, the base station 114*b* may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102*a*, 102*b*, 102*c*, 102*d*. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114b, which may employ an IEEE 802 radio technology.

Figure 1B:
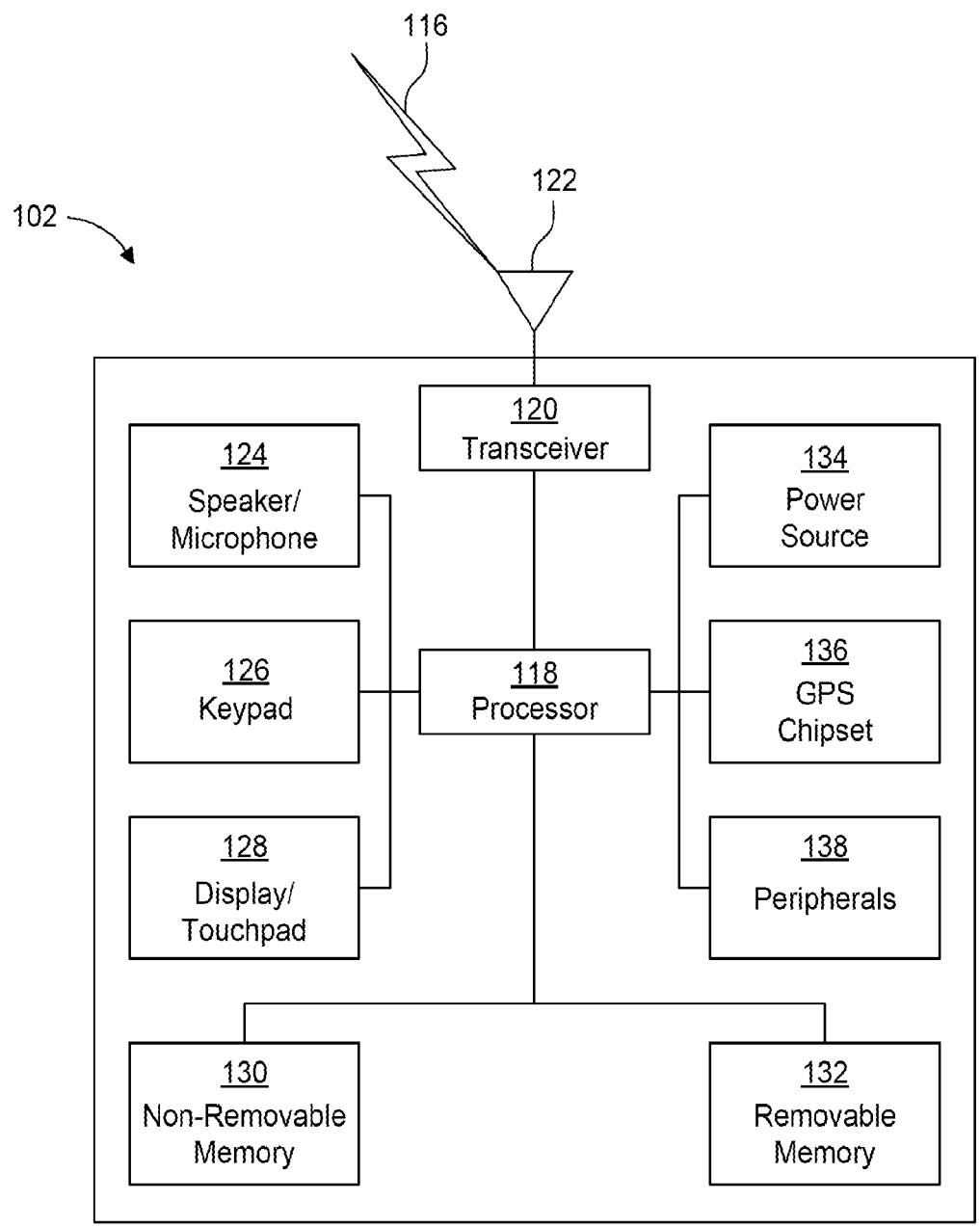
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
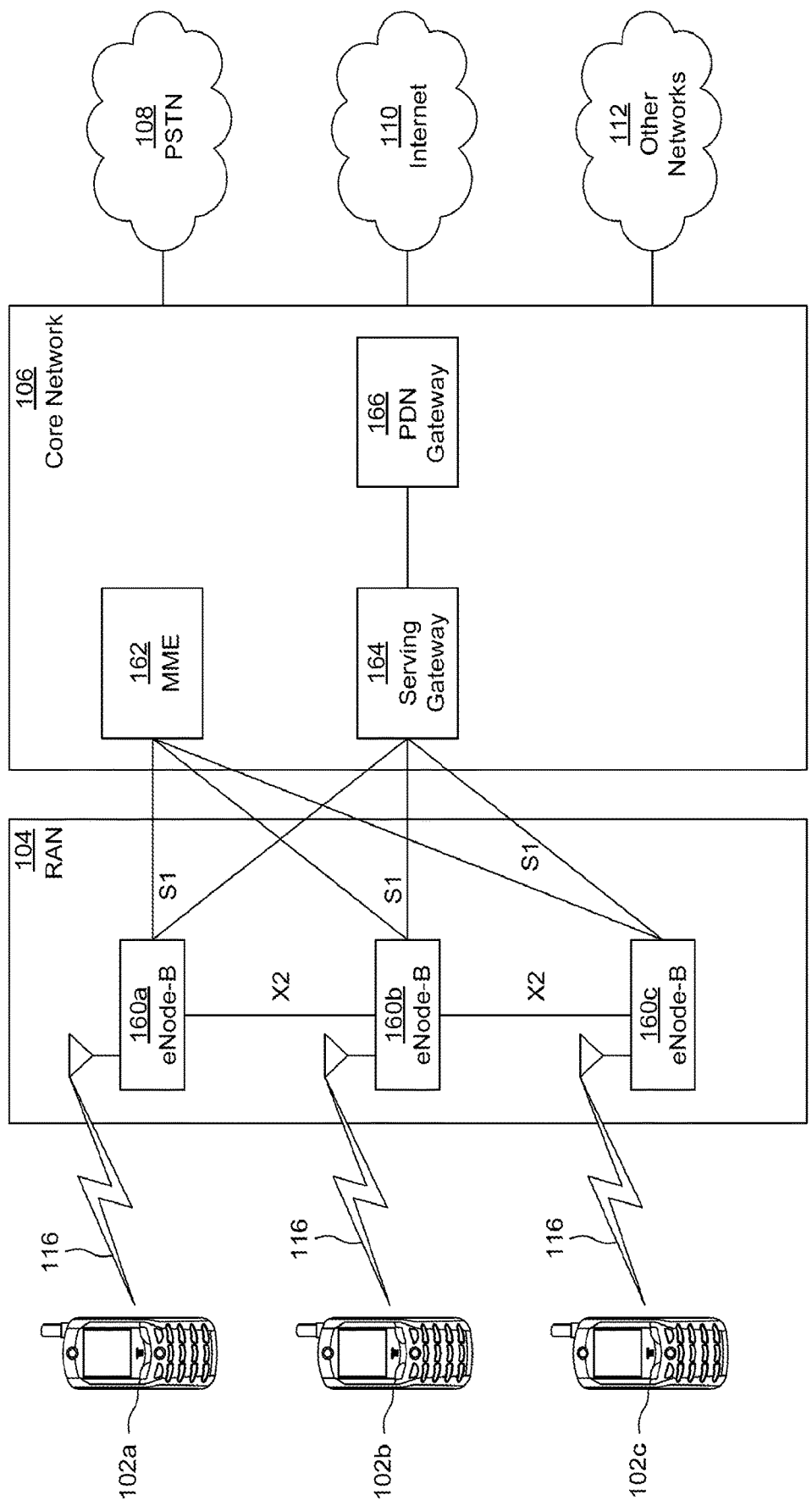
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11 ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
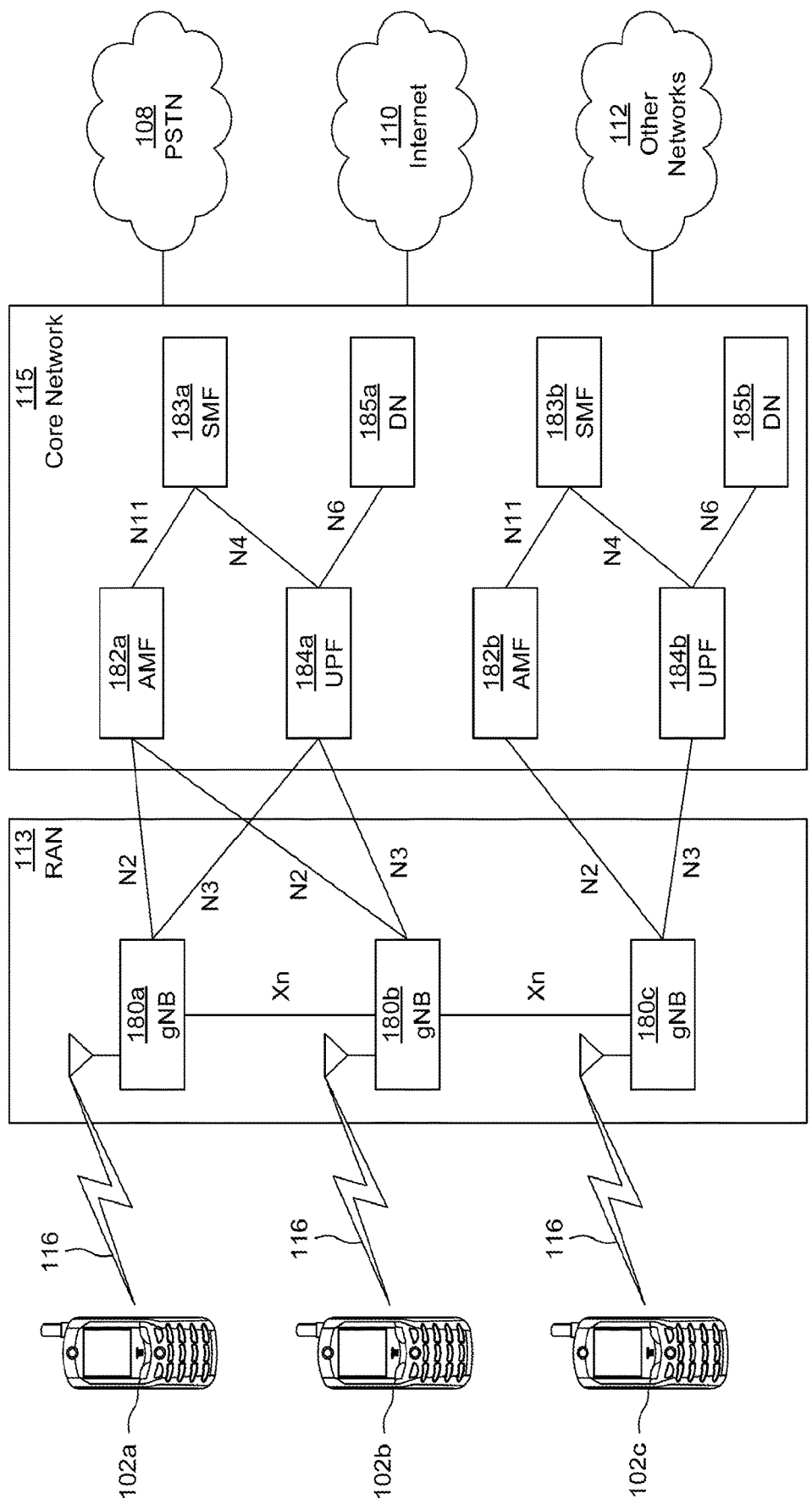
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

New radio (NR) may exceed 52.6 GHz. There may be at least 5 GHz of spectrum available globally (e.g., between 57 to 64 GHz) for unlicensed operation. There may be (e.g., in some countries) up to 14 GHz of spectrum available (e.g., between 57 and 71 GHz) for unlicensed operation. There may be at least 10 GHz of spectrum available globally, e.g., between 71 to 76 GHz and 81 to 86 GHz, for licensed operation. There may be (e.g., in some countries) up to 18 GHz of spectrum available (e.g., between 71 and 114.25 GHz) for licensed operation. Frequency ranges above 52.6 GHz may contain larger spectrum allocations and larger bandwidths that may not be available for bands lower than 52.6 GHz. Physical layer channels of NR may be optimized for uses under 52.6 GHz.

Figure 2:
FIG. 2 shows frequencies between 52.6 GHz and 71 GHz available in various countries.

FIG. 2 shows a table 200 of frequencies between 52.6 GHz and 71 GHz available in various countries.

Figure 3:
FIG. 3 shows frequencies between 71 GHz and 100 GHz available in various countries.

FIG. 3 shows a table 300 of frequencies between 71 GHz and 100 GHz available in various countries.

Frequencies above 52.6 GHz may have higher phase noise, more propagation loss due to high atmospheric absorption, lower power amplifier efficient, and strong power spectral density regulatory requirements, for example, compared to lower frequency bands. Phase noise may increase with carrier frequency.

Figure 4:
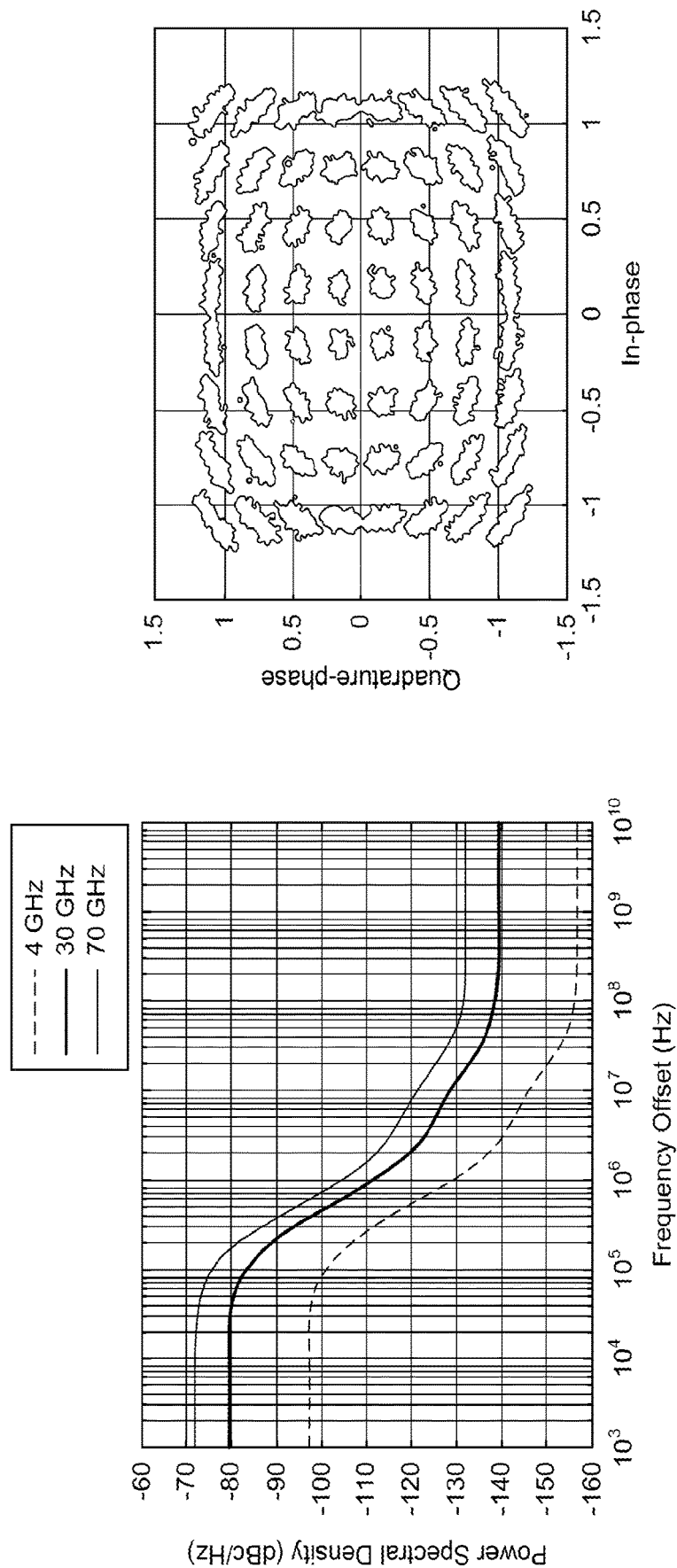
FIG. 4 shows an example of phase noise in a graph comparing common Power Spectral Density as a function of frequency offset at 4 GHz, 30 GHz, and 70 GHz, and shows on the right an example of a received symbol constellation with phase noise for a received signal at high frequency (e.g., above 52.6 GHz).

FIG. 4 shows on the left an example of phase noise in a graph comparing common Power Spectral Density as a function of frequency offset at 4 GHz, 30 GHz, and 70 GHz, and shows on the right an example of a received symbol constellation with phase noise for a received signal at high frequency (e.g., above 52.6 GHz).

NR may use scalable Sub-Carrier Spacing (SCS) to mitigate phase noise in frequency range 2 (FR2). FR2 may denote the frequency range of 24.25-52.6 GHz. Scalable SCS may be expressed as $f_c=15 \cdot 2^n$ [kHz], where $f_c$ may be an SCS and n may be a non-negative integer. Scalable SCS may allow cyclic prefix (CP) length and symbol length to be inversely proportional and may allow symbol boundary alignment between different SCSs. FR2 may support 120/240 kHz SCS values. Frequency range 1 (FR1) may support 15/30/60 kHz SCS values. FR1 may denote a frequency range of 450-6000 MHz (e.g., as shown in FIG. 5).

Figure 5:
FIG. 5 shows example numerologies in NR.

FIG. 5 shows a table 500 of example numerologies in NR.

Phase noise may be a random process that directly impacts up/down conversion between baseband and RF signals, e.g., due to temporal instability of local oscillator(s). Phase noise in the frequency domain may give rise to signal jitter in the time domain. Phase noise may be modeled as a constant and may be compensated via estimation, for example, when the rate of phase variation is slow, e.g., with respect to the OFDM symbol duration. The estimation of phase noise and correction may become difficult, for example, when the rate of phase change is faster, e.g., with respect to the OFDM symbol duration. The larger the SCS the easier it may be to compensate phase noise. The impact of phase noise may increase as modulation increases. Phase difference between each modulation point may be getting smaller, for example, as modulation increases. A smaller phase difference may increase a probability to decode modulation incorrectly with the same amount of phase noise.

As carrier frequency increases, signal propagation may exhibit less multi-path delay spread, for example, due to sharp beamforming with a MIMO antenna and due to signal propagation characteristics at higher frequency. A longer CP may become less important at higher carrier frequencies. FR2 may (e.g., therefore, only) support 60/120 kHz SCS options.

NR may be adapted (e.g., using NR waveforms) to support operation between 52.6 GHz and 71 GHz and a channel access mechanism, e.g., for beam based operation for unlicensed spectrum between 52.6 GHz and 71 GHz.

NR may support various Reference Signals (RSs).

A DeModulation-Reference Signal (DM-RS) may be supported in NR. DM-RS may be a special type of physical layer signal. DM-RS may function as an RS for decoding Physical Downlink Shared Channel (PDSCH) and Physical Uplink Shared Channel (PUSCH). DM-RS may be WTRU-specific. DM-RS may be used to estimate a precoded radio channel for PDSCH (e.g., by a WTRU 102a-d) and PUSCH (e.g., by a gNB 180a-c).

Channel State Information-Reference Signal (CSI-RS) may be supported in NR. CSI-RS may be used by a WTRU to measure radio channel quality (e.g., Channel State Information (CSI)) and report the measurement result (e.g., to a gNB 180a-c).

Sounding Reference Signal (SRS) may be supported in NR. SRS may be used by a gNB 180a-c to identify channel/beam information for UL.

Synchronization Signal Block (SSB) may be supported in NR. A WTRU 102a-d may do cell search and rough synchronization based on SSB. SSB may consist of Primary Synchronization Signal (PSS), Secondary Synchronization Signal (SSS), and Physical Broadcasting CHannel (PBCH).

Tracking RS (TRS) may be supported in NR. A WTRU 102a-d may (e.g., in LTE and NR) roughly synchronize to a base station based on a synchronization signal (e.g., PSS and SSS). Rough synchronization may not be enough for high modulations (e.g., 64QAM or 256QAM), for example, since high modulations may be very sensitive to time/frequency offsets. A WTRU may (e.g., in LTE) do fine time/frequency synchronization to a gNB 180a-c, for example, based on always on RS (e.g., Common RS (CRS)). NR (e.g., in contrast to LTE) may not provide always on RS, such as CRS, to provide more flexibility. NR may support flexible RS (e.g., TRS) to provide fine synchronization for time/frequency.

PT-RS may be supported in NR. Phase noise may increase with carrier frequency. FR2 may experience more phase noise than FR1. NR may support PT-RS with configurable time density, frequency density and resource element (RE) offset, for example, to mitigate the phase noise in FR2.

Positioning RS (PRS) may be supported in NR.

Remote Interference Measurement RS may be supported in NR.

DM-RS may be used for a shared channel. As previously indicated, a DM-RS may be a special type of physical layer signal that functions as an RS for decoding PDSCH and PUSCH. A DM-RS may be WTRU-specific. A DM-RS may be used to estimate precoded radio channel for PDSCH (e.g., by a WTRU 102a-d, otherwise referred to herein as a WTRU 102) and PUSCH (e.g., by a gNB 180a-c, otherwise referred to herein as a gNB 180). A gNB 180 may (e.g., for PDSCH) beamform the DM-RS, may keep it within a scheduled resource, and may transmit it, e.g., when necessary. A gNB 180 may (e.g., for PUSCH) indicate precoded channel information via SRI (Sounding reference signal Resource Indicator). A WTRU 102 may (e.g., based on the indication) beamform the DM-RS within the scheduled resource.

Multiple orthogonal DM-RS ports may be allocated to support single-user (SU)/multi-user (MU) MIMO transmission. In an example, a (e.g., one of the) multiple orthogonal DM-RS ports may be used to transmit/decode a transmission layer of the PDSCH or the PUSCH. A WTRU 102 and/or a gNB 180 may (e.g., in NR), for example, support up to 12 DM-RS ports for MU MIMO transmission while the WTRU 102 and/or the gNB 180 may support up to 8 DM-RS ports for DL SU MIMO transmission and 4 DM-RS ports for UL SU MIMO transmission, respectively.

Figure 6:
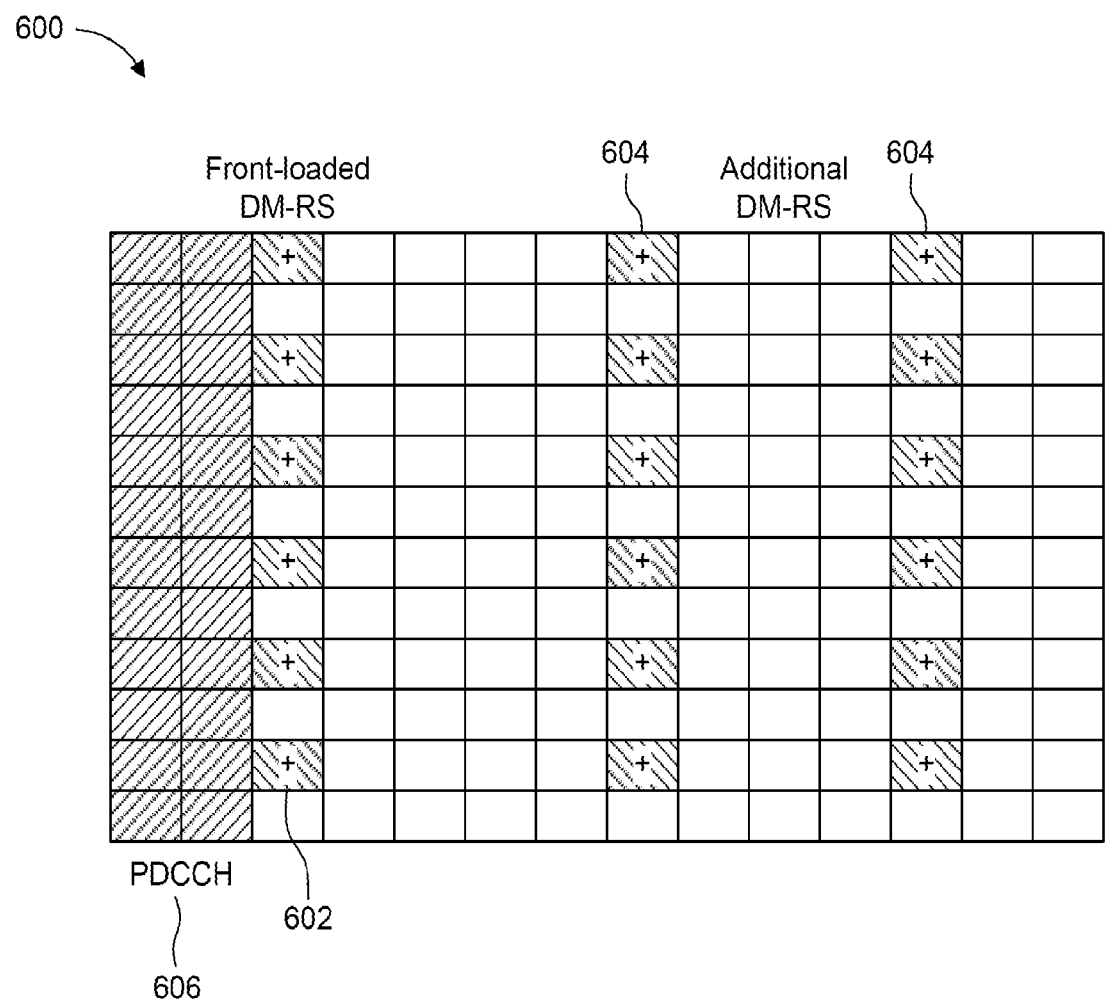
FIG. 6 shows an example of a front-loaded DM-RS and an additional DM-RS.

A DM-RS may consist of a front-loaded DM-RS and an additional DM-RS. FIG. 6 shows an example of a slot 600 having a front-loaded DM-RS 602 and an additional DM-RSs 604. The front-loaded DM-RS 602 may be located in the front of the scheduled slot, such as a first OFDM symbol of a scheduled slot (e.g., PDSCH mapping type B) or a first OFDM symbol after PDCCH 606 (e.g., PDSCH type mapping A). A front-loaded DM-RS 602 may enable early channel estimation for low-latency applications. A front-loaded DM-RS 602 may be not enough to acquire accurate channel state information, e.g., especially in high mobility scenarios. A gNB 180 may track fast changes of a wireless channel in high-mobility scenarios, for example, by increasing the rate of transmission of a DM-RS signal (e.g., by configuring the additional DM-RS).

Figure 7:
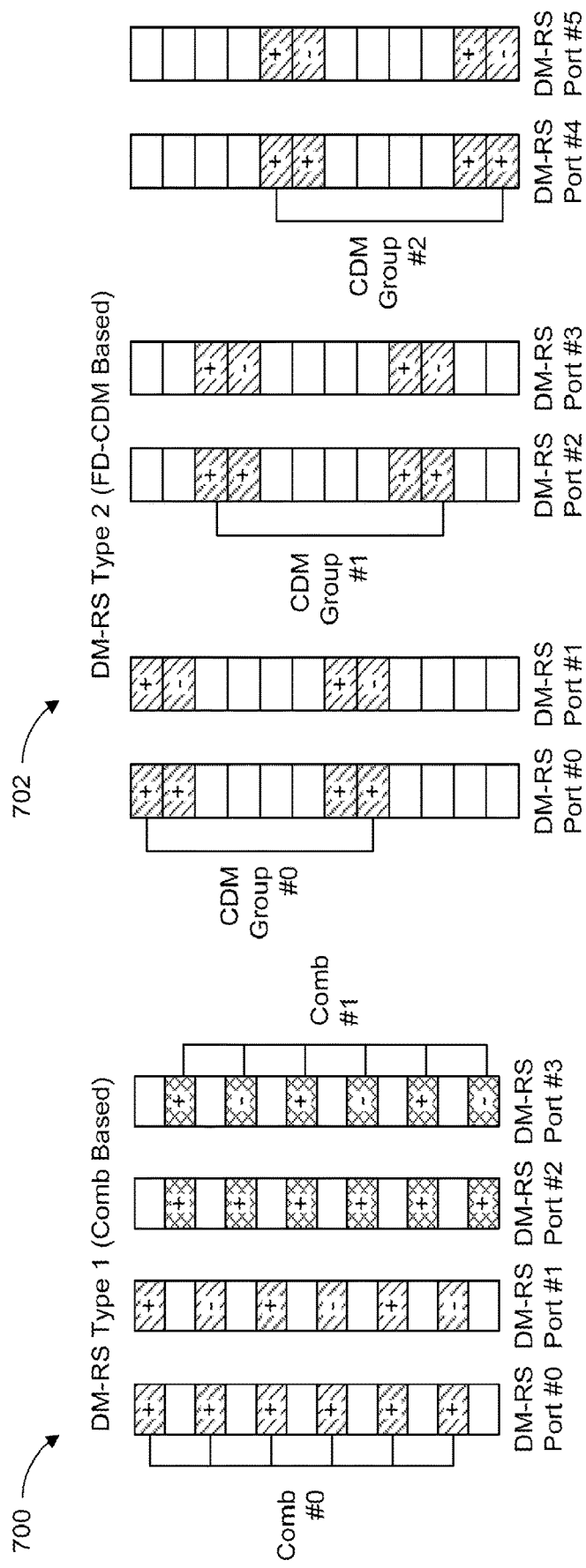
FIG. 7 shows examples of front-loaded DM-RS of type-1 and type-2 single-symbol DM-RS.
Figure 8:
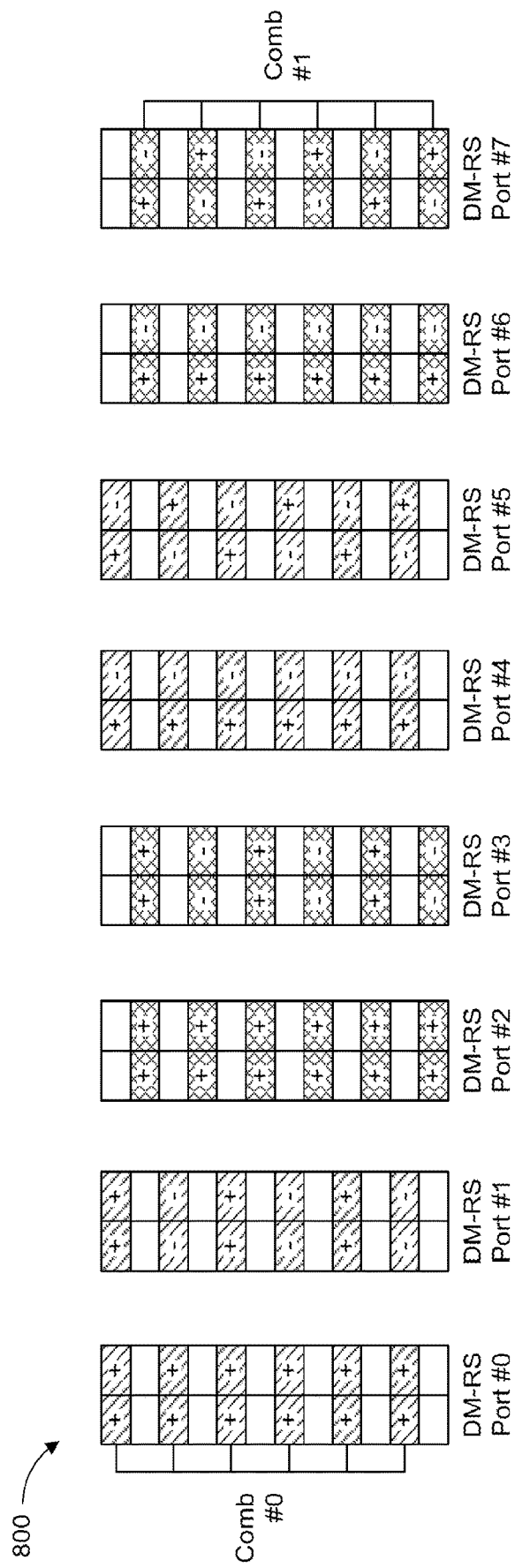
FIG. 8 shows an example of front-loaded DM-RS of type-1 double-symbol DM-RS.
Figure 9:
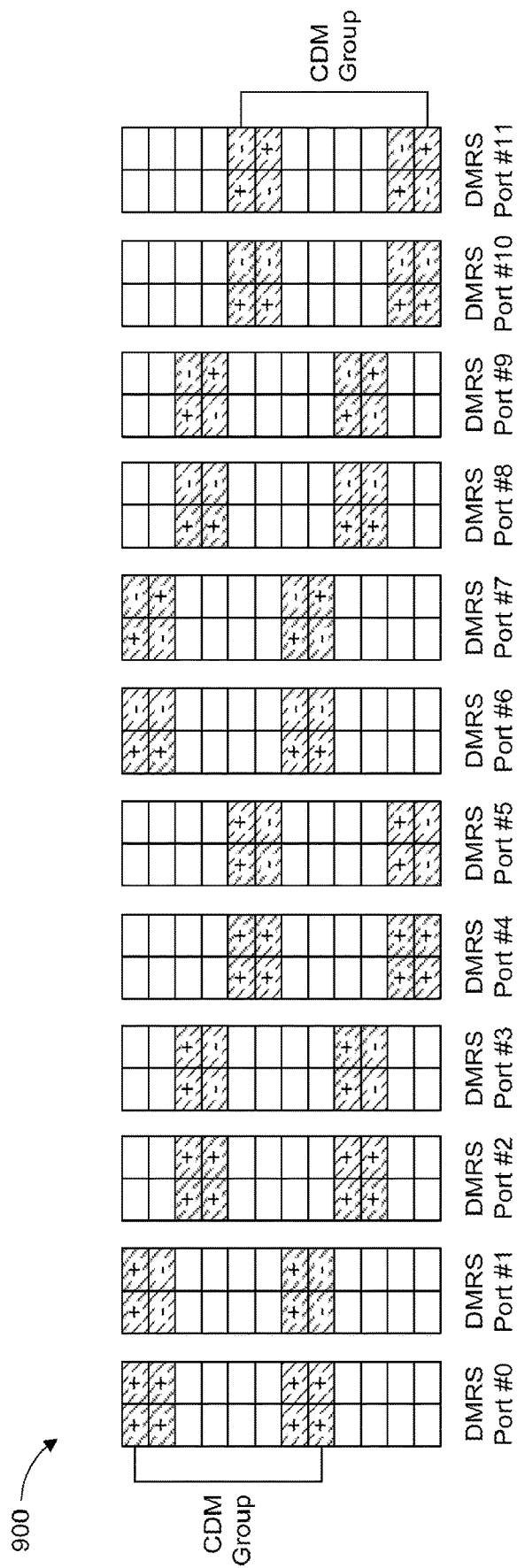
FIG. 9 shows an example of front-loaded DM-RS of type-2 double-symbol DM-RS.

There may be multiple types of DM-RSs. In an example, two types of front-loaded DM-RS may be supported with one or two symbols, for example, as shown in FIG. 7, FIG. 8 and FIG. 9. In an example (e.g., of type-1 DM-RS), DM-RS ports may be mapped to a (e.g., one) subcarrier of every second subcarrier in DM-RS symbols, which may create a comb-like pattern (e.g., Comb #0 or Comb #1). A (e.g., one) subcarrier may be known as a Resource Element (RE). A (e.g., each) comb-like pattern may support, for example, (e.g., up to) two DM-RS ports (e.g., with one symbol) and/or four DM-RS ports (e.g., with two symbols), e.g., by utilizing code division multiplexing (CDM). Type-2 DM-RS (e.g., in contrast to type-1 DM-RS) may be based on frequency domain-code division multiplexing (FD-CDM). Three CDM groups (e.g., CDM group #0, CDM group #1, CDM group #2) may be allocated (e.g., for type-2 DM-RS) with one or two symbols. In an example, each of three CDM groups may comprise two pairs of two consecutive REs in the frequency domain. In an example, each of the three CDM groups may support (e.g., up to) two DM-RS ports with one symbol and four DM-RS ports with two symbols (e.g., by utilizing CDM).

Type-1 DM-RS may allocate more REs (e.g., six REs) per DM-RS port than type 2 DM-RS (e.g., four REs). Type-1 DM-RS may provide better channel estimation accuracy. A limited number of orthogonal multiplexing (e.g., four ports per OFDM symbol and up to eight ports with two OFDM symbols) may be supported, for example, due to the larger number of RE allocations (e.g., to type-1 DM-RS). Type-2 DM-RS (e.g., in contrast to type-1 DM-RS) may provide worse channel estimation accuracy (e.g., due to lower RS density). Type-2 DM-RS may (e.g., in contrast to type-1 DM-RS) provide more utilization of orthogonal DM-RS ports (e.g., six ports per symbol and up to 12 ports with two symbols).

FIG. 7 shows examples of front-loaded DM-RS of type-1 700 and type-2 single-symbol DM-RS 702.

FIG. 8 shows an example of front-loaded DM-RS of type-1 double-symbol DM-RS 800.

FIG. 9 shows an example of front-loaded DM-RS of type-2 double-symbol DM-RS 900.

A gNB 180 may track fast changes in a channel (e.g., in high-mobility scenarios), for example, by increasing a rate of transmission of DM-RS signals, e.g., by utilizing additional DM-RS. The number of symbols for the additional DM-RS may be, for example, (e.g., up to) three symbols (e.g., four symbols including both front-loaded DM-RS and additional DM-RS) for single-symbol DM-RS and two symbols (e.g., three symbols including both front-loaded DM-RS and additional DM-RS) for double-symbol DM-RS.

Figure 10:
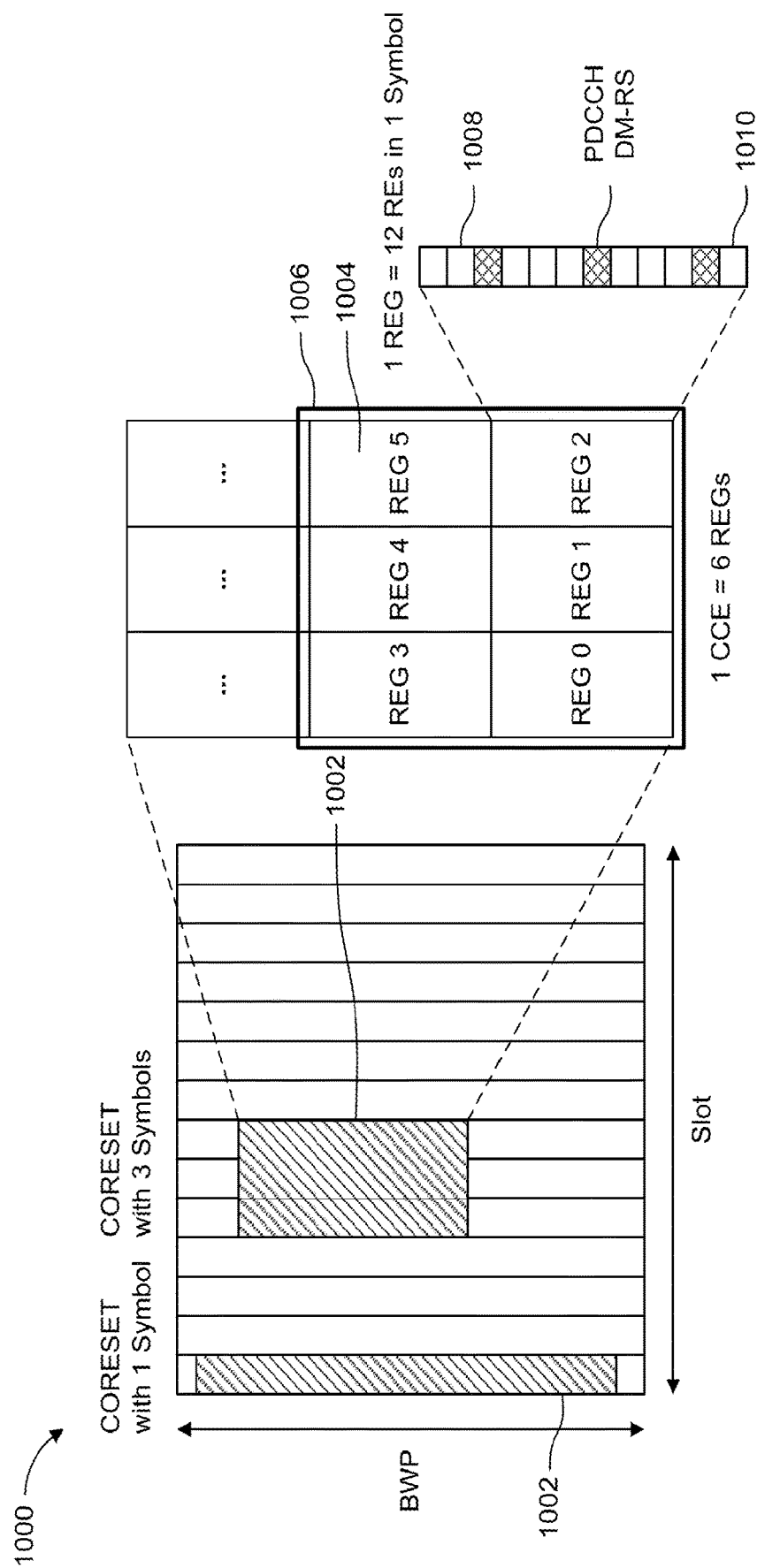
FIG. 10 shows an example of an NR PDCCH structure.

FIG. 10 shows an example 1000 of an NR PDCCH structure 1000.

Physical Downlink Control Channel (PDCCH) is a physical channel that carries a Downlink Control Information (DCI) based COntrol REsource SET (CORESET) 1002, Resource Element Group (REG) 1004, Control Channel Element (CCE) 1006, and Search Space (SS).

A WTRU 102 may receive configurations of one or more CORESETs 1002. A CORESET 1002 may comprise, for example, one or more of a frequency assignment (e.g., as chunks of six resource blocks (RBs)), a length in time (e.g., one to three OFDM symbols), a type of REG bundle, and/or a type of mapping from REG bundles 1004 to CCEs 1006 (e.g., whether it is interleaving or non-interleaving). A WTRU 102 may receive (e.g., in a bandwidth part (BWP)), for example, (e.g., up to) N (e.g., three) CORESETs 1002. For example, there may be 12 CORESETs in four possible bandwidth parts.

A WTRU 102 may receive a configuration of a CORESET 1002 with index 0 (e.g., CORESET 0), for example, via a four-bit information element in a master information block (MIB) from a gNB 180. A configuration of CORESET 0 may be restricted to a limited number of combinations of parameters compared to other CORESETs 1002. In an example, the configuration of CORESET 0 may not be aligned with a frequency grid of other CORESETs 1002.

A REG 1004 may be the smallest building block for PDCCH 606. A REG 1004 may, for example, consist of 12 REs 1008 on one OFDM symbol 1010 in time and one RB in frequency. In an example REG 1004, nine REs 1008 may be used for control information and three REs may be used for DM-RS. Multiple REGs 1004 (e.g., 2, 3, and/or 6), adjacent in time or frequency, may form a REG bundle. A REG bundle may be used with the same precoder and the DM-RSs for the multiple REGs may be used together for channel estimation. In an example, six REGs (e.g., in the format of 1, 2, and/or 3 REG bundles) may form one CCE 1006, which may be the smallest possible PDCCH 606. A PDCCH 606 may consist of one or more CCEs 1006 (e.g., 1, 2, 4, 8, and/or 16 CCEs). The number of CCEs 1006 for a PDCCH 606 may be called the PDCCH's aggregation level (AL).

Mapping of REG bundles may use interleaving or non-interleaving. In an example of non-interleaving mapping, consecutive REG bundles (e.g., adjacent in frequency) may form a CCE 1006, where CCEs 1006 adjacent in frequency may form a PDCCH 606. In an example of interleaving mapping, REGs 1004 may be interleaved (e.g., or permuted) before being mapped to CCEs 1006, which may result in (e.g., generally), for example, non-adjacent REG bundles 1004 in one CCE 1006 and non-adjacent CCEs 1006 in one PDCCH 606.

A WTRU 102 may receive a configuration of a synchronization signal (SS) or a set of SSs (e.g., for multiple aggregation levels). The SS or the set of SSs may include a set of PDCCH candidates. The WTRU 102 may monitor the set of PDCCH candidates, for example, based on the set of PDCCH candidates.

A WTRU 102 may determine, e.g., by one or more associated CORESETs, a number of candidates for or within each aggregation level, and a set of monitoring occasions. The monitoring occasions may be determined, for example, by one or more of a monitoring periodicity (e.g., in terms of slots), a monitoring offset, and a monitoring pattern (e.g., with 14 bits corresponding to the possible patterns of symbols inside a slot).

Physical Uplink Control Channel (PUCCH) is a physical channel that may transmit Uplink Control Information (UCI), such as HARQ feedback, Channel State Information (CSI) reporting, and Scheduling Request (SR). In NR, a WTRU 102 may support one or more of the following PUCCH formats to transmit UCI:

| Parameter | Format 0 | Format 1 | Format 2 | Format 3 | Format 4 |
| --- | --- | --- | --- | --- | --- |
| UCI bit | ≤2 | ≤2 | >2 | >2 | >2 |
| PUCCH Length | Short | Long | Short | Long | Long |
| UCI/DM-RS multiplexing method | N/A | TDM | FDM | TDM | TDM |
| Number of PRBs | 1 | 1 | 1~16 | 1~16 | 1 |
| Number of symbols | 1~2 | 4~14 | 1~2 | 4~14 | 4~14 |

While large Sub-Carrier Spacing (SCS) may reduce phase noise, large SCS may degrade channel estimation performance, for example, due to a low density of RSs in the frequency domain.

Figure 11:
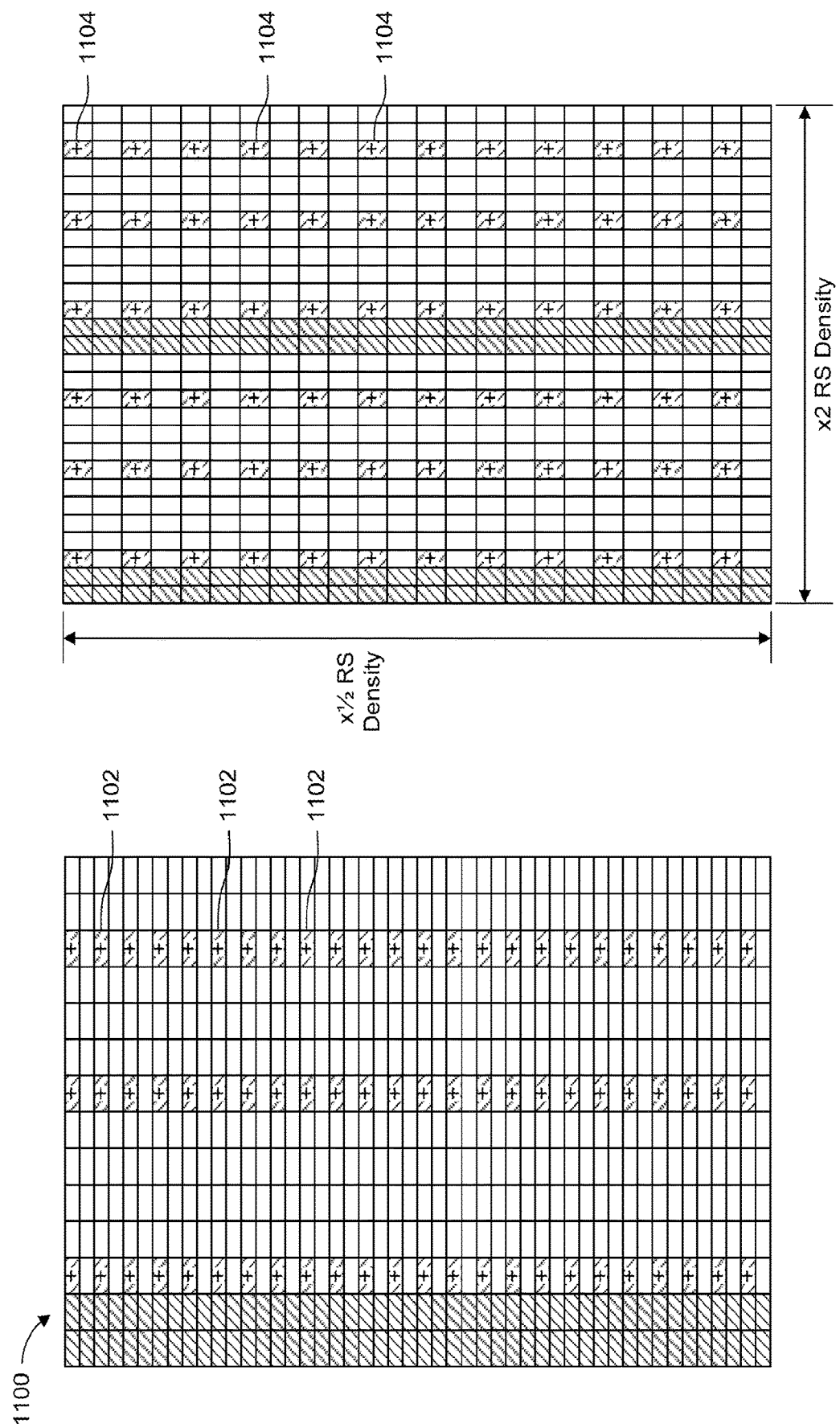
FIG. 11 shows an example comparing RS density in the time and frequency domains when SCS is two times larger.

FIG. 11 shows an example 1100 comparing RS 1102, 1104 density in the time (shown horizontally in FIG. 11) and frequency (shown vertically in FIG. 11) domains when SCS is two times larger.

In examples, the density of RSs in the frequency domain may be inversely proportional to the SCS while the density of RSs in the time domain may be directly proportional to the SCS. In an example (e.g., as the SCS increases), the lower frequency-domain RS density may degrade channel estimation performance of the RSs in the frequency domain while (e.g., at the same time) the higher time-domain RS density may not provide significant gain in channel estimation performance in the time domain. RSs may be enhanced for high SCS, for example, to maintain good channel estimation performance in the frequency domain.

Enhanced DM-RS channel estimation may be enabled for UL shared channel and downlink (DL) shared channel. Enhanced DM-RS channel estimation may be enabled for a DL control channel and a UL control channel.

Shared Channel DM-RS enhancement may be provided. A WTRU 102 may determine whether to use an additional DM-RS, for example, based on CSI-RS.

An additional DM-RS, e.g., in addition to PDSCH DM-RS and/or PUSCH DM-RS, may be supported. An additional DM-RS may be located in SCSs that may not have DM-RS ports for PDSCH and/or PUSCH, for example, to provide enhanced channel estimation performance in the frequency domain. In an example, CSI-RS based additional DM-RS may be supported. Flexible configurations (e.g., RE location, RS density, and bandwidth) of a CSI-RS resource and a CSI-RS resource set may provide RE locations that may enable enhanced channel estimation of DM-RS in the frequency domain.

A WTRU 102 may determine an additional DM-RS configuration, for example, based on CSI-RS.

In an example, a WTRU 102 may determine an additional DM-RS configuration, for example, based on an NZP CSI-RS resource set.

For example, a WTRU 102 may receive one or more RRC messages comprising a plurality of CSI-RS resource sets. The one or more RRC messages may indicate (e.g., based on the plurality of CSI-RS resource sets) a group of the plurality of CSI-RS resource sets for additional DM-RS configuration. For example, the one or more RRC messages may comprise additionalDMRS-Info in one or more CSI-RS resource sets (e.g., of the plurality of CSI-RS resource sets), for example, as shown in FIG. 12. The WTRU 102 may (e.g., based on the additionalDMRS-Info of the one or more CSI-RS resource sets) receive explicit and/or implicit signaling to trigger additional DM-RS to receive PDSCH or to transmit PUSCH. The name of the configuration may be different with additionalDMRS-Info. For example (e.g., in addition and/or alternative to "additional DM-RS"), other terms, such as supplementary DM-RS, frequency tracking RS, or DM-RS based on CSI-RS, may be used to indicate/configure identical functionality.

An additional DM-RS configuration (e.g., based on one or more CSI-RS resource sets) may be used, supported, or allowed, for example, with at least one of the following restrictions: subcarrier spacing, operating frequency band, DM-RS configuration type, WTRU capability, number of antenna ports, modulation order used for the associated channel, scheduling type and/or CORESET type.

In an example of a subcarrier spacing restriction, the additional DM-RS may be configurable, used, or supported, for example, when the subcarrier spacing of a channel (e.g., DL/UL physical channels) is larger than a threshold (e.g., X kHz), wherein the threshold may be predefined or configured.

In an example of an operating frequency band restriction, the additional DM-RS may be configurable, used, and/or supported, for example, when the operating frequency band is higher than a threshold (e.g., Y GHz), wherein the threshold may be predefined or configured.

In an example of a DM-RS configuration type restriction, the additional DM-RS may be configurable, used, and/or supported, for example, when a first DM-RS configuration type (e.g., type-2) is used (e.g., otherwise, the additional DM-RS may not be supported and/or used).

In an example of WTRU capability as a restriction, a WTRU 102 may indicate whether it does or does not support the additional DM-RS.

In an example of the number of antenna ports for the CSI-RS as a restriction, a CSI-RS resource may be used as an additional DM-RS, for example, if the number of antenna ports of the CSI-RS resource is larger than a threshold (e.g., 4), wherein the threshold may be predefined or configured.

In an example of a modulation order used for the associated channel as a restriction, the additional DM-RS may be used or supported, for example, if a modulation order used for a channel (e.g., PDSCH) is higher than a threshold.

In an example of a scheduling type used as a restriction, the additional DM-RS may be configurable, used, and/or supported based on any of single/multi-slot scheduling, slot bundling and/or a scheduling scaling factor (F). For example, a WTRU 102 may receive a DCI which schedules one or more transport blocks with single-slot scheduling, without slot bundling and/or the scheduling scale factor may be F=1, the additional DM-RS may be used. For example, a WTRU 102 may receive a DCI which schedules one or more transport blocks with multi-slot scheduling, with slot bundling and/or F>1, the additional DM-RS may not be used.

In an example of a CORESET type used as a restriction, the additional DM-RS may be configurable, used, and/or supported based on a CORESET type of a CORESET where a WTRU 102 receives a DCI for scheduling PDSCH. For example, upon condition the CORESET type indicates a CORESET with any of an enhanced REG, DM-RS frequency hopping and/or an enhanced PDCCH DM-RS density, the WTRU 102 may apply (e.g., use) the additional DM-RS.

FIG. 12 shows an example 1200 of an additional DM-RS configuration based on a CSI-RS resource set.

Hereafter, CSI-RS, measurement reference signal, tracking reference signal (TRS), sounding reference signal (SRS), phase tracking reference signal (PTRS), synchronization signal block (SSB), and additional DM-RS may be used interchangeably, consistent with one or more embodiments. CSI-RS resource set and SRS resource set may be used interchangeably, consistent with one or more embodiments.

FIG. 13 shows an example 1300 of an additional DM-RS with an AP CSI-RS for PDSCH decoding.

A WTRU 102 may determine an additional DM-RS 1302, for example, based on AP CSI-RS. In examples, an AP CSI-RS based additional DM-RS 1302 may be supported. For example, an explicit AP CSI-RS trigger and/or an implicit AP CSI-RS trigger (e.g., via CSI request field) may be supported in a UL DCI (e.g., in DCI format 0_0, DCI format 0_1, or DCI format 0_2) and/or in a DL DCI (e.g., in DCI format 1_0, DCI format 1_1 and/or DCI format 1_2). A WTRU 102 may receive a DCI 1304 that schedules PDSCH and indicates an AP CSI-RS trigger for additional DM-RS from a gNB 180. A WTRU 102 may (e.g., based on the DCI) receive and decode the PDSCH with an additional DM-RS 1302.

A WTRU 102 may determine an additional DM-RS 1302, for example, based on an explicit AP CSI-RS trigger in a DL DCI. For example, a WTRU 102 may receive one or more RRC messages comprising a plurality of CSI-RS resource sets for additional DM-RS 1302. The one or more RRC messages may indicate (e.g., based on the plurality of CSI-RS resource sets) a group of CSI-RS resource sets (e.g., of the plurality of CSI-RS resource sets) for an AP CSI-RS request for an additional DM-RS 1302. The WTRU 102 may (e.g., based on the group of CSI-RS resource sets) receive a DCI 1304 that schedules PDSCH and triggers one or more CSI-RS resource sets of the group. The WTRU 102 may (e.g., based on the DCI) receive and decode the PDSCH with the additional DM-RS 1302.

A WTRU 102 may determine an additional DM-RS 1302, for example, based on an AP CSI-RS trigger in a CSI request field of a DL DCI 1304. For example, a WTRU 102 may receive one or more RRC messages comprising a plurality of CSI report configurations (configs) and a plurality of CSI-RS resource sets. A CSI report config (e.g., each of the plurality of CSI report configs) may be associated with one of the plurality of CSI-RS resource sets. The one or more RRC messages may (e.g., based on the plurality of CSI report configs and the plurality of CSI-RS resource sets) indicate a group of CSI report configs of the plurality of CSI report configs to trigger an AP CSI report. The WTRU 102 may (e.g., based on the group of CSI report configs) receive a DCI 1304 that schedules PDSCH and triggers one or more CSI report configs of the group of CSI report configs. The report quantity of each of the one or more of CSI report configs may indicate none. The WTRU 102 may (e.g., based on the one or more CSI report configs) determine reception of one or more of the CSI-RS resource sets (e.g., associated with the one or more CSI report configs) for an additional DM-RS 1302. The WTRU 102 may (e.g., based on the one or more of CSI-RS resource sets) receive the PDSCH with the additional DM-RS 1302.

FIG. 14 shows an example 1400 of an additional DM-RS with an AP CSI-RS for PUSCH decoding.

A WTRU 102 may determine an additional DM-RS 1402, for example, based on an AP CSI-RS trigger in a CSI request field of a UL DCI 1404. For example, a WTRU 102 may receive one or more RRC messages comprising a plurality of CSI report configs and a plurality of CSI-RS resource sets. A CSI report config (e.g., each of the plurality of CSI report configs) may be associated with one of the plurality of CSI-RS resource sets. The one or more RRC messages may (e.g., based on the plurality of CSI report configs and the plurality of CSI-RS resource sets) indicate a group of CSI report configs of the plurality of CSI report configs to trigger an AP CSI report. The WTRU 102 may (e.g., based on the group of CSI report configs) receive a DCI 1404 that schedules PUSCH and triggers one or more of the CSI report configs of the group of CSI report configs. The report quantity of each of the one or more of CSI report configs may indicate none. The WTRU 102 may (e.g., based on the one or more CSI report configs) determine reception of one or more CSI-RS resource sets (e.g., associated with the one or more CSI report configs) for an additional DM-RS 1402. The WTRU 102 may (e.g., based on the one or more of CSI-RS resource sets) transmit the PUSCH with the additional DM-RS 1402.

Figure 15:
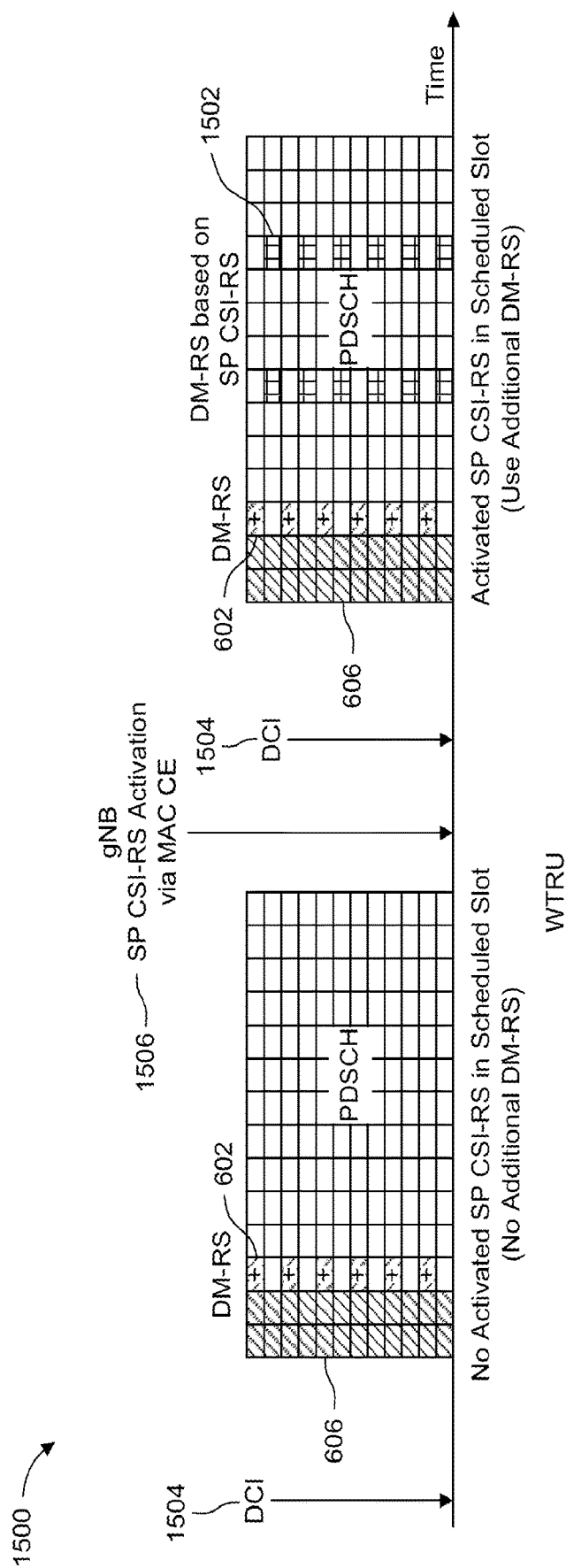
FIG. 15 shows an example of an additional DM-RS with an SP CSI-RS.

FIG. 15 shows an example 1500 of an additional DM-RS with an SP CSI-RS.

A WTRU 102 may determine an additional DM-RS 1502, for example, based on a semi-persistent (SP) CSI-RS.

A WTRU 102 may determine an additional DM-RS 1502, for example, based on an SP CSI-RS activation/deactivation 1506. For example, a WTRU 102 may receive one or more RRC messages comprising a plurality of CSI-RS resource sets for an additional DM-RS 1502. The one or more RRC messages may indicate a group of CSI-RS resource sets (e.g., of the plurality of CSI-RS resource sets) for an additional DM-RS 1502. The WTRU 102 may (e.g., based on the group of CSI-RS resource sets) receive one or more MAC CE messages activating/deactivating the group of CSI-RS resource sets. The WTRU 102 may receive a DCI 1504 scheduling a PDSCH or PUSCH. The WTRU 102 may (e.g., based on the activation of the group of CSI-RS resource sets) determine whether the group of CSI-RS resource sets are available for additional DM-RS 1502. In an example, the WTRU 102 may receive the group of CSI-RS resource sets for an additional DM-RS, for example, if the group of CSI-RS resource sets are activated in the slot scheduled for PDSCH.

A WTRU 102 may determine whether to use an additional DM-RS 1502, for example, based on one or more of an activation 1506 of an SP CSI-RS, a scheduled modulation and coding scheme (MCS) of data (e.g., a PDSCH or PUSCH), and a DCI.

In an example, an MCS of the scheduled PDSCH or PUSCH may be used for a WTRU 102 determination whether to use an additional DM-RS 1502. For example, the group of CSI-RS resource sets may be activated and the MCS of the scheduled PDSCH or PUSCH may be above a threshold. The WTRU 102 may (e.g., based on the activation and the MCS exceeding the threshold) receive the group of CSI-RS resource sets for an additional DM-RS (e.g., 1302, 1402, 1502) and/or the group of CSI-RS resource sets for an additional DM-RS (e.g., 1302, 1402, 1502) may be present in the associated/scheduled PDSCH or PUSCH.

In an (e.g., additional and/or alternative) example, explicit signaling may be used to indicate allocation of an additional DM-RS. For example, the group of CSI-RS resource sets may be activated and the DCI 1504 scheduling PDSCH/PUSCH may indicate to receive the group of CSI-RS resource sets as an additional DM-RS. The WTRU 102 may (e.g., based on the activation and the indication) receive the one or more CSI-RS resource sets as an additional DM-RS and/or the group of CSI-RS resource sets for an additional DM-RS may be present in the associated/scheduled PDSCH or PUSCH.

FIG. 16 shows an example of a CSI report config for an additional DM-RS based on a CSI-RS.

A WTRU 102 may determine whether to use an additional DM-RS (e.g., 1302, 1402, 1502), for example, based on a CSI report config (e.g., reportQuantity='none'). In an example of an additional DM-RS (e.g., 1302, 1402, 1502) based on a CSI-RS, a CSI report may not be supported. For example, a WTRU 102 may receive RRC messages comprising a report quantity in a CSI report config. The WTRU 102 may (e.g., in order to receive an additional DM-RS or transmit an additional DM-RS) receive RRC messages comprising a report quantity as 'none,' for example, as shown in FIG. 16.

A WTRU 102 may determine CSI reporting for an additional DM-RS.

A WTRU 102 may determine CSI reporting for a PDSCH transmission with an additional DM-RS. In an example, a WTRU 102 may report CSI reporting that is optimized for a PDSCH transmission with an additional DM-RS. A WTRU 102 may receive one or more RRC messages to configure optimized CSI reporting with an additional DM-RS. For example, a WTRU 102 may receive RRC messages for one or more CSI reporting configurations indicating optimized CSI reporting with an additional DM-RS. The WTRU 102 may (e.g., based on the one or more of CSI reporting configurations) report the optimized CSI reporting, for example, if the one or more of CSI reporting configurations are configured, activated and/or triggered.

A WTRU 102 may determine CQI based on an additional DM-RS.

CQI reporting may support an additional DM-RS, for example, for optimized CSI reporting with an additional DM-RS. A WTRU 102 may receive one or more RRC messages indicating CQI reporting that assumes an additional DM-RS. For example, a parameter 'reportQuantity' indicating a 'CQI with an additional DM-RS' may be supported. A parameter 'cqi-Table' indicating a CQI table for additional DM-RS may be supported. The parameter 'cqi-Table' indicating a CQI table for an additional DM-RS may comprise, for example, 'table4.' A WTRU 102 may (e.g., based on the indication) report CSI reporting comprising CQI reporting assuming an additional DM-RS, e.g., via Physical Uplink Control CHannel (PUCCH) and/or PUSCH. A WTRU 102 may (e.g., based on the one or more RRC messages) assume DM-RS channel estimation performance with an additional DM-RS. The WTRU 102 may (e.g., based on the assumption) determine one or more CQIs that satisfy a certain block error rate (BLER) (e.g., 10%) and may report the CQIs to a gNB 180. The one or more of CQIs may comprise CQIs that assume an additional DM-RS and/or CQIs without an additional DM-RS. A WTRU 102 may report a preference, for example, if the WTRU 102 reports only CQIs that assume an additional DM-RS. For example, a WTRU 102 may report 'PDSCH without additional DM-RS' or 'PDSCH with additional DM-RS'. A WTRU 102 may (e.g., to support CQI reporting assuming an additional DM-RS) receive one or more RRC messages that (e.g., further) comprise one or more CSI-RS resource sets (e.g., to measure channel estimation performance of an additional DM-RS).

In an example, a CQI may be derived, determined, and/or calculated, for example, based on a DM-RS density configured, determined, and/or used for the corresponding physical channel (e.g., PDSCH). For example, a CQI_offset may be used to adjust a determined CQI value without considering DM-RS density. The CQI_offset value may be determined, for example, based on DM-RS density. One or more of the following may apply.

The CQI_offset may be used to adjust the CQI value determined without considering DM-RS density. For example, a first CQI value may be determined based on the measurement reference signal. The second CQI may be determined as a function of the first CQI value. The CQI_offset may be determined based on the DM-RS density (e.g., the second CQI value=the first CQI value−CQI_offset) . The second CQI value may be reported. The first CQI value may be referred to as a first type of CQI (e.g., and/or as a normal CQI) and the second CQI value may be referred to as a second type of CQI (e.g., and/or as a DM-RS density dependent CQI). A CQI_offset value may be larger, for example, when the DM-RS density is lower. A CQI_offset value may be configured, for example, per DM-RS density level.

DM-RS density may be based on at least one of the following: (i) whether the additional DM-RS is used; (ii) the number of OFDM symbols used for DM-RS; (iii) a DM-RS configuration type (e.g., type-1 or type-2); (iv) subcarrier spacing; and/or (v) an operating frequency band.

A gNB 180 may configure or dynamically indicate which type of CQI is used (e.g., a normal CQI or a DM-RS density dependent CQI).

A WTRU 102 may determine an additional DM-RS pattern. A WTRU 102 recommendation of an additional DM-RS pattern may be supported, for example, for optimized CSI reporting with an additional DM-RS. A WTRU 102 may receive one or more RRC messages indicating a WTRU 102 recommendation of an additional DM-RS pattern. For example, a parameter 'reportQuantity' indicating 'Additional DM-RS Pattern Index (ADPI)' may be supported. Other parameter names may be used, such as, without limitation, DM-RS Pattern Index (DPI), DM-RS Index (DRI), etc. A WTRU 102 may (e.g., based on the indication) receive one or more RRC messages, which may comprise a plurality of CSI-RS resource sets, e.g., as candidates for additional DM-RS patterns. A WTRU 102 may (e.g., based on the plurality of CSI-RS resource sets) determine one or more CSI-RS resource sets (e.g., of the plurality of CSI-RS resource sets) and report the determined one or more CSI-RS resource sets to a gNB 180. One or more indices may be based on a CSI-RS resource set ID of the plurality of CSI-RS resource sets, for example, when the WTRU 102 reports the one or more CSI-RS resource sets. For example, mapping between the one or more indices and the plurality of CSI-RS resource sets may be based on an order of CSI-RS resource IDs of the plurality of CSI-RS resource sets (e.g., lowest ID first or highest ID first). In an (additional and/or alternative) example, one of the one or more indices may be reserved for 'no additional DM-RS'. For example, index 0 of the one or more indices may be reserved for 'no additional DM-RS'. A gNB 180 may (e.g., based on the reported index) determine an additional DM-RS pattern and may indicate the additional DM-RS pattern to the WTRU 102.

A WTRU 102 may determine a WTRU capability report for an additional DM-RS. A WTRU 102 may recommend an additional DM-RS pattern, density, and/or MCS. In an example, a WTRU 102 may report WTRU capability for an additional DM-RS to a gNB 180. For example, a WTRU 102 may transmit one or more RRC messages indicating one or more of additional DM-RS patterns, additional DM-RS density, and/or one or more MCSs for an additional DM-RS. For example, a WTRU 102 may report additional DM-RS patterns and additional DM-RS density to receive a PDSCH considering implementation of the WTRU 102. For example, the WTRU 102 may report the MCS indicating the lowest MCSs that may require an additional DM-RS for a PDSCH reception. A WTRU 102 may report pairs of one or more of an MCS, additional DM-RS patterns, and/or additional DM-RS density. Each pair may indicate, for example, a lowest MCS for the reported additional DM-RS pattern and additional DM-RS density. A gNB 180 may (e.g., based on a WTRU capability report) schedule a PDSCH and/or a PUSCH with an additional DM-RS.

A WTRU 102 may determine an additional DM-RS, for example, based on an SRS. An additional DM-RS (e.g., in addition to a PDSCH DM-RS and/or a PUSCH DM-RS) may be supported. The additional DM-RS may be located, for example, in SCSs that may not have DM-RS ports for a PDSCH and/or a PUSCH to provide enhanced channel estimation performance in the frequency domain. In an example, an AP CSI-RS based additional DM-RS may be supported. For example, an explicit AP CSI-RS trigger or an implicit AP CSI-RS trigger (e.g., via a CSI request field) may be supported in a UL DCI (e.g., in DCI format 0_0, DCI format 0_1, or DCI format 0_2) and/or in a DL DCI (e.g., in DCI format 1_0, DCI format 1_1 or DCI format 1_2). A WTRU 102 may receive a DCI that schedules PDSCH and indicates an AP CSI-RS trigger for an additional DM-RS from a gNB 180. The WTRU 102 may (e.g., based on the DCI) receive and decode the PDSCH with an additional DM-RS.

A WTRU 102 may determine an additional DM-RS configuration, for example, based on an SRS. For example, a WTRU 102 may receive RRC messages comprising a plurality of SRS resource sets. A WTRU 102 may (e.g., based on the plurality of SRS resource sets) receive RRC messages comprising a group of the plurality of SRS resource sets for an additional DM-RS configuration. For example, the WTRU 102 may receive RRC messages indicating usage in the group of the plurality of SRS resource sets as an additional DM-RS, for example, as shown in FIG. 17. In an (e.g., additional and/or alternative) example, the WTRU 102 may receive RRC messages comprising additional DM-RS in one or more SRS resource sets of the plurality of SRS resource sets. A WTRU 102 may (e.g., based on the RRC messages comprising additional DM-RS) receive explicit and/or implicit signaling, e.g., to trigger an additional DM-RS to receive a PDSCH or a transmit PUSCH. The configuration may have many different names. Other names for an additional DM-RS may include, for example, a supplementary DM-RS, a frequency tracking RS, a DM-RS based on CSI-RS, etc.

FIG. 17 shows an example configuration for an additional DM-RS based on an SRS resource set.

In examples, an additional DM-RS configuration based on one or more SRS resource sets may be used, supported, and/or allowed, for example, with at least one of the following restrictions: subcarrier spacing, an operating frequency band, usage, a WTRU capability, a number of antenna ports for an SRS, and/or a modulation order used for an associated channel.

In an example of subcarrier spacing as a restriction, an additional DM-RS may be configurable, used, and/or supported, for example, if the subcarrier spacing of a channel (e.g., DL/UL physical channels) is larger than a threshold (e.g., X kHz), where the threshold may be predefined or configured.

In an example of an operating frequency band as a restriction, an additional DM-RS may be configurable, used, and/or supported, for example, if the operating frequency band is higher than a threshold (e.g., Y GHz), where the threshold may be predefined or configured.

In an example of usage as a restriction, an additional DM-RS may be configurable, used, and/or supported, for example, if a first usage (e.g., additional DM-RS) is used (e.g., otherwise, the additional DM-RS may not be supported, and/or used).

In an example of a WTRU capability as a restriction, a WTRU 102 may indicate whether it does or does not support an additional DM-RS.

In an example of a number of antenna ports for an SRS as a restriction, an SRS resource may be used as an additional DM-RS, for example, if the number of antenna ports of the SRS resource is larger than a threshold (e.g., 4), where the threshold may be predefined or configured.

In an example of a modulation order used for an associated channel as a restriction, an additional DM-RS may be used or supported, for example, if a modulation order used for a channel (e.g., PUSCH) is higher than a threshold.

FIG. 18 shows an example 1800 of an additional DM-RS with an AP SRS for a PUSCH.

A WTRU 102 may determine an additional DM-RS 1802, for example, based on an AP SRS.

A WTRU 102 may determine an additional DM-RS 1802, for example, based on an SRS trigger in a DCI 1804. For example, a WTRU 102 may (e.g., based on the plurality of SRS resource sets) receive RRC messages comprising a plurality of SRS resource sets for an additional DM-RS 1802. The WTRU 102 may receive RRC messages comprising a group of the plurality of SRS resource sets for an AP SRS request field. The WTRU 102 may (e.g., based on the group of the plurality of SRS resource sets) receive a DCI 1804 that schedules a PDSCH/PUSCH and triggers one or more SRS resource sets of the group. A WTRU 102 may (e.g., for a DCI scheduling a PDSCH) receive and decode a PDSCH with the additional DM-RS 1802 based on an AP SRS. A WTRU 102 may (e.g., for a DCI scheduling a PUSCH) transmit a PUSCH with the additional DM-RS 1802 based on the DCI 1804.

FIG. 19 is an example 1900 of an additional DM-RS with an SP SRS for a PDSCH decoding.

A WTRU 102 may determine an additional DM-RS 1902, for example, based on an SP SRS. A WTRU 102 may determine an additional DM-RS 1902, for example, based on an SP SRS activation/deactivation 1906. A determination may be made, for example, based on combinations of an activation 1906 of an SP SRS, a scheduled MCS of data (e.g., a PDSCH or PUSCH) and/or a DCI.

For example, a WTRU 102 may receive RRC messages comprising a plurality of SRS resource sets for an additional DM-RS 1902. A group of SRS resource sets of the plurality of SRS resource sets may comprise SRS resource sets for an additional DM-RS 1902. A WTRU 102 may (e.g., based on the group of SRS resource sets) receive MAC CE messages activating/deactivating the group of SRS resource sets. The WTRU 102 may receive a DCI 1904 that schedules a PDSCH or PUSCH. The WTRU 102 may (e.g., based on the activation of the group) determine whether one or more of the SRS resource sets of the group are or are not available for an additional DM-RS 1902. For example, the WTRU 102 may use one or more SRS resource sets for an additional DM-RS 1902, for example, if the one or more SRS resource sets are activated in the slot scheduled for a PDSCH. MCS of the scheduled PDSCH or PUSCH may be considered (e.g., in addition to the activation). In an example, a WTRU 102 may use one or more of SRS resource sets for an additional DM-RS 1902, for example, when one or more SRS resource sets of the group are activated and the MCS of the scheduled PDSCH or PUSCH is above a threshold. Explicit signaling to indicate allocation of additional DM-RS 1902 may be used (e.g., in addition to the activation).

In an example, a WTRU 102 may use one or more SRS resource sets as an additional DM-RS 1902, for example, if one or more SRS resource sets of the group are activated and the DCI 1904 indicates to use the one or more of SRS resource sets as an additional DM-RS 1902.

A WTRU 102 may determine an additional DM-RS, for example, based on dynamic signaling. Additional DM-RS (e.g., in addition to a PDSCH DM-RS and/or a PUSCH DM-RS) may be supported. One or more dynamic signals may indicate a group of RSs in one or more scheduled slots as an additional DM-RS. In an example, the one or more dynamic signals may be based on a DCI. For example, a WTRU 102 may receive a DCI indicating whether the group of RSs are or are not used as an additional DM-RS. In an (additional and/or alternative) example, the one or more dynamic signals may be based on a MAC CE. For example, a WTRU 102 may receive one or more MAC CE messages indicating whether the group of RS are activated or deactivated as an additional DM-RS.

A WTRU 102 may determine an additional DM-RS configuration, for example, based on dynamic signaling. In an example, a dynamic indication may determine a functionality of a reference signal located in a slot. For example, a reference signal may be configured and transmitted in a slot in a periodic, aperiodic, or semi-persistent (SP) manner. A WTRU 102 may be indicated (e.g., via a DCI and/or MAC CE) how to use the reference signal located in the slot. For example, the functionality of the reference signal located or transmitted in a slot may be determined by a dynamic indication in a DCI and/or one or more MAC CE messages. The indication may determine the reference signal's functionality, which may include, for example, at least one of time/frequency tracking, synchronization (sync), phase noise tracking, CSI measurement, demodulation, sounding, and positioning.

A DCI, which may indicate the functionality of a reference signal located in a slot #n, may be monitored or received in the same slot #n. A DCI may (e.g., additionally or alternatively) be received or monitored in a slot (e.g., slot #n−x, where x may be a non-negative integer number) to schedule an associated PDSCH transmission in the slot #n.

One or more MAC CE messages, which may indicate activation/deactivation of the functionality of a reference signal located in or after slot #n, may be received or monitored in a slot (e.g., slot #n–x, where x may be a non-negative integer number).

The set of functionalities for a reference signal may be pre-configured. One or more of the functionalities configured may be indicated in the associated DCI or MAC CE. In an (e.g., additional or alternative) example, two types of functionalities may be used (e.g., measurement and/or demodulation).

Dynamic determination of the functionality of a reference signal may be used (e.g., only) for a certain type of reference signal (e.g., CSI-RS and/or SRS).

FIG. 20 shows an example 2000 of an additional DM-RS with a DCI.

A WTRU 102 may determine an additional DM-RS 2002, for example, based on a DCI 2004.

A WTRU 102 may determine an additional DM-RS 2002, for example, based on a DCI indication (e.g., associate all RSs in a scheduled slot with a DM-RS). Dynamic signaling may be used to support an indication that a group of RSs or all RSs (e.g., CSI-RS 2006 and/or TRS 2008) in a scheduled slot are used as an additional DM-RS 2002. In an example, a WTRU 102 may receive a DCI 2004 that (i) indicates a group of RSs or all RSs in a scheduled slot are used as an additional DM-RS 2002 and/or (ii) schedules a PDSCH/PUSCH. For example, value 0 may indicate that no RS in the scheduled slot is used for an additional DM-RS 2002 and value 1 may indicate that the group of RSs or all RSs in the scheduled slot is/are used for an additional DM-RS 2002. FIG. 20 shows an example operation based on an indication by a DCI 2004 whether the group of RSs or all RSs in the scheduled slot are or are not used for an additional DM-RS 2002. As shown in FIG. 20, the WTRU 102 may (e.g., before receiving the indication) receive all RSs for their own functionality. For example, the WTRU may measure TRS 2008 in a normal slot for fine time/frequency synchronization. In an (e.g., additional or alternative) example, the WTRU may measure CSI-RS 2006 in a normal slot to measure a CSI. The WTRU 102 may use TRS 2008 and CSI-RS 2006 in the scheduled slot as an additional DM-RS 2002, for example, if the WTRU 102 receives the DCI 2004 indicating a group of RSs or all RSs in the scheduled slot is/are used for an additional DM-RS 2002.

A WTRU 102 may determine whether to ignore a configured RS, for example, based on a group DCI indication. A WTRU 102 may receive an indication (e.g., in a DCI) that a group of RSs and/or all RSs in a scheduled slot are used for an additional DM-RS 2002. An indication may be provided to other WTRUs that are using the group of RSs or all RSs in the scheduled slot. For example, a TRS 2008 may be a cell-specific RS to synchronize time/frequency. WTRUs 102a-d (e.g., all WTRUs) in the same cell may share a TRS. A CSI-RS 2006 may be a cell-specific RS, e.g., to measure a non-precoded channel. Other WTRUs may (e.g., in response to the indication) measure the RSs with a different analog beam and/or wireless channel and may assume the RSs are in same analog beam and/or wireless channel. The assumption may cause significant error in time/frequency synchronization. A CSI-RS 2006 (e.g., similar to a TRS 2008) with a different analog beam and/or wireless channel may cause significant error in a CSI measurement and CSI processing. Errors may be prevented, for example, by an indication (e.g., from a gNB 180) not to measure the RSs. For example, WTRUs (e.g., other than the WTRU that receives the scheduling DCI) may receive an indication that a group of RSs and/or all RSs in the scheduled slot are not used for measurement. For example, the WTRUs may not measure or may ignore a TRS 2008 in the slot for time/frequency synchronization. For example, the WTRUs may not measure or may ignore a CSI-RS 2006 in the slot for a CSI measurement. The DCI to the WTRUs may be a group DCI. A plurality of WTRUs may receive information simultaneously, for example, by using a group DCI.

FIG. 21 shows an example 2100 of an additional DM-RS with a MAC CE.

A WTRU 102 may determine an additional DM-RS 2102, for example, based on a MAC CE. A WTRU 102 may determine an additional DM-RS 2102, for example, based on a MAC CE activation/deactivation 2104a/2104b. In an example, a WTRU 102 may receive an activation/deactivation MAC CE 2104a/2104b, which may indicate that a group of RSs or all RSs in one or more scheduled slots are used as an additional DM-RS 2002. FIG. 21 shows an example operation based on the activation/deactivation MAC CE 2104a/2104b indicating a group of RSs or all RSs in the one or more scheduled slots are used as additional DM-RS 2102. As shown in FIG. 21, a WTRU 102 may (e.g., before receiving a MAC CE indicating activation of an additional DM-RS) receive the group of RSs and/or all RSs (e.g., CSI-RS 2106 and/or TRS 2108) for their own functionality. For example, the WTRU 102 may measure TRS 2108 in a normal slot for fine time/frequency synchronization. In an (e.g., additional or alternative) example, the WTRU 102 may measure CSI-RS 2106 in a normal slot to measure CSI. The WTRU 102 may use a TRS 2108 and a CSI-RS 2106 in a scheduled slot as an additional DM-RS 2102 (e.g., until the WTRU 102 receives a deactivation MAC CE 2104b from a gNB 180), for example, if the WTRU 102 receives an activation MAC CE 2104a indicating a group of RSs or all RSs in the scheduled slot is/are used for an additional DM-RS 2102. A WTRU 102 may (e.g., when the WTRU 102 does not receive a PDSCH for the gNB 180) not measure the group of RSs and/or all RSs, for example, to allow other WTRUs to use the group of RSs and/or all RSs for an additional DM-RS 2102. A WTRU 102 may (e.g., after receiving the deactivation MAC CE 2104b) receive the group of RSs and/or all RSs for their own functionality again.

A WTRU 102 may determine a measurement based on an RS type.

A WTRU 102 may make one or more determinations based on an RS type. For example, a WTRU 102 may determine an additional DM-RS 2102 based on RS type. A WTRU 102 may receive dynamic signaling (e.g., a DCI and/or a MAC CE), which may indicate a group of RSs and/or all RSs in one or more slots are used as an additional DM-RS 2102. The indication may be based on a type of RS. For example, RS types may be configured per RS resource, RS resource set, etc. In an example, RS types (e.g., flexible or fixed) may be configured.

An RS may be used for its own functionality (e.g., regardless of indication), for example, if an RS type of an RS indicates fixed. A TRS (e.g., 2008, 2108) may be used for fine time/frequency tracking (e.g., regardless of the dynamic signaling), for example, if a TRS (e.g., 2008, 2108) indicates fixed as an RS type. An RS may be used for an additional DM-RS 2102, for example, if an RS type is flexible. A TRS may be used for an additional DM-RS 2102 based on the dynamic signaling, for example, if a TRS (e.g., 2008, 2108) indicates flexible as an RS type.

A WTRU may determine a measurement of an RS based on an RS type. One or more WTRUs may receive dynamic signaling (e.g., a DCI or a MAC CE) not to measure a group of RSs and/or all RSs in one or more slots. The indication may be based on a type of RS. In an example, RS types (e.g., flexible or fixed) may be configured.

An RS may not be measured for its own functionality (e.g., regardless of the dynamic signaling), for example, if an RS type of an RS indicates fixed. A TRS (e.g., 2008, 2108) may be measured (e.g., regardless of the dynamic signaling), for example, if a TRS (e.g., 2008, 2108) indicates fixed as an RS type. An RS may not be used for its own functionality, for example, if the RS type is flexible. A TRS (e.g., 2008, 2108) may not be used for fine time/frequency tracking based on the dynamic signaling, for example, if a TRS (e.g., 2008, 2108) indicates flexible as an RS type.

A WTRU 102 may determine a higher density DM-RS. A density of RSs in the frequency domain may be inversely proportional as SCS increases. A low RS density may decrease channel estimation performance in the frequency domain. Higher density DM-RS may be supported, for example, by one or more of the following solutions that may be supported by a gNB 180 and/or a WTRU: (i) higher density DM-RS for type-1 and type-2 DM-RS with REs for other DM-RS ports, (ii) higher density DM-RS with symbols other than DM-RS (e.g., adjacent or non-adjacent), (iii) frequency hopping of additional DM-RS, (iv) DM-RS ports aggregation, and/or (v) PT-RS enhancement for enhanced channel estimation performance in the frequency domain.

A WTRU 102 may determine a configuration and/or a triggering of a higher density DM-RS.

A WTRU 102 may make a determination based on an RRC. In an example, a configuration of a higher density DM-RS may be based on one or more RRC messages. For example, a WTRU 102 may receive one or more RRC messages indicating a configuration of a higher density DM-RS, e.g., for PDSCH and/or PUSCH. A WTRU 102 may (e.g., based on the configuration) receive a higher density DM-RS for receiving PDSCH and/or transmitting PUSCH.

A WTRU 102 may make a determination based on an MCS in an RRC configuration. In an example, configuration of a higher density DM-RS may be based on an MCS. For example, a WTRU 102 may receive one or more RRC messages indicating a configuration of a higher density DM-RS for PDSCH and/or PUSCH. A WTRU 102 may (e.g., based on the configuration) receive the one or more RRC messages indicating one or more MCS as thresholds of a higher density DM-RS. The WTRU 102 may (e.g., based on the one or more MCSs) determine whether to use a higher density DM-RS. The WTRU 102 may make a determination (e.g., when the WTRU 102 receives a DCI scheduling PDSCH and/or PUSCH) to use higher density DM-RS, for example, if the scheduled MCS is lower or higher than one or more of the thresholds.

A WTRU 102 may make a determination based on a frequency band. In an example, configuration of a higher density DM-RS may be based on a frequency band. For example, a WTRU 102 may (e.g., when the WTRU 102 receives a DCI scheduling PDSCH and/or PUSCH) determine whether to use a higher density DM-RS, e.g., based on a scheduled frequency band. A WTRU 102 may receive on the PDSCH or transmit on the PUSCH (e.g., based on a higher density DM-RS), for example, if the WTRU 102 receives a cross scheduling DCI in FR1 to schedule a PDSCH/PUSCH transmission above 52.6 GHz. A WTRU 102 may receive on the PDSCH or transmit on the PUSCH (e.g., based on a higher density DM-RS), for example, if the WTRU 102 receives a scheduling DCI above 52.6 GHz to schedule a PDSCH/PUSCH transmission above 52.6 GHz.

A WTRU 102 may make a determination based on system bandwidth and/or a bandwidth part size. In an example, configuration of a higher density DM-RS may be based on system bandwidth and/or a bandwidth part (BWP) size. A WTRU 102 may determine whether to use a higher density DM-RS (e.g., based on system bandwidth and/or BWP size), for example, if the WTRU 102 receives a DCI that schedules a PDSCH and/or PUSCH. A WTRU 102 may receive PDSCH or transmit PUSCH (e.g., based on a higher density DM-RS), for example, if the WTRU 102 receives a cross scheduling DCI in FR1 to schedule a PDSCH/PUSCH transmission in system bandwidth or a BWP size larger than a specific bandwidth. In an example, a WTRU 102 may receive one or more RRC messages indicating the specific bandwidth. In an (e.g., alternative or additional) example, the WTRU 102 may report the specific bandwidth via WTRU capability. In an (e.g., alternative or additional) example, the specific bandwidth may be predetermined.

A WTRU 102 may make a determination based on an SCS. In an example, configuration of a higher density DM-RS may be based on an SCS. A WTRU 102 may determine whether to use a higher density DM-RS based on a scheduled SCS, for example, if the WTRU 102 receives a DCI scheduling a PDSCH and/or PUSCH. A WTRU 102 may receive PDSCH or transmit PUSCH based on a higher density DM-RS, for example, if the WTRU 102 receives a DCI scheduling PDSCH/PUSCH with an SCS above an SCS threshold (e.g., 480 or 960 kHz). In an example, a WTRU 102 may receive one or more RRC messages indicating the SCS threshold. In an (e.g., alternative or additional) example, the WTRU 102 may report the SCS threshold via a WTRU capability. In an (e.g., alternative or additional) example, the SCS threshold may be predetermined.

A WTRU 102 may make a determination based on a DCI. In an example, configuration of a higher density DM-RS may be based on a DCI.

A WTRU 102 may make a determination based on an explicit indication field in a DCI. A WTRU 102 may determine whether to use a higher density DM-RS, for example, if the WTRU 102 receives a DCI indicating PDSCH reception with a higher density DM-RS and/or a PUSCH transmission with a higher density DM-RS. A WTRU 102 may receive PDSCH or transmit PUSCH without a higher density DM-RS, for example, if the DCI field for a higher density DM-RS indicates 0. A WTRU 102 may receive and/or transmit PUSCH with a higher density DM-RS, for example, when the DCI field for higher density DM-RS indicates 1.

A WTRU 102 may make a determination based on a priority indication field in a DCI. In an example, configuration of higher density DM-RS may be based on a priority indication field in a DCI. For example, a WTRU 102 may receive a DCI scheduling PDSCH/PUSCH with a priority indication. The WTRU 102 may determine whether to use a higher density DM-RS, for example, based on the priority indication.

A WTRU 102 may receive PDSCH and/or transmit PUSCH with a higher density DM-RS, for example, if the WTRU 102 receives a priority indication lower than a specific number (e.g., a threshold). A WTRU 102 may receive PDSCH and/or transmit PUSCH without a higher density DM-RS, for example, if the WTRU 102 receives a priority indication higher than a specific number (e.g., a threshold). In an example, the WTRU 102 may receive one or more RRC messages indicating the specific number of the priority indication. In an (e.g., additional or alternative) example, the WTRU 102 may report the specific number of the priority indication, e.g., via a WTRU capability. In an (e.g., additional or alternative) example, the specific number of the priority indication may be predetermined.

A WTRU 102 determination may be based on an antenna port(s) field in a DCI. In an example, configuration of a higher density DM-RS may be based on an antenna port(s) field in a DCI. For example, a WTRU 102 may receive a DCI scheduling PDSCH with a higher density DM-RS and/or PUSCH transmission with a higher density DM-RS, e.g., based on a defined antenna port(s) field. The antenna port(s) field may be based on a table defined for a higher density DM-RS (e.g., type-3 DM-RS) and/or a DM-RS antenna port(s) indication table.

FIG. 22 shows an example 2200 of a defined antenna port(s) indication table for a higher density DM-RS.

A WTRU 102 determination may be based on a defined antenna port(s) field in DCI. FIG. 22 shows an example of a defined antenna port(s) indication table for a higher density DM-RS. As shown in FIG. 22, a table for a higher density DM-RS may be defined. A WTRU 102 may receive one or more RRC messages indicating a defined table for a higher density DM-RS. A WTRU 102 may (e.g., based on the defined table) receive PDSCH and/or PUSCH scheduling with a higher density (e.g., 2) DMRS.

FIG. 23 is an example 2300 of an antenna port(s) indication table for normal density and higher density DM-RS based on an antenna port(s) indication table.

A WTRU 102 determination may be based on an expanded antenna port(s) field in a DCI. FIG. 23 is a table that shows an example of a second set of antenna port(s) based on a first set of antenna port(s). The antenna port(s) table for higher density DM-RS may comprise DM-RS ports for a higher density DM-RS in reserved values of the antenna port(s) table for a single symbol type-1 DM-RS. As shown in FIG. 23, reserved values 12-14 may be used as DM-RS port(s) 0 and/or 1 with higher density DM-RS (e.g., 2).

A WTRU 102 determination may be based on combinations of configuration methods. Configuration of a higher density DM-RS may be based on combinations of configuration methods (e.g., as described herein).

A WTRU 102 determination may be based on an RRC and a DCI. In an example, a configuration may be based on RRC messages and a DCI indication. For example, a WTRU 102 may receive one or more RRC messages indicating a configuration of a higher density DM-RS for PDSCH and/or PUSCH. A WTRU 102 may (e.g., based on the configuration) receive a DCI indicating a PDSCH reception with a higher density DM-RS or a PUSCH transmission with a higher density DM-RS, e.g., based on an antenna port(s) field. A WTRU 102 may (e.g., based on the configuration and the indication) receive a PDSCH with a higher density DM-RS and/or transmit PUSCH with a higher-density DM-RS.

A WTRU 102 determination may be based on an SCS and a DCI. In an example, a configuration may be based on an SCS and a DCI indication. For example, a WTRU 102 may receive a DCI scheduling PDSCH/PUSCH with an SCS above an SCS threshold (e.g., 480 or 960 kHz). The DCI may indicate whether to use a higher density DM-RS for receiving PDSCH and/or transmitting PUSCH. A WTRU 102 may (e.g., based on the SCS and the indication) receive a PDSCH with a higher density DM-RS and/or transmit PUSCH with a higher-density DM-RS.

A WTRU 102 may determine a higher density DM-RS for a (e.g., single symbol) type-1 DM-RS.

Figure 24:
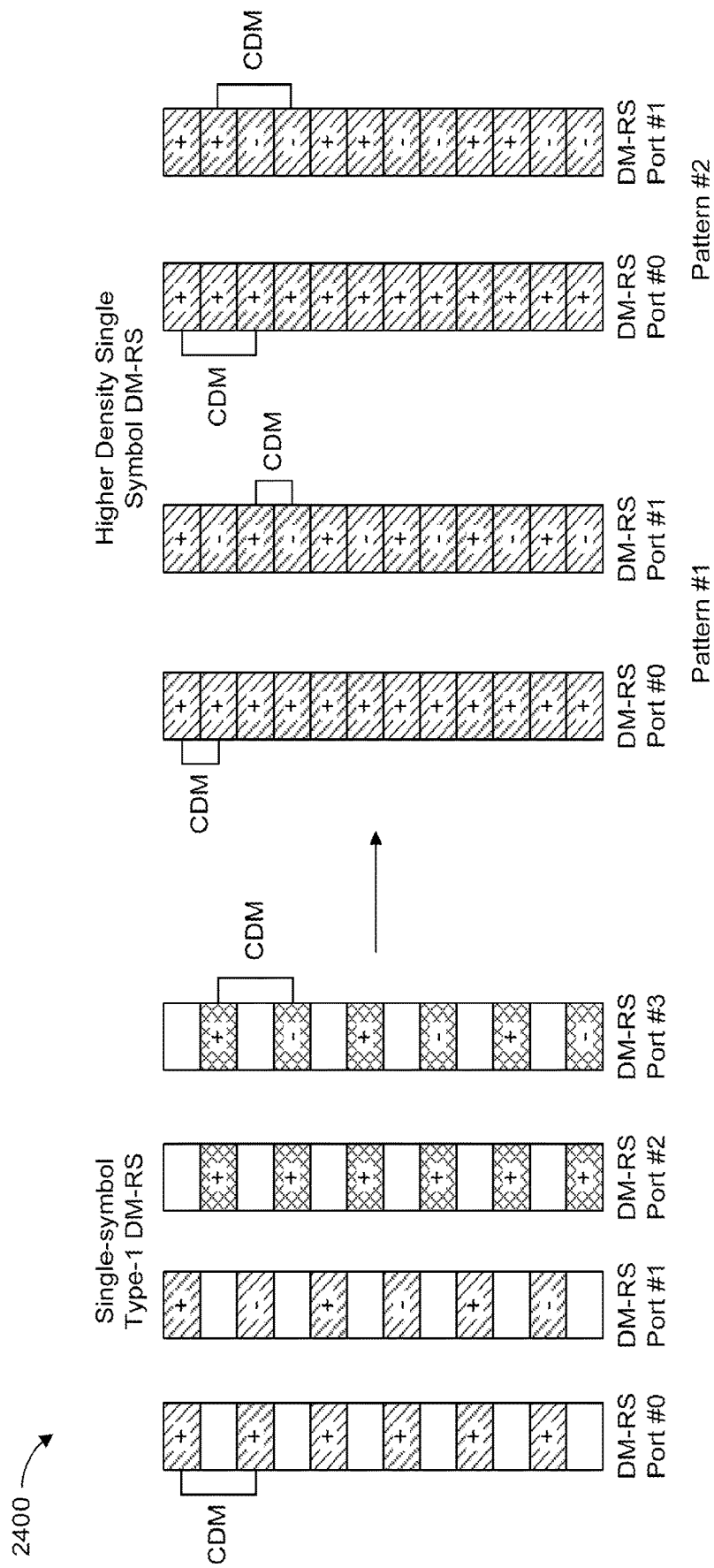
FIG. 24 shows an example of higher DM-RS density with a single-symbol type 1 DM-RS.

A WTRU 102 may determine REs for a single-symbol type-1 DM-RS. REs for other DM-RS ports in a DM-RS may be used for scheduled DM-RS ports, for example, to support higher density DM-RS. In an example, REs of other DM-RS ports may be used for scheduled DM-RS ports, for example, to achieve better channel estimation performance in the frequency domain. FIG. 24 shows examples of a higher density DM-RS with a type-1 single-symbol DM-RS. As shown in FIG. 24, REs for DM-RS port #2 and #3 may be used for DM-RS port #0 and #1. Port numbers (e.g., DM-RS port #0 and #1) for higher density DM-RS used in examples herein may have different numbers (e.g., DM-RS port #4 and #5).

FIG. 24 shows an example 2400 of higher DM-RS density with a single-symbol type 1 DM-RS.

A WTRU 102 may determine code-division multiplexing (CDM) for a single-symbol type-1 DM-RS. As shown by the example 2400 in FIG. 24, multiple (e.g., two) CDM mappings (e.g., pattern #1 and pattern #2) for higher DM-RS density of single-symbol type-1 DM-RS may be provided. Pattern #1 may support CDM between consecutive REs in the frequency domain (e.g., as well as single-symbol type-1 DM-RS). Pattern #1 may be easier to implement, for example, if pattern #1 allocates codes with adjacent REs and/or does not need to use memory. Pattern #1 may not support coexistence between a single-symbol type-1 DM-RS ports and single-symbol higher density DM-RS ports, for example, since CDM sequences of single-symbol type-1 DM-RS ports and single-symbol higher density DM-RS ports may not be orthogonal.

Pattern #1 may support CDM with consecutive REs. Pattern #2 may support CDM based on a comb (e.g., a comb-like pattern) with 1 RE spacing. Pattern #1 may not support orthogonal multiplexing between single-symbol type-1 DM-RS ports and single-symbol high density DM-RS ports. Pattern #2 may support orthogonal multiplexing between DM-RS ports and single-symbol high density DM-RS ports.

Figure 25:
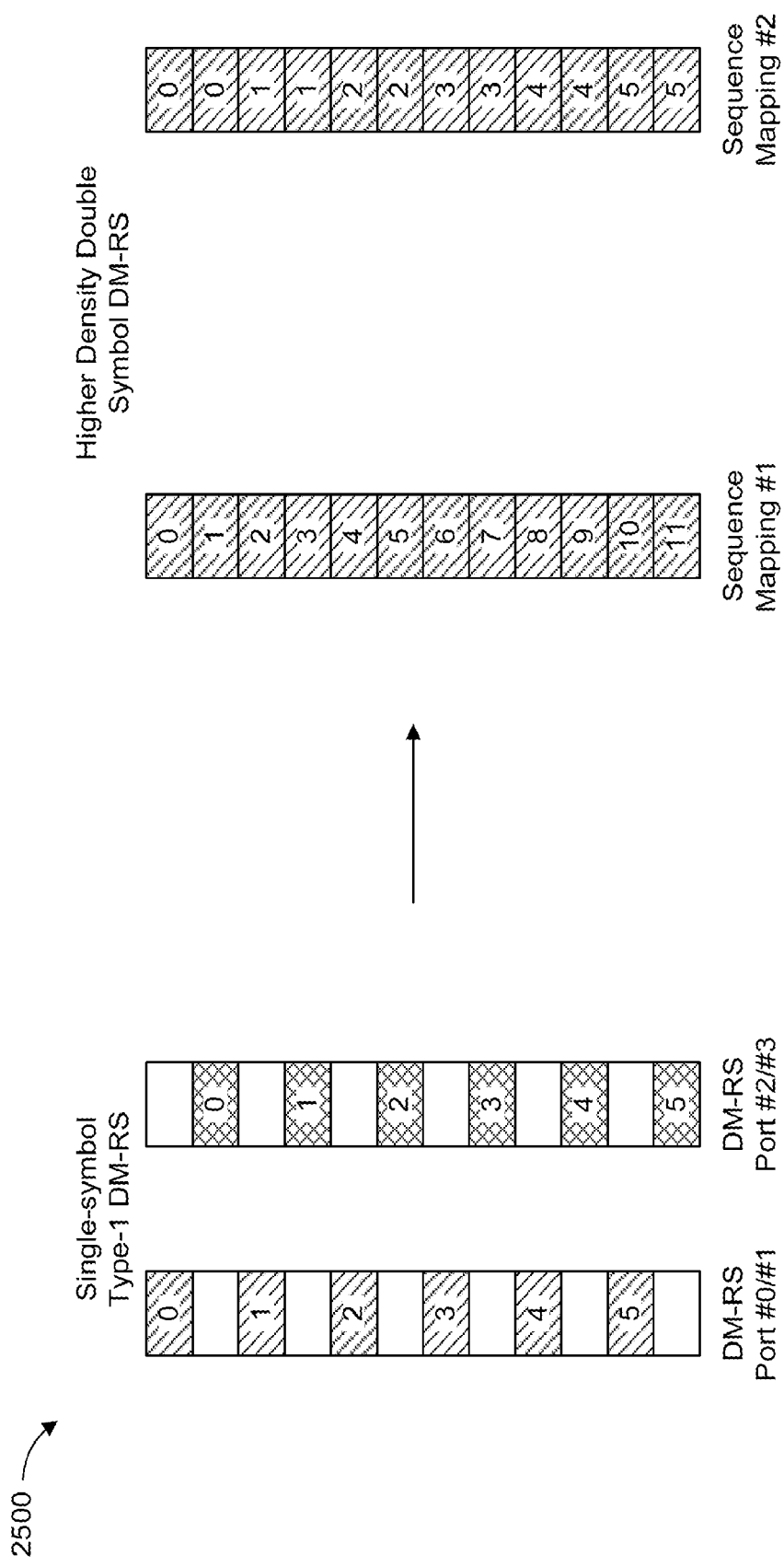
FIG. 25 shows an example of DM-RS sequence mapping with a single-symbol type-1 DM-RS.

A WTRU 102 may determine sequence mapping for a single-symbol type-1 DM-RS. FIG. 25 shows example sequence mappings for a single-symbol type-1 DM-RS. As shown by example in FIG. 25, multiple (e.g., two) sequence mappings 2500 (e.g., sequence mapping #1 and sequence mapping #2) may be provided for a higher DM-RS density of a single-symbol type-1 DM-RS. Sequence mapping #1 may map sequences sequentially. Sequence mapping #1 may be easier to implement and may not need to use memory. Sequence mapping #1 may provide higher correlation between single-symbol type-1 DM-RS ports and single-symbol higher density DM-RS, for example, if pseudo-random (PN) sequence mappings are not designed to be low correlation.

Sequence mapping #1 supports sequential sequence mapping. Sequence mapping #2 may, for example, allocate the same sequence for every two REs in frequency domain. Interference (e.g., for sequence mapping #2) between sequences for DM-RS ports may be low, e.g., due to low correlation.

FIG. 25 shows an example 2500 of DM-RS sequence mapping with a single-symbol type-1 DM-RS.

A WTRU 102 may determine a higher density DM-RS for a double-symbol type-1 DM-RS. A WTRU 102 may determine REs for a double-symbol type-1 DM-RS. REs of other DM-RS ports (e.g., for double-symbol type-1 DM-RS) may be used, for example, for scheduled DM-RS ports to achieve better channel estimation performance in the frequency domain (e.g., as well as single-symbol type-1 DM-RS).

Figures 26, 27:
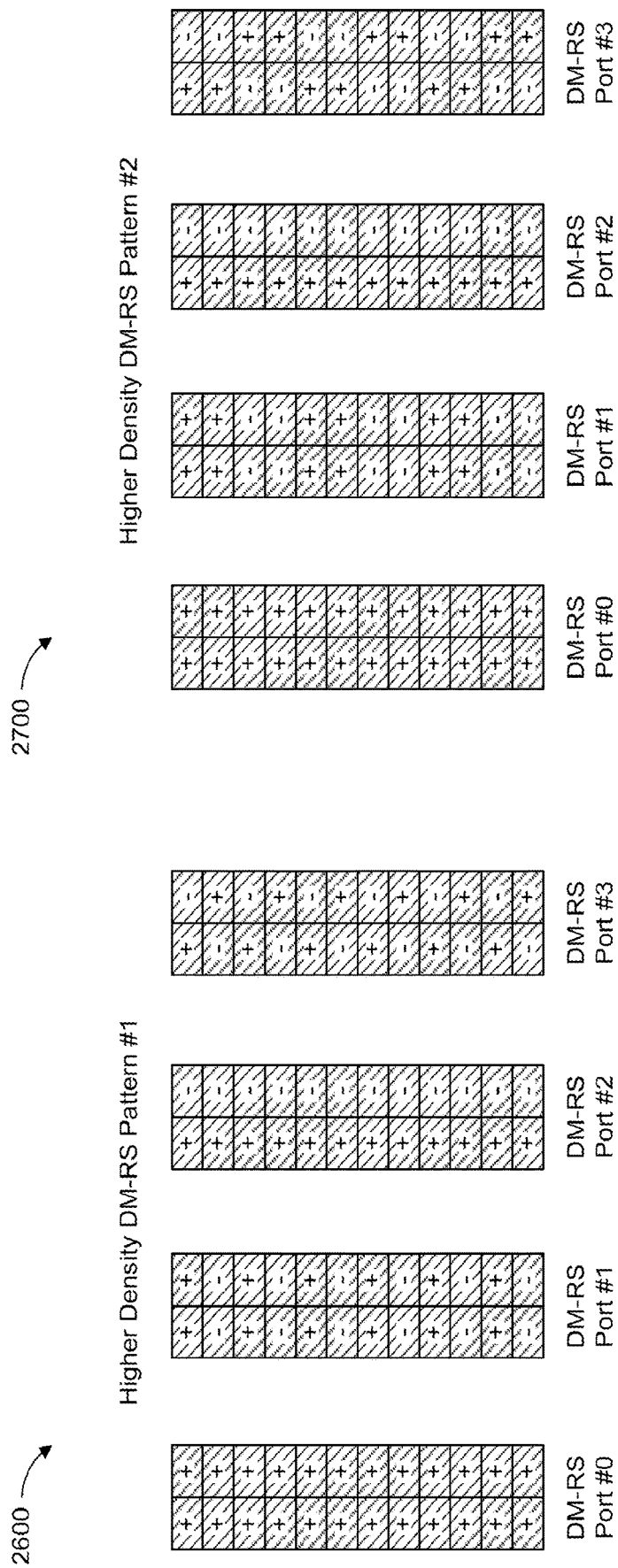
FIG. 26 shows an example pattern #1 of higher DM-RS density with a double-symbol type 1 DM-RS.
FIG. 27 shows an example pattern #2 of higher DM-RS density with a double-symbol type 1 DM-RS.

FIG. 26 and FIG. 27 show examples of a higher density DM-RS with a single-symbol type-1 DM-RS. As shown by examples 2600 and 2700 in FIG. 26 and FIG. 27, REs for DM-RS port #4, #5, #6 and #7 may be used for DM-RS port #0, #1, #2 and #3. The port numbers (e.g., DM-RS port #0, #1, #2 and #3) for higher density DM-RS used in examples in this disclosure may have different numbers (e.g., DM-RS port #8, #9, #10, and #11).

FIG. 26 shows an example 2600 of a pattern #1 of higher DM-RS density with a double-symbol type 1 DM-RS.

FIG. 27 shows an example 2700 of a pattern #2 of higher DM-RS density with a double-symbol type 1 DM-RS.

A WTRU 102 may determine CDM for a double-symbol type-1 DM-RS. As shown by the examples in FIG. 26 and FIG. 27, multiple (e.g., two) CDM mappings (e.g., pattern #1 in FIG. 26 and pattern #2 in FIG. 27) may be provided for a higher DM-RS density of a double-symbol type-1 DM-RS.

Pattern #1 may support CDM between consecutive REs in the frequency domain. Pattern #1 may be easier to implement, for example, if pattern #1 allocates codes with adjacent REs sequentially and/or does not need to use memory. Pattern #1 may not support coexistence between a double-symbol type-1 DM-RS and higher density double-symbol DM-RS, for example, if CDM sequences of double-symbol type-1 DM-RS and higher density double-symbol DM-RS are not orthogonal.

Pattern #1 may support CDM with consecutive REs in the frequency domain. Pattern #2 may support CDM based on a comb (e.g., a comb-like pattern) with 1 RE spacing in frequency domain. Pattern #1 may not support orthogonal multiplexing between a double-symbol type-1 DM-RS and double-symbol high density DM-RS. Pattern #2 may support orthogonal multiplexing between a double-symbol type-1 DM-RS and a high density double-symbol DM-RS.

Figure 28:
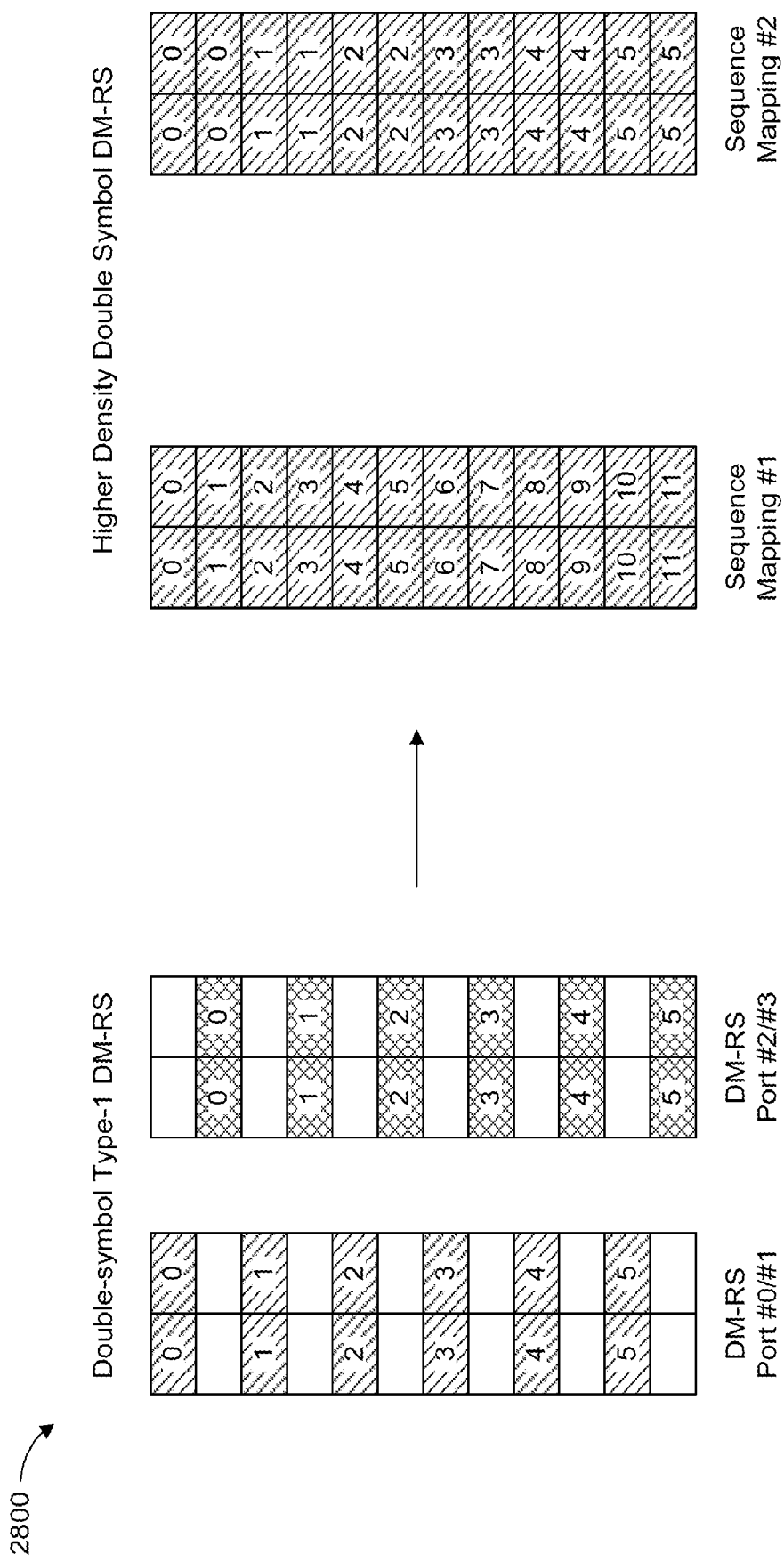
FIG. 28 shows an example of DM-RS sequence mapping with a double-symbol type-1 DM-RS.

A WTRU 102 may determine sequence mapping for a double-symbol type-1 DM-RS. FIG. 28 shows an example 2800 of sequence mappings for a double-symbol type-1 DM-RS. As shown by example 2800 in FIG. 28, multiple (e.g., two) sequence mappings (e.g., sequence mapping #1 and sequence mapping #2) may be provided for higher DM-RS density of double-symbol type 1 DM-RS. Sequence mapping #1 may map sequences sequentially. The sequence mapping may be easier to implement, for example, if sequence mapping #1 allocates codes sequentially and/or does not use memory. Sequence mapping #1 may provide higher correlation between a double-symbol type-1 DM-RS and a higher density double-symbol DM-RS, for example, if PN sequence mappings are not designed to be low correlation.

Sequence mapping #1 may support sequential sequence mapping. Sequence mapping #2 may, for example, allocate the same sequence for every two REs in the frequency domain. Interference (e.g., for sequence mapping #2) between sequences for DM-RS ports may be low (e.g., due to low correlation).

FIG. 28 shows an example 2800 of DM-RS sequence mappings with a double-symbol type-1 DM-RS.

A WTRU 102 may determine a higher density DM-RS for a type-2 DM-RS.

Figure 29:
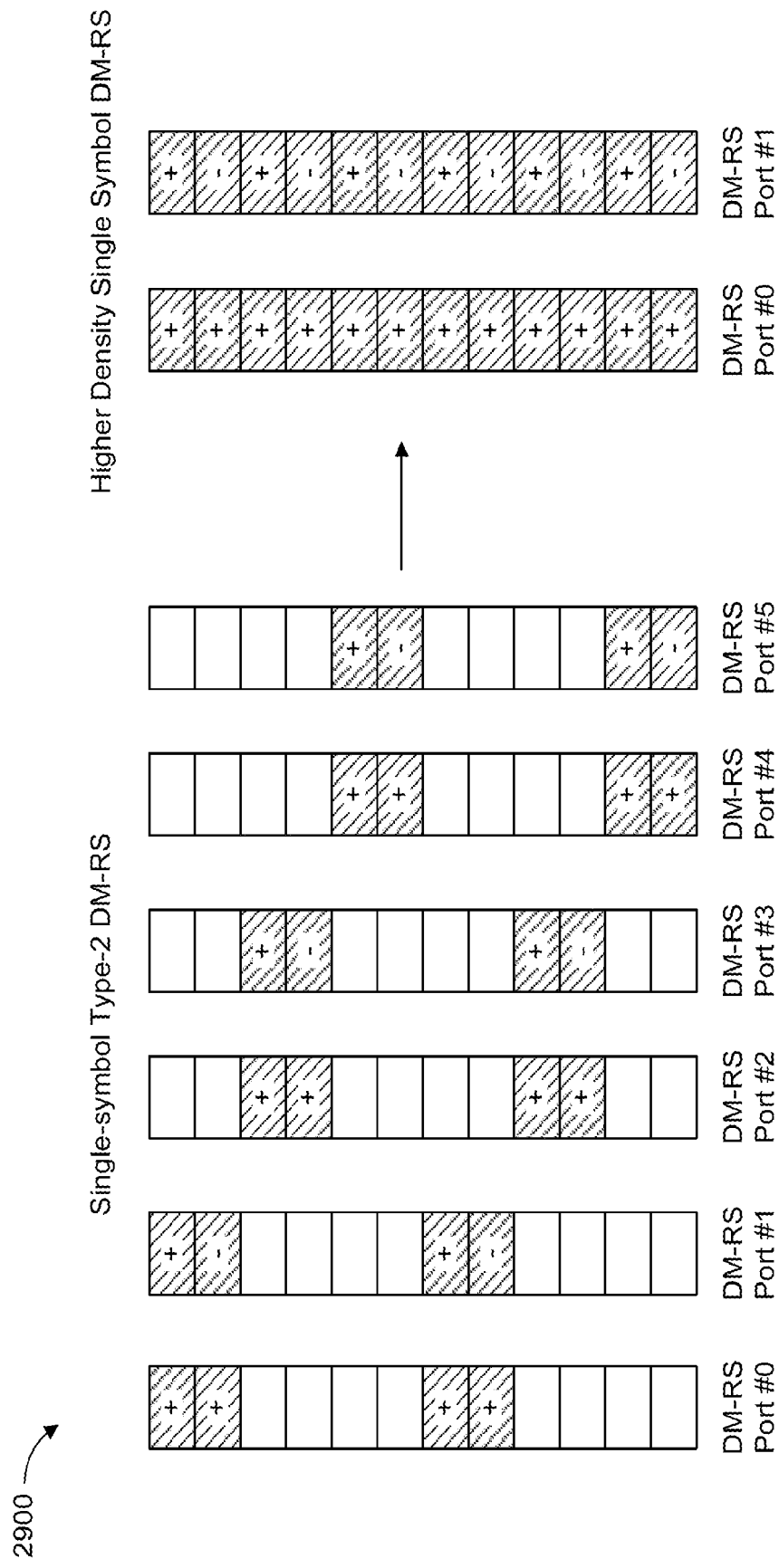
FIG. 29 shows an example of a higher DM-RS density with a single-symbol type 2 DM-RS.

A WTRU 102 may determine a higher density DM-RS for a single-symbol type-2 DM-RS. A WTRU 102 may determine REs for a higher density single-symbol type-2 DM-RS. REs for other type-2 DM-RS ports in a DM-RS may (e.g., as well as type-1 DM-RS) be used, for example, for scheduled DM-RS ports to support higher density DM-RS. In an example, REs of other DM-RS ports may be used for scheduled DM-RS ports to achieve better channel estimation performance in the frequency domain. FIG. 29 shows an example 2900 of a higher density DM-RS with a type-2 single-symbol DM-RS. As shown by the example 2900 in FIG. 29, REs for DM-RS ports #2, #3, #4 and #5 may be used for DM-RS port #0 and #1. Port numbers (e.g., DM-RS port #0 and #1) for higher density DM-RS used in examples herein may have different numbers (e.g., DM-RS port #6 and #7).

FIG. 29 shows an example 2900 of a higher DM-RS density with a single-symbol type 2 DM-RS.

A WTRU 102 may determine code-division multiplexing (CDM) for a single-symbol type-2 DM-RS. As shown by the example 2900 in FIG. 29, CDM mapping may be based on a single-symbol type-2 DM-RS. CDM mapping may support an implementation, for example, by allocating codes with adjacent REs and may achieve orthogonal multiplexing between DM-RS ports and single-symbol high density DM-RS ports.

Figure 30:
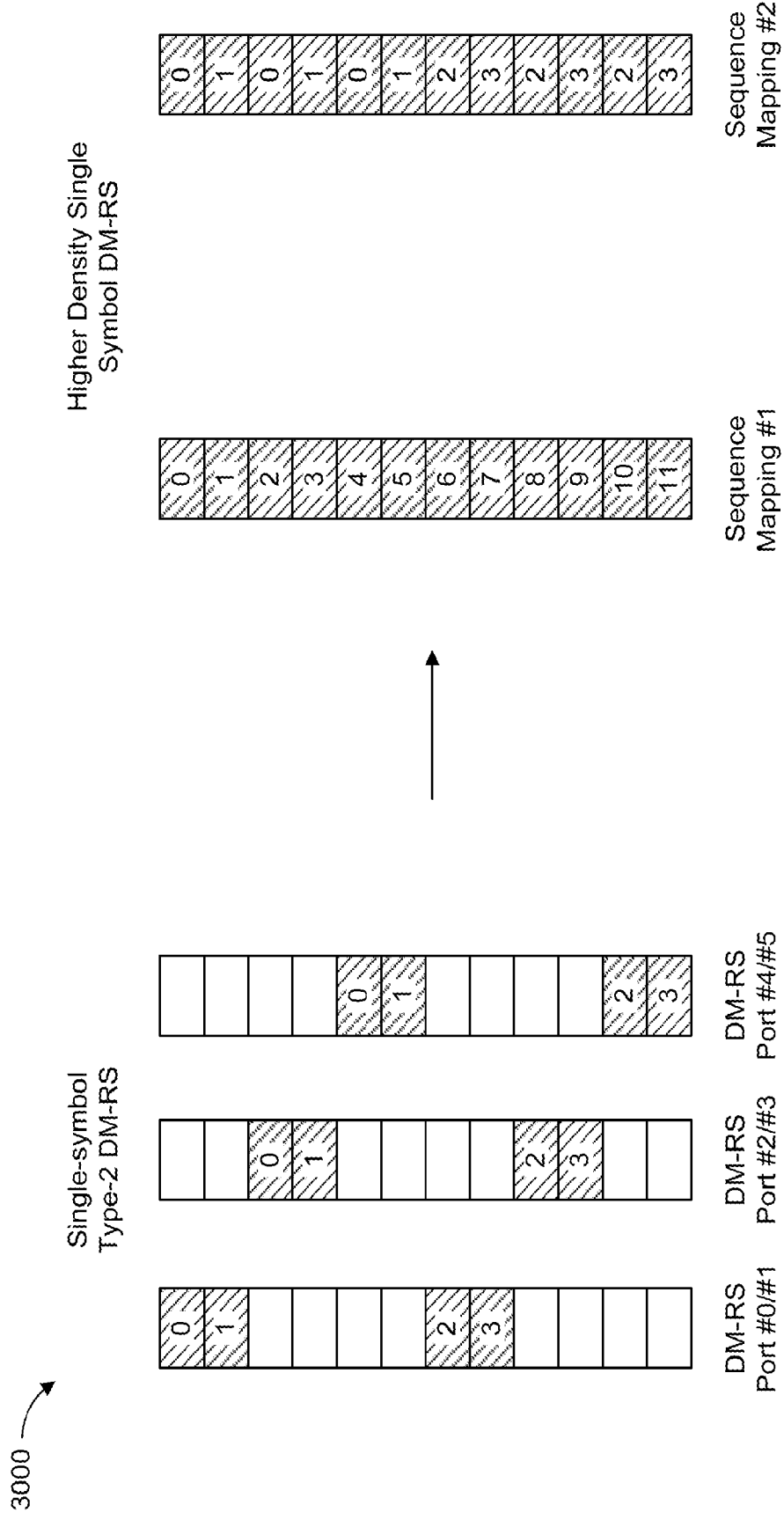
FIG. 30 shows an example of DM-RS sequence mapping with a single-symbol type-2 DM-RS.

A WTRU 102 may determine sequence mappings for a single-symbol type-2 DM-RS. FIG. 30 shows an example 3000 of sequence mappings for a single-symbol type-2 DM-RS. As shown by the example 3000 in FIG. 30, multiple (e.g., two) sequence mappings (e.g., sequence mapping #1 and sequence mapping #2) may be provided for a higher DM-RS density of a single-symbol type-2 DM-RS. Sequence mapping #1 may map sequences sequentially. Sequence mapping #1 may be easier to implement and may not need to use memory. Sequence mapping #1 may provide a higher correlation between single-symbol type-2 DM-RS ports and a higher density double-symbol DM-RS, for example, if PN sequence mappings are not designed to be low correlation.

Sequence mapping #1 may support sequential sequence mapping. Sequence mapping #2 may, for example, allocate the same sequence for every two REs during six REs in the frequency domain. Interference (e.g., for sequence #2 mapping) between sequences for DM-RS ports may be low, e.g., due to low correlation.

FIG. 30 shows an example 3000 of DM-RS sequence mappings with a single-symbol type-2 DM-RS.

Figure 31:
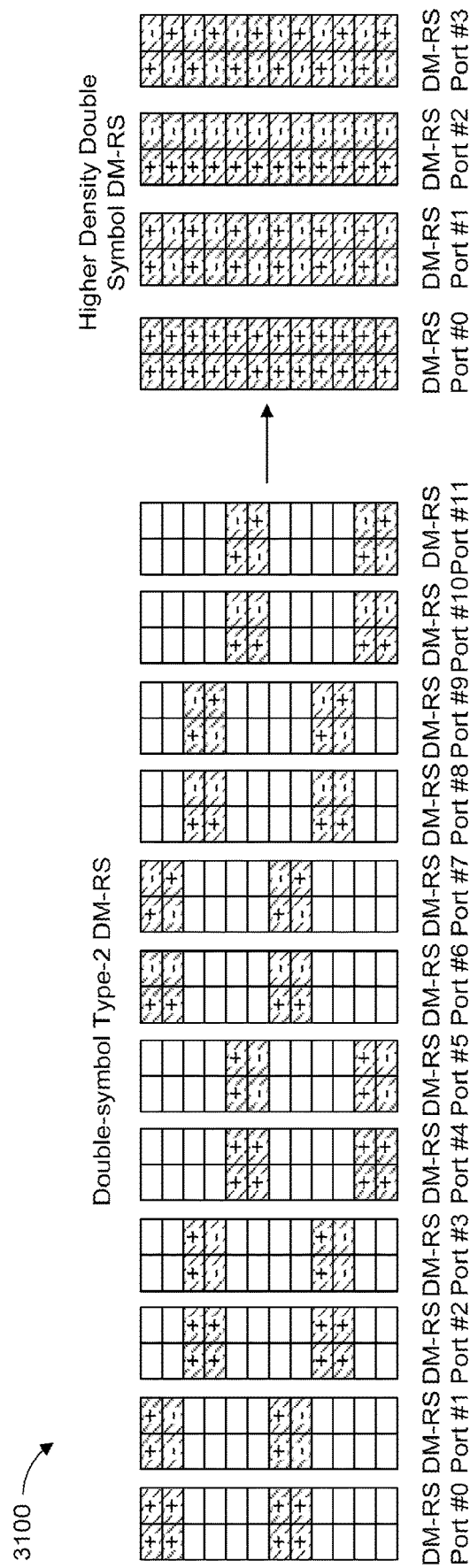
FIG. 31 shows an example of higher DM-RS density with a double-symbol type 2 DM-RS.

A WTRU 102 may determine a higher density DM-RS for a double-symbol type-2 DM-RS. A WTRU 102 may determine REs for a double-symbol type-2 DM-RS. REs of other DM-RS ports (e.g., for a double-symbol type-2 DM-RS) may be used for scheduled DM-RS ports, for example, to achieve better channel estimation performance in the frequency domain. FIG. 31 shows an example 3100 of a higher density DM-RS with a double-symbol type-2 DM-RS. As shown by example in FIG. 31, REs for DM-RS ports #2, #3, #4, #5, #8, #9, #10 and #11 may be used for DM-RS port #0, #1, #2 and #3. Port numbers (e.g., DM-RS port #0, #1, #2, and #3) for higher density DM-RS used in examples herein may have different numbers (e.g., DM-RS port #12, #13, #14, and #15).

FIG. 31 shows an example 3100 of higher DM-RS density with a double-symbol type 2 DM-RS.

A WTRU 102 may determine code-division multiplexing (CDM) for a double-symbol type-2 DM-RS. As shown by example in FIG. 31, CDM mapping may be based on a double-symbol type-2 DM-RS. The CDM mapping may support implementation, for example, by allocating codes with adjacent REs and may achieve orthogonal multiplexing between DM-RS ports and single-symbol high density DM-RS ports.

Figure 32:
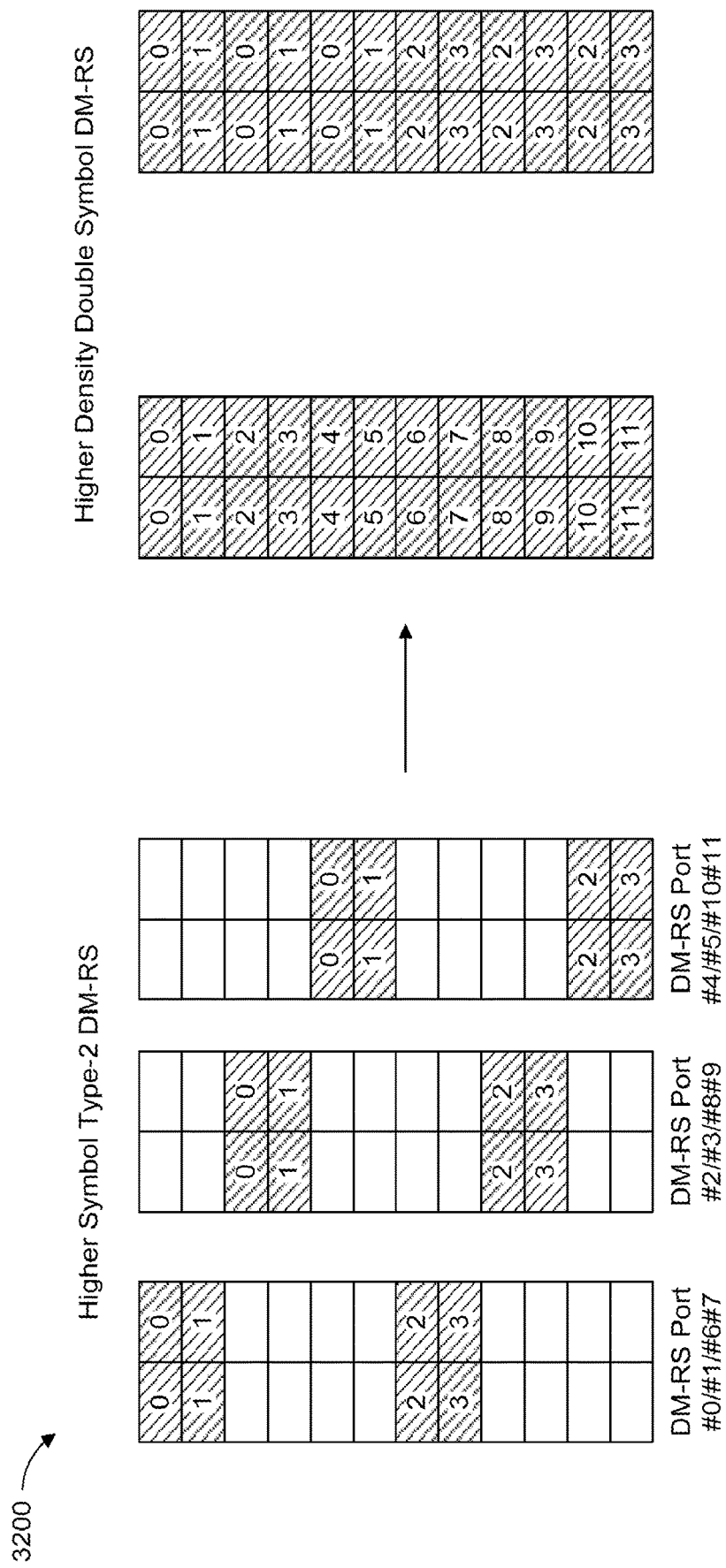
FIG. 32 shows an example of a DM-RS sequence mapping with a double-symbol type-2 DM-RS.

A WTRU 102 may determine sequence mapping for a double-symbol type-2 DM-RS. FIG. 32 shows example sequence mappings for a single-symbol type-2 DM-RS. As shown by example in FIG. 32, multiple (e.g., two) sequence mappings (e.g., sequence mapping #1 and sequence mapping #2) may be provided for a higher DM-RS density of a double-symbol type-2 DM-RS. Sequence mapping #1 may map sequences sequentially. Sequence mapping #1 may be easier to implement and may not need to use memory. Sequence mapping #1 may provide higher correlation between double-symbol type-2 DM-RS ports and a higher density double-symbol DM-RS, for example, if PN sequence mappings are not designed to be low correlation.

FIG. 32 shows an example 3200 of a DM-RS sequence mapping with a double-symbol type-2 DM-RS.

A WTRU 102 may determine a DM-RS type for a higher density DM-RS. A higher density DM-RS for type-1 and/or type-2 DM-RS may be defined, for example, as a part of one or more DM-RS types (e.g., type-1 and/or type-2). In an (e.g., additional or alternative) example, one or more other DM-RS types (e.g., type-3 and/or type-4) may be defined to configure higher density DM-RS, e.g., to provide enhanced channel estimation in the frequency domain.

Figures 33, 34:
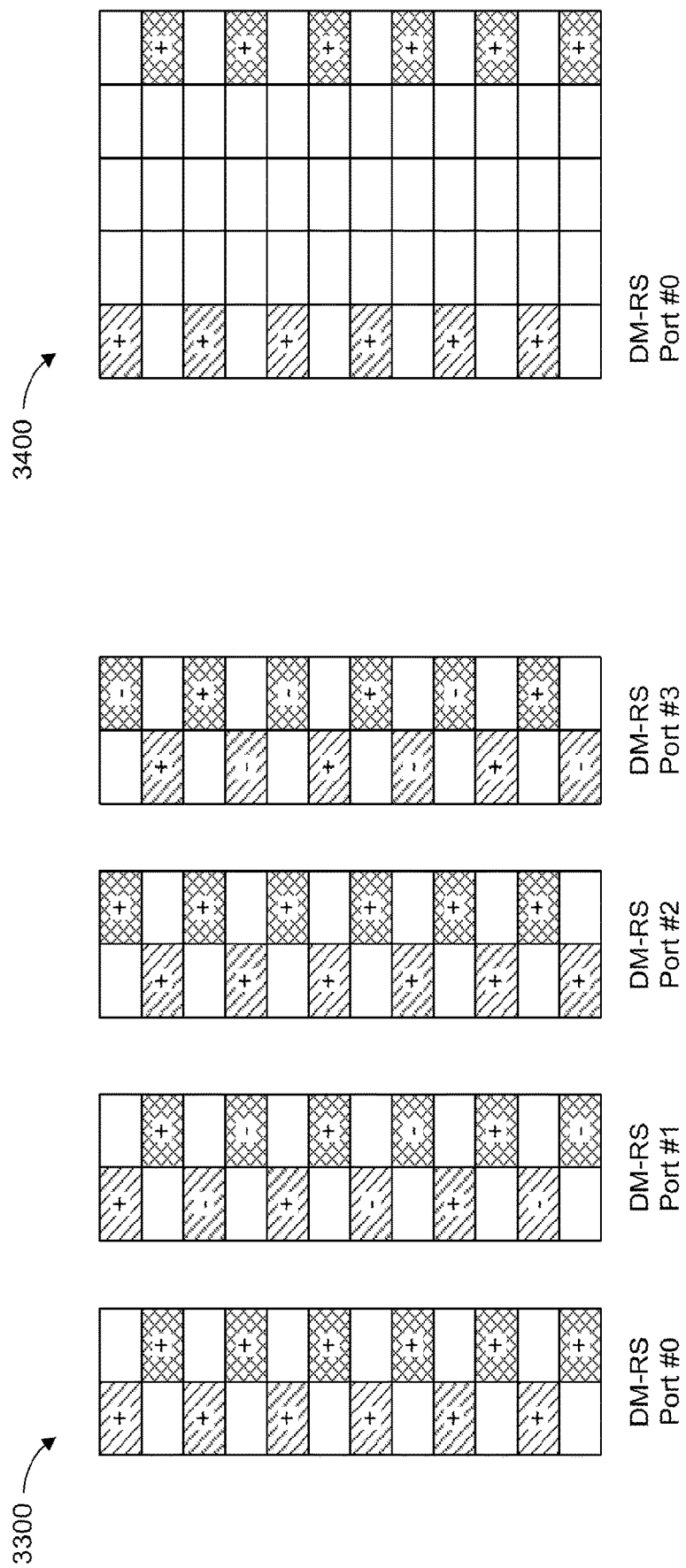
FIG. 33 shows an example of a higher density DM-RS with a single-symbol type-1 DM-RS in adjacent symbols.
FIG. 34 shows an example of a higher density DM-RS with a single-symbol type-1 DM-RS in non-adjacent symbols.

A WTRU 102 may determine DM-RS symbols for a higher density DM-RS. A WTRU 102 may determine higher density DM-RS REs in different symbols other than DM-RS ports. A WTRU 102 may determine higher density DM-RS REs in different symbols for a type-1 DM-RS. In an example, additional REs for a higher density DM-RS may be supported in OFDM symbols other than DM-RS ports. Slot duration may be inversely proportional (e.g., from 1 ms to 0.156 ms), for example, as SCS increases (e.g., from 15 kHz to 960 kHz). Changes of wireless channel response in the time domain may not be severe in time domain, for example, due to decrement of the slot duration. A group of DM-RS REs for higher density may be transmitted in different symbols. FIG. 33 and FIG. 34 show examples 3300 and 3400 of higher density DM-RS transmissions for a type-1 DM-RS in different symbols. For example, as shown by example in FIG. 33, a WTRU 102 may transmit or receive a higher density DM-RS in adjacent symbols. A WTRU 102 may measure channel impulse responses of the higher density DM-RS REs, for example, in order to receive PDSCH. A WTRU 102 may estimate channel impulse responses of PDSCH REs, for example, by jointly estimating channel impulse responses in different symbols (e.g., by assuming that the channel impulse responses do not change in the time domain through the symbols). A WTRU 102 may (e.g., based on the estimated channel impulse responses) decode PDSCH. As shown by example in FIG. 34, higher density DM-RS transmission may be performed in non-adjacent symbols.

FIG. 33 shows an example 3300 of a higher density DM-RS with a single-symbol type-1 DM-RS in adjacent symbols.

FIG. 34 shows an example 3400 of a higher density DM-RS with a single-symbol type-1 DM-RS in non-adjacent symbols.

Figures 35, 36:
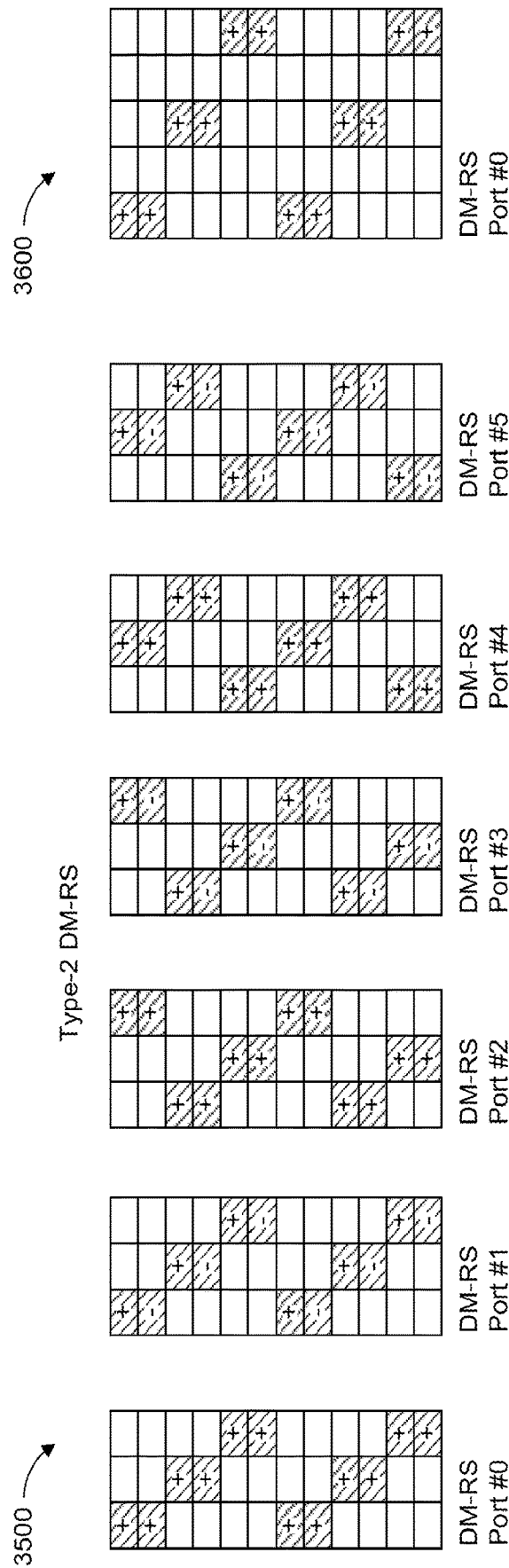
FIG. 35 shows an example of a higher density DM-RS with a single-symbol type-2 DM-RS in adjacent symbols.
FIG. 36 shows a higher density DM-RS with a single-symbol type-2 DM-RS in non-adjacent symbols.

A WTRU 102 may determine higher density DM-RS REs in different symbols for a type-2 DM-RS. A higher density DM-RS in adjacent or non-adjacent symbols may be supported with type-2 DM-RS (e.g., as well as type-1 DM-RS). FIG. 35 and FIG. 36 show examples 3500 and 3600 of higher density DM-RS transmissions for a type-2 DM-RS in different symbols.

FIG. 35 shows an example 3500 of a higher density DM-RS with a single-symbol type-2 DM-RS in adjacent symbols.

FIG. 36 shows an example 3600 of a higher density DM-RS with a single-symbol type-2 DM-RS in non-adjacent symbols.

Those of ordinary skill will recognize that the identical principle may be applicable to double-symbol type-1 DM-RS ports and double-symbol type-2 DM-RS ports, for example, to provide a higher density DM-RS in different symbols than other DM-RS symbols.

A WTRU 102 may determine frequency hopping in additional DM-RS symbols.

In an example, one or more DM-RS ports in additional DM-RS symbols may support frequency hopping, for example, to achieve better channel estimation in the frequency domain.

In an (e.g., additional or alternative) example, RE locations of a DM-RS port in an OFDM symbol may be determined, for example, based on the OFDM symbol index. In an example, a set of REs may be used for a DM-RS port in an OFDM symbol and the frequency location of the set of REs may be determined based on the OFDM symbol index. For example, the set of REs may be located in even-numbered subcarriers for a first OFDM symbol index and in odd-numbered subcarriers for a second OFDM symbol index.

In an example, the first OFDM symbol index and the second OFDM symbol index may be determined, for example, based on the modulo operation of the OFDM symbol index. The first OFDM symbol index may be the OFDM symbol index (m), satisfying m modulo 2=0, and the second OFDM symbol index may be the OFDM symbol index (m), satisfying m modulo 2=1. The first OFDM symbol index may be the first OFDM symbol containing the DM-RS port in a slot and the second OFDM symbol index may be the second OFDM symbol containing the DM-RS port in a slot.

In an (e.g., additional or alternative) example, an RE offset may be used to determine the RE locations of a DM-RS port in an OFDM symbol. One or more of following may apply.

The maximum RE_offset value may be based on, for example, the frequency spacing of the DM-RS configuration. For example, the frequency spacing of a DM-RS configuration may be X (e.g., 2), and the maximum RE_offset (max_RE_offset) may be X−1 (e.g., 1).

The RE_offset candidate values may be, for example, {0, 1, . . . , max_RE_offset}, where max_RE_offset may be determined based on, for example, the frequency spacing of a DM-RS pattern used and/or a higher layer configuration (e.g., RRC or MAC-CE).

An RE_offset value may be determined based on, for example, at least one of an OFDM symbol index, and/or the order of an OFDM symbol containing the DM-RS or the DM-RS port (e.g., 1st OFDM symbol containing DMRS, 2nd OFDM symbol containing DMRS, and/or 3rd OFDM symbol containing DMRS,).

An RE_offset value may be determined differently, for example, based on whether a single-symbol DM-RS and/or a double-symbol DM-RS configuration is used. The RE_offset value may be determined based on the OFDM symbol index and/or the order of OFDM symbol containing DM-RS, for example, if a single-symbol DM-RS is used. The RE_offset value may be determined based on an OFDM symbol pair and the order of OFDM symbol containing DMRS, for example, if a double-symbol DM-RS is used.

For example, the first pair of OFDM symbols for the double-symbol DM-RS may be associated with the first RE_offset value and the second pair of OFDM symbols for the double-symbol DM-RS may be associated with the second RE_offset value.

The RE_offset may be referred to, for example, as frequency shift, frequency hopping, frequency offset, subcarrier offset, and/or v-shift.

In an (e.g., additional or alternative) example, the use of a DM-RS RE_offset based on the OFDM symbol location or index in a slot may be determined, for example, based on one or more of following: (i) operating frequency band (e.g., >frequency threshold), (ii) subcarrier spacing (e.g., >subcarrier spacing threshold), (iii) DM-RS configuration type (type-1 or type-2), (iv) waveform (e.g., OFDM, DFT-s-OFDM), (v) modulation order and/or coding rate (e.g., MCS>threshold), (vi) channel coding type (e.g., LDPC, Turbo, Polar code), (vii) WTRU mobility speed, (viii) higher layer configuration (e.g., RRC or MAC-CE), and/or (ix) dynamic indication (e.g., DCI).

RE_offset, frequency shift, frequency hopping, frequency offset, subcarrier shift, subcarrier offset, and v-shift may be used interchangeably herein.

Figure 37:
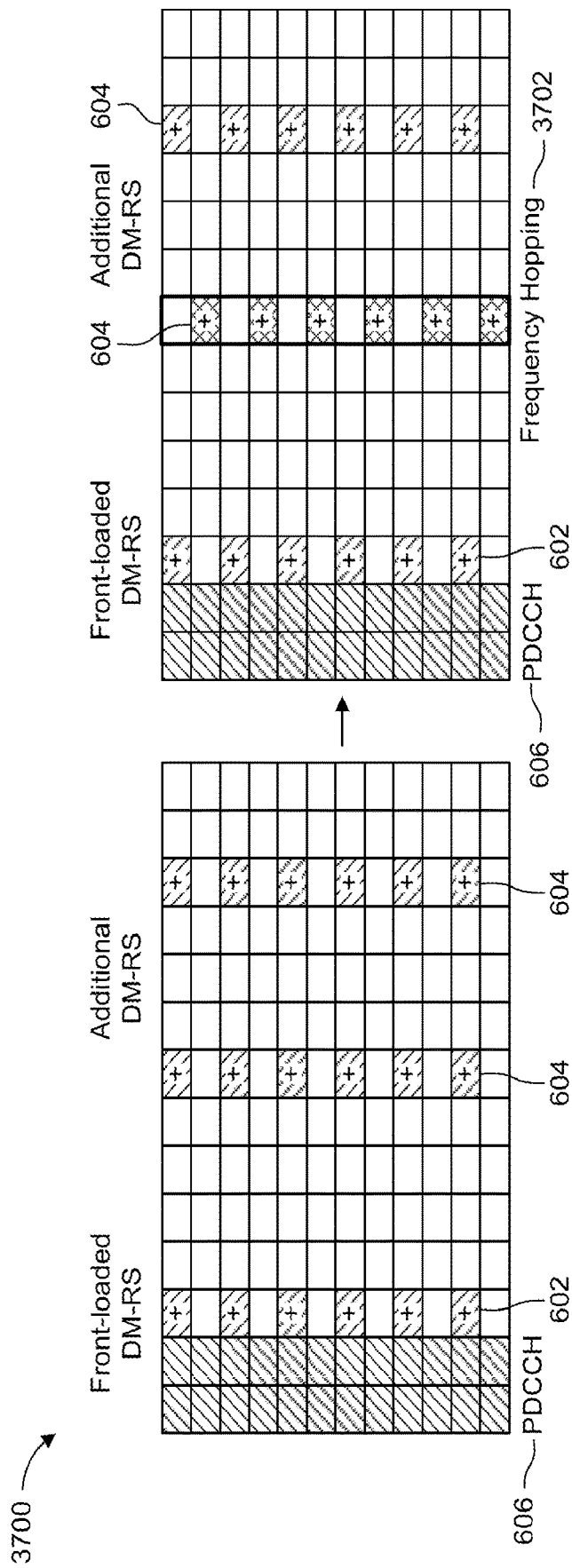
FIG. 37 is an example of frequency hopping of an additional DM-RS with a single-symbol type-1 DM-RS.
Figure 38:
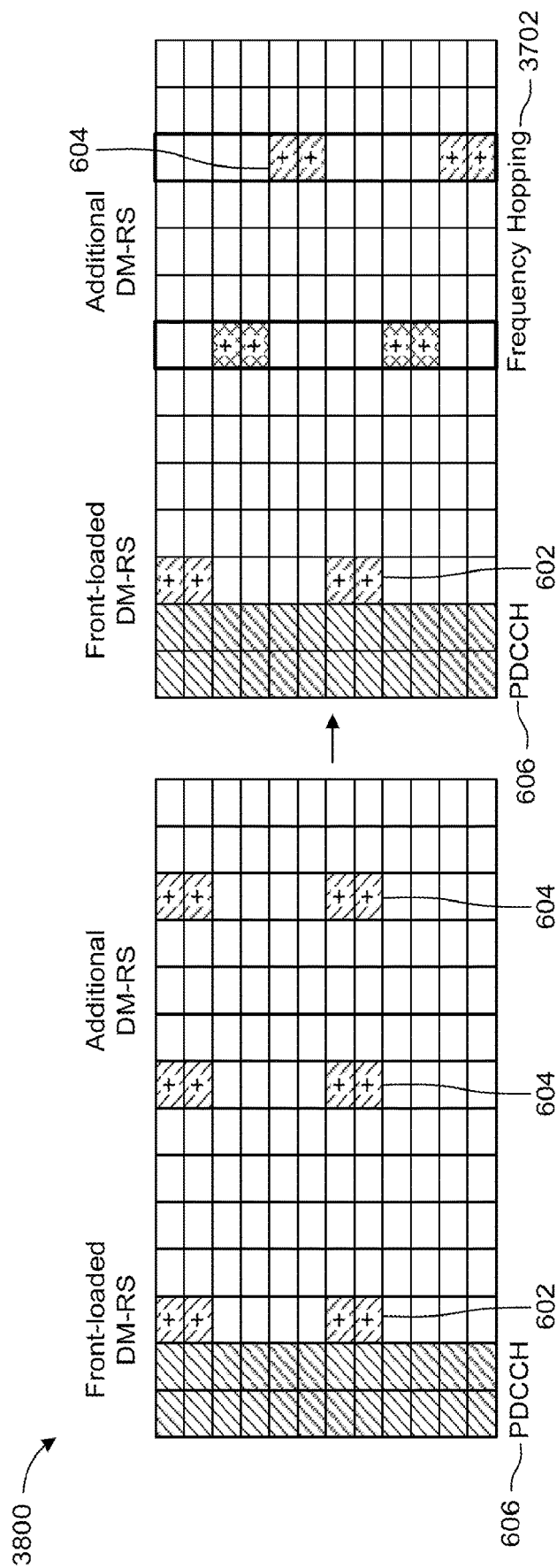
FIG. 38 is an example of frequency hopping of an additional DM-RS with a single-symbol type-2 DM-RS.

A WTRU 102 may determine frequency hopping in a type-1 DM-RS. FIG. 37 and FIG. 38 show examples 3700 and 3800 of frequency hopping of additional DM-RS symbols with single-symbol type-1 DM-RS and single-symbol type-2 DM-RS, respectively. As shown by the example 3700 in FIG. 37, two additional DM-RS symbols may be configured for a WTRU. A WTRU 102 may receive front-loaded DM-RS 602 and additional DM-RS 604 (e.g., only) in the same frequency locations, for example, if the frequency hopping 3702 is not applied to an additional DM-RS 604. A WTRU 102 may receive one of the additional DM-RSs 604 in different frequency locations, for example, if the frequency hopping 3702 is applied to additional DM-RS 604. A WTRU 102 may jointly estimate a frequency domain channel with the additional DM-RS 604 with frequency hopping 3702, for example, by assuming the time domain channel is not changing.

A WTRU 102 may determine frequency hopping 3702 in a type-2 DM-RS. A single-symbol type-2 DM-RS 604 with two additional DM-RS symbols may apply two frequency hoppings 3702 in the frequency domain (e.g., in contrast to one frequency hopping 3702 of an additional DM-RS 604 in a single-symbol type-1 DM-RS). As shown by the example 3800 in FIG. 38, an (e.g., each) additional DM-RS symbol may be transmitted in different frequency locations. A WTRU 102 may (e.g., by assuming the time domain channel is not changing) jointly estimate the frequency domain channel with the additional DM-RSs 604 with frequency hopping 3702. Frequency hopping 3702 of additional DM-RS symbols may be applicable to double-symbol type-1 DM-RS ports and double-symbol type-2 DM-RS ports, for example, to provide a higher density DM-RS.

FIG. 37 is an example 3700 of frequency hopping of an additional DM-RS with a single-symbol type-1 DM-RS.

FIG. 38 is an example 3800 of frequency hopping of an additional DM-RS with a single-symbol type-2 DM-RS.

Figure 39:
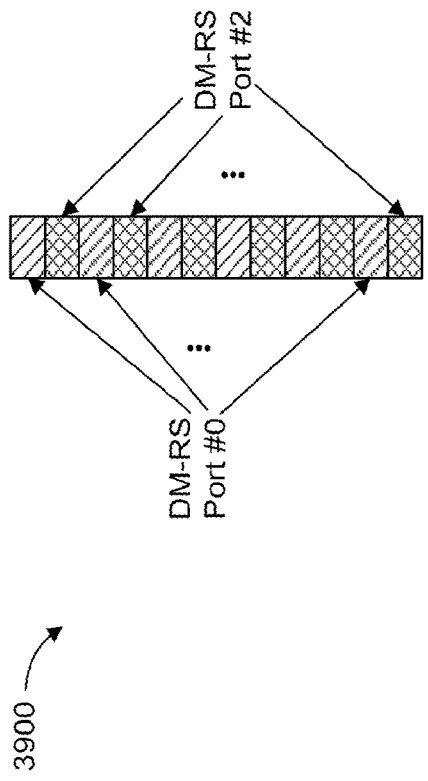
FIG. 39 is an example of DM-RS port aggregation for a single-symbol type-1 DM-RS.

A WTRU 102 may determine DM-RS port aggregation. In an example, two or more DM-RS ports may be aggregated to provide enhanced channel estimation of DM-RS in the frequency domain. For example, DM-RS ports in different frequency locations or different CDM groups may be aggregated, e.g., to achieve enhanced channel estimation in the frequency domain. FIG. 39 shows an example 3900 of DM-RS ports aggregation based on a single-symbol type-1 DM-RS. As shown by the example 3900 in FIG. 39, DM-RS port #0 and DM-RS port #2 in different frequency locations or different CDM groups may be aggregated. A WTRU 102 may receive a configuration and/or an indication for the aggregation of DM-RS ports from a gNB 180.

Aggregated DM-RS ports may be used to demodulate the same layer. For example, a WTRU 102 may assume that aggregated DM-RS ports are associated with the same PDSCH layer in DL. A WTRU 102 may (e.g., for UL) use the same precoder for the aggregated DM-RS ports.

A WTRU 102 may determine DM-RS port aggregation based on RRC messages. For example, a WTRU 102 may receive one or more RRC messages indicating aggregation of DM-RS ports. An indication may comprise one or more DM-RS ports to be aggregated. A WTRU 102 may (e.g., based on the indication) measure the one or more DM-RS ports. A WTRU 102 may jointly estimate the wireless channel based on the measurement. The WTRU 102 may decode PDSCH, for example, based on the joint estimation.

A WTRU 102 may determine DM-RS port aggregation based on a DCI. For example, a WTRU 102 may receive a DCI indicating aggregation of DM-RS ports. The indication may be explicit or implicit. In an example of an explicit indication, a WTRU 102 may receive an explicit indication to aggregate DM-RS ports. For example, the DCI may explicitly indicate one or more indices of DM-RS ports to be aggregated.

The WTRU 102 may (e.g., based on the DCI) measure the one or more DM-RS ports and jointly estimate the wireless channel based on the measurement. The WTRU 102 may (e.g., based on the joint estimation) decode PDSCH. In an example of an implicit indication, a WTRU 102 may receive an implicit indication to aggregate DM-RS ports. In an example, scheduling PDSCH/PUSCH above a specific rank may indicate DM-RS port aggregation. For example, a WTRU 102 may receive a DCI scheduling PDSCH/PUSCH with rank 2. DM-RS ports for rank 2 may be aggregated for PDSCH reception. A DCI scheduling PDSCH/PUSCH with rank 2 may lead to an actual rank (e.g., number of transmission layers) of 1 for PDSCH/PUSCH.

FIG. 39 is an example 3900 of DM-RS port aggregation for a single-symbol type-1 DM-RS.

Figure 40:
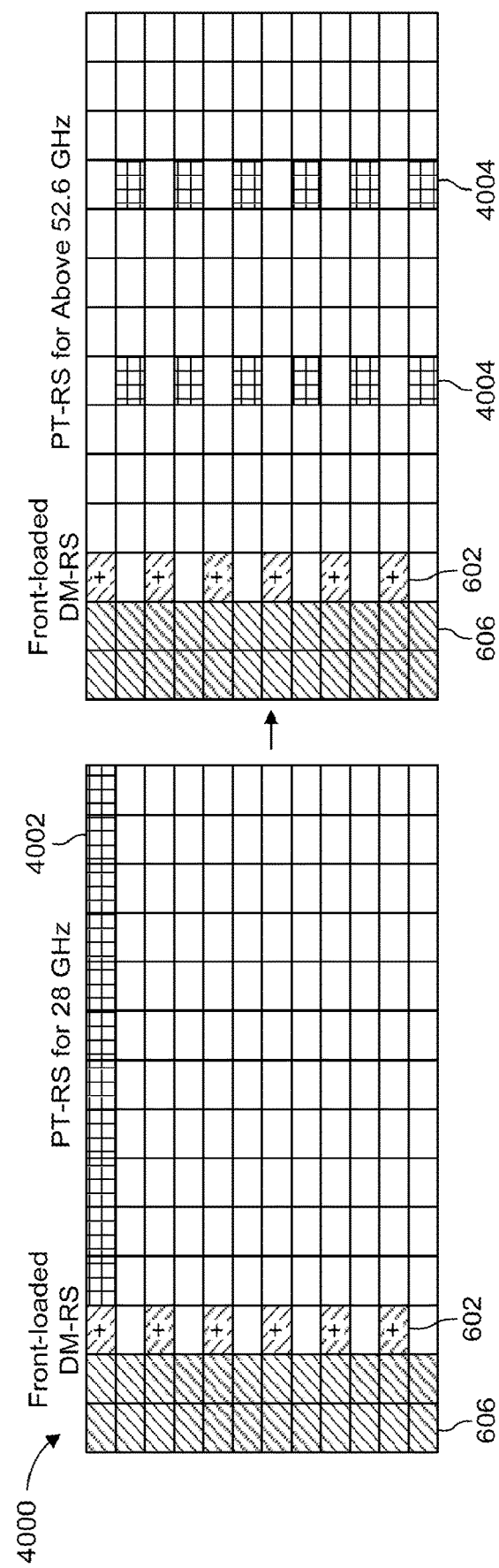
FIG. 40 shows an example of a PT-RS for above 52.6 GHz to provide enhanced channel estimation performance in the frequency domain.

A WTRU 102 may determine a PT-RS. A WTRU 102 may determine a PT-RS pattern. In an example, PT-RS ports may be supported to provide enhanced performance of frequency domain channel estimation. FIG. 40 shows an example 4000 of a PT-RS for above 52.6 GHz to provide enhanced channel estimation performance in the frequency domain. FIG. 40 shows a comparison of a PT-RS for FR2 and an example of a PT-RS for above 52.6 GHz. As shown by the example 4000 in FIG. 40, PT-RS 4002 for FR2 may have an RS that spans in the time domain while occupying (e.g., only) one subcarrier in the frequency domain in a resource block (RB). A PT-RS 4004 for above 52.6 GHz may (e.g., in contrast to a PT-RS for FR2) occupy multiple subcarriers in the frequency domain and less REs in the time domain, which may enhance DM-RS channel estimation accuracy for DM-RS ports which are quasi co-located to PT-RS ports. Above 52.6 GHz may not require higher time domain RS density, for example, due to shorter slot length.

A WTRU 102 may determine DM-RSs for slot bundling and/or multi-slot scheduling. As follows, DCI and Sidelink Control Information (SCI) may be used interchangeably. A WTRU 102 may receive one or more DCIs which schedule one or more transport blocks in one or more slots for a shared channel (e.g., PDSCH, PUSCH and/or PSSCH). A WTRU 102 may apply different DM-RS patterns for different scheduling types and/or different time durations (e.g., mini-slots/slots/symbols). The WTRU 102 may determine one or more DM-RS patterns based on one or more sets of DM-RS configurations.

A WTRU 102 may receive one or more sets of DM-RS configurations (e.g., via RRC messaging). The DM-RS configurations may include information indicating any of DM-RS type, additional positions, max length, PT-RS, scrambling IDs, transform precoding enablement/disablement, narrowband PUSCH (nPUSCH) identity, sequence and/or sequence group hopping.

As examples, a WTRU 102 may receive a configuration of any of type 1 DM-RS, type 2 DM-RS and/or enhanced type DM-RS (e.g., for above 52.6 GHz). The WTRU 102 may receive a configuration of positions for additional DM-RS(s). The WTRU 102 may receive a configuration of a time duration—which may be specified as a number of symbols (e.g., maximum number of OFDM symbols)—for DM-RSs, such as front-loaded DM-RS. The WTRU 102 may receive a configuration of one or more associated PT-RS configurations. The WTRU 102 may receive a configuration of one or more scrambling IDs for DM-RSs. The WTRU 102 may receive a configuration which has information indicating whether transform precoding is to be applied or not (e.g., enabled/disabled). The WTRU 102 may receive a configuration which has information indicating an identify of a PUSCH. The WTRU 102 may receive a configuration which has information indicating any of sequence hopping and/or sequence group hopping.

Based on the one or more sets of DM-RS configurations, a WTRU 102 may determine a set (e.g., a subset) of DM-RS configurations of the one or more sets for receiving/transmitting one or more shared channels. The WTRU 102 may determine the set (e.g., subset) of DM-RS configurations based on any of a received indication, a WTRU 102 report, shared channel scheduling, a scaling factor, time duration, scheduling parameters, and/or a number of transport blocks.

A set (e.g., a subset) of DM-RS configurations to be used for receiving/transmitting one or more shared channels may be determined based on one or more received indications (e.g., gNB indications) via any of RRC, MAC CE and/or DCI.

A set (e.g., a subset) of DM-RS configurations may be determined based on a WTRU 102 report (e.g., ACK/NACK, CSI, PRACH). A WTRU 102 may indicate a preferred subset (e.g., one or more) of DM-RS configurations to be used by transmitting one or more ACK/NACKs. For example, a transmitted ACK/NACK may include information indicating at least one preferred DM-RS pattern. In another example, the WTRU 102 may indicate a first DM-RS pattern by reporting an ACK and a second DM-RS pattern by reporting a NACK.

A WTRU 102 may indicate a preferred subset (e.g., one or more) of DM-RS configurations to be used by transmitting one or more CSI reports. For example, the WTRU 102 may receive a CSI report configuration for a preferred DM-RS pattern explicitly (e.g., based on an indication via RRC and/or MAC CE) and/or implicitly (e.g., based on one or more configurations of scheduled symbols, scheduled slots, scheduling type and/or associated DM-RS configurations for CSI reporting). Based on the CSI report configuration, if the CSI report is configured (e.g., via RRC), activated (e.g., via MAC CE) and/or triggered (e.g., via DCI), the WTRU 102 may indicate a preferred pattern as information of a CSI report. The indication may be based on a Preferred DM-RS Pattern Indicator (PDPI).

A WTRU 102 may indicate a preferred subset (e.g., one or more) of DM-RS configurations to be used by transmitting one or more PRACHs. The WTRU 102 may transmit a PRACH in an associated PRACH resource. For example, the WTRU 102 may indicate a first DM-RS pattern by transmitting a PRACH in a first PRACH resource and a second DM-RS pattern by transmitting a PRACH in a second PRACH resource.

A WTRU 102 may receive a confirmation (e.g., response) indicating to apply a reported DM-RS pattern, such as from a gNB 180 or other network access point. For the confirmation, the WTRU 102 may receive a CORESET configuration for receiving the confirmation. The WTRU 102 may apply the reported pattern after n+X, wherein n may be a slot for the confirmation reception and X may be a slot offset for the application of the pattern.

A set (e.g., a subset) of DM-RS configurations may be determined based on a shared channel scheduling type. For example, a WTRU 102 may determine a DM-RS pattern based on a scheduling type, such as single transport block scheduling, multiple transport block scheduling, single slot scheduling and/or multiple slot scheduling.

A set (e.g., a subset) of DM-RS configurations may be determined based on a scaling factor (e.g., F) for shared channel scheduling. A WTRU 102 may receive at least one shared channel scaling factor F. For example, the factor F may be applied as any of: (1) a minimum unit for allocation in the time domain may be F symbols, (2) a number of symbols per slot (e.g., 14×F symbols), (3) a (e.g., maximum) number of slots (or a transmission time interval) for a single shared channel (e.g., PDSCH and/or PUSCH) may be F slots, (4) a (e.g., minimum) unit for allocation in the frequency domain may be inversely proportional to F, (5) a number of subcarriers of a resource block may be a function of F (e.g., 12/F subcarriers), (6) a number of symbols in a resource block (e.g., in the time domain) may be a function of F (e.g., 14×F symbols), (7) a set of symbols or resource elements in which DM-RS is mapped for a channel (e.g., PDSCH, PUSCH and/or PUCCH) may be a function of a F for a given DMRS mapping type (e.g., proportional to F), (8) a set of symbols or resource elements in which UCI may be multiplexed in PUSCH may be a function of F and/or may be relative to the set of symbols used for DM-RS, (9) a unit (e.g., base number of slots) for any of the parameters K0, K1, K2 may be proportional to F (e.g., when F=2, a value of K0=3 may correspond to 6 slots).

A set (e.g., a subset) of DM-RS configurations may be determined based on a time duration (e.g., number of slots and/or number of symbols) of scheduled shared channels (e.g., PDSCH, PUSCH and/or PSSCH). For example, a WTRU 102 may receive a DCI which schedules one or more shared channels in a time duration. Upon condition that the time duration is smaller than (or equal to) a threshold, the WTRU 102 may transmit/receive the one or more shared channels with a first set of DM-RS configurations. Upon condition that the time duration is larger than the threshold, the WTRU 102 may transmit/receive the one or more shared channels with a second set of DM-RS configurations. The WTRU 102 may receive N thresholds and the WTRU 102 may be configured with N+1 sets of DM-RS configurations. Based on the N thresholds and N+1 sets of DM-RS configurations, the WTRU 102 may determine a set (e.g. subset) of DM-RS configurations.

A set (e.g., a subset) of DM-RS configurations may be determined based on a number of scheduled transport blocks. For example, a WTRU 102 may receive a DCI which schedules one or more shared channels comprising one or more transport blocks. Upon condition that a number of the one or more transport blocks is smaller than (or equal to) a threshold, the WTRU 102 may transmit/receive the one or more shared channels with a first set of DM-RS configurations. Upon condition that the number of the one or more transport blocks is larger than the threshold, the WTRU 102 may transmit/receive the one or more shared channels with a second set of DM-RS configurations. The WTRU 102 may receive N thresholds and the WTRU 102 may be configured with N+1 sets of DM-RS configurations. Based on the N thresholds and N+1 sets of DM-RS configurations, the UE may determine a set (e.g., subset) of DM-RS configurations.

Control channel DM-RS enhancement may be provided. A WTRU 102 may determine PDCCH DM-RS enhancement. The density of RSs in the frequency domain may be inversely proportional to an increase in SCS. The low RS density may decrease channel estimation performance of a PDCCH DM-RS in the frequency domain. Enhanced channel estimation performance of a PDCCH DM-RS may be provided, for example, by a gNB 180 and/or a WTRU 102 supporting one or more of the following: frequency hopping of a PDCCH DM-RS based on a REG index and/or a type of REG with an enhanced PDCCH DM-RS.

A WTRU 102 may determine a configuration of a PDCCH DM-RS enhancement. In an example, one or more PDCCH DM-RS types may be used. For example, a first PDCCH DM-RS type may be a single DM-RS pattern used for (e.g., all) REGs configured in a CORESET. A second PDCCH DM-RS type may be based one or more of following, where the DM-RS pattern may be RE locations of the PDCCH DM-RS within an REG.

One or more DM-RS patterns may be used. A DM-RS pattern (e.g., among the DM-RS patterns) may be determined, for example, based on at least one of the following: OFDM symbol index, REG index, REG index within an REG bundle, CCE index, search space identity, CORESET identity, BWP identity, carrier identity, subframe index, slot index, radio frame index, physical cell-ID, SSB index, and/or a WTRU related parameter (e.g., configured identity (id), WTRU identity (e.g., C-RNTI, IMSI, sTMSI, etc.).

A single DM-RS pattern may be used for (e.g., all) REGs configured in a CORESET. The density may be higher than the first PDCCH DM-RS type (e.g., more than three DM-RS REs per REG).

The first PDCCH DM-RS type may be referred to as a normal PDCCH DM-RS and the second PDCCH DM-RS type may be referred to as an enhanced DM-RS for monitoring PDCCH (e.g., or PDCCH DM-RS enhancement).

A WTRU 102 may determine a configuration of a PDCCH DM-RS enhancement based on an RRC. In an example, a configuration of PDCCH DM-RS enhancement may be based on one or more RRC messages. For example, a WTRU 102 may receive one or more RRC messages indicating a configuration of a PDCCH DM-RS enhancement. The configuration may be, for example, per WTRU, per BWP, per CORESET, per CORESET group and/or per SS. The WTRU 102 may (e.g., based on the configuration) receive an enhanced DM-RS for monitoring PDCCH.

A WTRU 102 may determine a configuration of a PDCCH DM-RS enhancement based on configured symbols or slots of an RRC. In an example, a configuration of a PDCCH DM-RS enhancement may be based on one or more RRC messages indicating whether one or more of symbols and/or slots are or are not using PDCCH DM-RS enhancement. For example, a WTRU 102 may receive one or more RRC messages indicating one or more of symbols and/or slots to be monitored, e.g., assuming PDCCH DM-RS enhancement.

A WTRU 102 may (e.g., based on the one or more RRC messages) monitor PDCCH, e.g., assuming PDCCH DM-RS enhancement in the one or more of symbols and/or slots.

A WTRU 102 may determine a configuration of a PDCCH DM-RS enhancement based on an AL.

In an example, configuration of PDCCH DM-RS enhancement may be based on a number of CCEs or an AL. For example, a WTRU 102 may determine whether to use PDCCH DM-RS enhancement based on the number of CCEs or the AL.

A WTRU 102 may determine a configuration of a PDCCH DM-RS enhancement based on a number of REGs in a REG bundle and/or a REG bundle size. For example, a WTRU 102 may determine whether to use PDCCH DM-RS enhancement or not based on the number of REGs in the REG bundle or the REG bundle size of CORESETs for PDCCH decoding.

A WTRU 102 may determine a configuration of a PDCCH DM-RS enhancement based on a DCI format. In an example, configuration of PDCCH DM-RS enhancement may be based on a DCI format. A WTRU 102 may determine whether to use PDCCH DM-RS enhancement, for example, based on monitoring a DCI format. For example, a WTRU 102 may monitor PDCCH without PDCCH DM-RS enhancement, for example, if the WTRU 102 is monitoring fallback DCI formats (e.g., DCI format 0_0, and/or DCI format 1_0). A WTRU 102 may monitor PDCCH assuming PDCCH DM-RS enhancement, for example, if the WTRU 102 is monitoring DCI formats other than fallback DCI formats (e.g., DCI format 0_1, and/or DCI format 1_1).

A WTRU 102 may determine a configuration of a PDCCH DM-RS enhancement based on frequency band. In an example, configuration of PDCCH DM-RS enhancement may be based on a frequency band. A WTRU 102 may monitor PDCCH without PDCCH DM-RS enhancement, for example, if an SS or a CORESET (e.g., which a WTRU 102 is monitoring via a PDCCH) is located in FR1. A WTRU 102 may monitor PDCCH assuming PDCCH DM-RS enhancement, for example, if an SS or a CORESET (e.g., which the WTRU 102 is monitoring) is located in above 52.6 GHz.

A WTRU 102 may determine a configuration of a PDCCH DM-RS enhancement based on system bandwidth and/or a bandwidth part size. In an example, configuration of PDCCH DM-RS enhancement may be based on system bandwidth or BWP size. A WTRU 102 may determine whether to use PDCCH DM-RS enhancement based on system bandwidth and/or BWP size, for example, if a WTRU 102 is monitoring an SS or a CORESET. A WTRU 102 may monitor PDCCH assuming PDCCH DM-RS enhancement, for example, if a system bandwidth or a BWP size of the SS or the CORESET is larger than a specific (e.g., threshold) bandwidth. A WTRU 102 may monitor PDCCH without PDCCH DM-RS enhancement, for example, if a system bandwidth or a BWP size of the SS or the CORESET is smaller than or equal to a specific (e.g., threshold) bandwidth. In another example, a WTRU 102 may monitor PDCCH assuming PDCCH DM-RS enhancement if system bandwidth or BWP size of the SS or the CORESET is smaller than or equal to a threshold. A WTRU 102 may monitor PDCCH without PDCCH DM-RS enhancement if system bandwidth or BWP size of the SS or the CORESET is larger than the threshold.

A WTRU 102 may determine a configuration of a PDCCH DM-RS enhancement based on an SCS. In an example, configuration of PDCCH DM-RS enhancement may be based on an SCS. A WTRU 102 may determine whether to use PDCCH DM-RS enhancement based on SCS of the SS and/or the CORESET, for example, if a WTRU 102 is monitoring an SS or a CORESET. A WTRU 102 may monitor PDCCH assuming PDCCH DM-RS enhancement, for example, if an SCS of the SS or the CORESET is larger than a specific (e.g., threshold) SCS. A WTRU 102 may monitor PDCCH without PDCCH DM-RS enhancement, for example, if an SCS of the SS or the CORESET is smaller than specific SCS.

A WTRU 102 may determine a configuration of a PDCCH DM-RS enhancement based on a group DCI. In an example, configuration of PDCCH DM-RS enhancement may be based on a group DCI. A WTRU 102 may monitor an SS and/or a CORESET assuming PDCCH DM-RS enhancement, for example, if a WTRU 102 receives a group DCI indicating PDCCH DM-RS enhancement. The indication of the group DCI may be, for example, per SS, per CORESET, and/or per CORESET group.

A WTRU 102 may determine a configuration of a PDCCH DM-RS enhancement based on SS type. In an example, configuration of PDCCH DM-RS enhancement may be based on an SS type. For example, a WTRU 102 may receive one or more RRC messages comprising one or more SS configurations. The one or more SS configurations may comprise, for example, an SS type for each of the one or more SS configurations. A WTRU 102 may (e.g., based on the SS type) determine whether to monitor PDCCH (e.g., assuming or not assuming PDCCH DM-RS enhancement). A WTRU 102 may monitor PDCCH without PDCCH DM-RS enhancement, for example, if the SS type is a common SS. A WTRU 102 may monitor PDCCH assuming PDCCH DM-RS enhancement, for example, if the SS type is WTRU-specific SS.

A WTRU 102 may determine a configuration of a PDCCH DM-RS enhancement based on combinations of configuration methods, e.g., as described herein. Configuration of PDCCH DM-RS enhancement may be based on combinations of configuration methods, e.g., as described herein.

A WTRU 102 may determine a configuration of a PDCCH DM-RS enhancement based on RRC and group DCI. In an example, a configuration may be based on RRC messages and a group DCI indication. For example, a WTRU 102 may receive one or more RRC messages indicating a configuration of PDCCH DM-RS enhancement for a WTRU, a SS, a CORESET, and/or a CORESET group. A WTRU 102 may (e.g., based on the configuration) receive a group DCI indicating PDCCH DM-RS enhancement for PDCCH monitoring. A WTRU 102 may (e.g., based on the configuration and the indication) monitor PDCCH assuming PDCCH DM-RS enhancement.

A WTRU 102 may determine a configuration of a PDCCH DM-RS enhancement based on SCS and DCI. In an example, a configuration may be based on SCS and a group DCI indication. An SCS of an SS and/or a CORESET may be configured, for example, when the WTRU 102 is monitoring the SS or the CORESET. A group DCI may indicate whether to use PDCCH DM-RS enhancement for monitoring PDCCH in the SS and/or the CORESET, for example, if the SCS is above an SCS threshold (e.g., 480 or 960 kHz).

A WTRU 102 may determine a configuration of a PDCCH DM-RS enhancement based on number of OFDM symbol configured for a CORESET. In an example, a determination whether to use enhanced DM-RS or not for PDCCH monitoring may be based on the number of OFDM symbols configured for a CORESET associated with the search spaces. A WTRU 102 may monitor the associated search space with enhanced DM-RS for PDCCH monitoring, for example, if one OFDM symbol is configured for a CORE-SET. A WTRU 102 may (e.g., otherwise) monitor the associated search space with a normal DM-RS for PDCCH monitoring. A WTRU 102 may (e.g., alternatively) monitor the associated search space with enhanced DM-RS for PDCCH monitoring, for example, when the number of OFDM symbol is larger than a threshold. The WTRU 102 may (e.g., otherwise) monitor the associated search space with a normal DM-RS for PDCCH monitoring.

A WTRU 102 may determine a configuration of a PDCCH DM-RS enhancement based on a slot bundling configured and/or indicated for the WTRU. For example, a WTRU 102 may monitor an associated search space with enhanced DM-RS for PDCCH monitoring if a first granularity (e.g., a slot or mini-slot) is configured for a WTRU. The WTRU 102 may (e.g., otherwise) monitor the associated search space with normal DM-RS for PDCCH monitoring. As another example, a WTRU 102 may monitor an associated search space with enhanced DM-RS for PDCCH monitoring when a number of bundled slots is larger than a threshold. The WTRU 102 may (e.g., otherwise) monitor the associated search space with normal DM-RS for PDCCH monitoring.

A WTRU 102 may determine frequency hopping of PDCCH DM-RS based on a REG index. In an example, frequency hopping of PDCCH DM-RS may be supported. FIG. 41 shows an example 4100 of frequency hopping of a PDCCH DM-RS 4102. For example, a WTRU 102 may receive PDCCH with a plurality of REGs. Each of the plurality of REGs 1004 may have different frequency locations of a PDCCH DM-RS. The WTRU 102 may assume that a wireless channel of a PDCCH DM-RS 4102 does not change and may jointly estimate a PDCCH DM-RS 4102 in the frequency domain. The WTRU 102 may achieve better channel estimation performance of a PDCCH DM-RS 4102, for example, due to increased PDCCH DM-RS density in the frequency domain. As shown by example in FIG. 41, the frequency hopping may be based on a REG index. For example, the PDCCH DM-RS 4102 of REG 1 may have 1 RE distance with PDCCH DM-RS 4102 of REG 0. PDCCH DM-RS 4102 of REG 2 may have 2 REs distance with PDCCH DM-RS 4102 of REG 0 (e.g., as well as 1 RE distance with PDCCH DM-RS of REG 1). The frequency hopping of PDCCH DM-RS 4102 may be based on, for example, one or more of REG index, REG bundle index, aggregation level of one or more associated search spaces, number of REGs in a CORESET, and REG bundle size. For example, a WTRU 102 may apply frequency hopping of PDCCH DM-RS 4102 within a REG bundle.

FIG. 41 shows an example 4100 of frequency hopping of a PDCCH DM-RS 4102.

A type of REG may be supported with enhanced PDDCH DM-RS. In an example, a REG for enhanced PDCCH DM-RS may be supported. FIG. 42 shows an example 4200 of a REG for enhanced PDCCH DM-RS. As shown by the example 4200 in FIG. 42, a REG 1004 may have a higher RS density than another REG. For example, a REG 1004 may have four or more REs 1008 for PDCCH DM-RS 4102 in the REG, e.g., to provide better channel estimation in the frequency domain.

FIG. 42 shows an example 4200 of a REG for an enhanced PDCCH DM-RS 4102.

One or more types of a REG 1004 may be used. A first type of REG 1004 may contain a first number of REs of a DM-RS and a second type of REG 1004 may contain a second number of REs of a DM-RS. For example, a first type of REG may contain three REs of a DM-RS and a second type of REG may contain six REs of a DM-RS. In an example, a type of REG may contain zero REs of a DM-RS.

A REG type may be determined based on, for example, one or more of subcarrier spacing, an operating frequency band, bandwidth, a number of OFDM symbols configured for an associated CORESET, a CORESET id, a REG index, a REG bundle index, a CCE index, a search space id, a BWP-id, a carrier index, a higher layer configuration, and/or a WTRU-specific parameter (e.g., WTRU-id).

A REG 1004 may be used interchangeably with a second REG type.

A WTRU 102 may determine PDCCH DM-RS 4102 skipping in some REGs. FIG. 43 is an example 4300 of PDCCH DM-RS skipping with an enhanced PDCCH DM-RS 4102. A group of REGs may not transmit PDCCH DM-RS, for example, if a WTRU 102 supports a second REG type with enhanced RS density in the frequency domain. FIG. 43 shows an example 4300 of a PDCCH DM-RS skipping with an enhanced PDCCH DM-RS 4102. For example, a WTRU 102 may receive a configuration of a CORESET.

The CORESET may comprise a plurality of REGs. The WTRU 102 may determine a first group of REGs and a second group of REGs of the plurality of REGs. The first group of REGs (e.g., REG 4302) may have an enhanced PDCCM DM-RS 4102 and the second group of REGs (e.g., REGs 4304 and/or 4306) may not have a PDCCH DM-RS. The WTRU 102 may monitor PDCCH, for example, based on the first group and the second group. A WTRU 102 may make a determination, for example, based on one or more of a REG index, a number of REGs in the CORESET, and/or REG bundle size. For example, a REG with an even REG index may have an enhanced PDCCH DM-RS 4102 while a REG with an odd REG index may not have a PDCCH DM-RS. Lower PDCCH DM-RS density may be supported, for example, instead of skipping a PDCCH DM-RS transmission.

FIG. 43 is an example 4300 of PDCCH DM-RS skipping with an enhanced PDCCH DM-RS 4102.

A WTRU 102 may use one or more PUCCH DM-RS types. FIG. 44 is an example 4400 of PUCCH DM-RS 4402 with an enhanced DM-RS frequency density and an example of another PUCCH DM-RS 4404 without enhancement. For example, a first (e.g., enhanced PUCCH DM-RS 4402) PUCCH DM-RS type may include any of a higher frequency density of PUCCH DM-RS 4402, a frequency hopping of PUCCH DM-RS and/or skipping of PUCCH DM-RS. A second PUCCH DM-RS type may be a PUCCH DM-RS 4404 without enhancement.

In certain representative embodiments, a WTRU 102 may use an enhanced PUCCH DM-RS type which includes a PUCHH DM-RS 4402 with an enhanced frequency density. For example, a WTRU 102 may apply more REs in a PUCCH symbol than the REs used in another PUCCH DM-RS type. An access point, such as a gNB 180, may assume a same channel in the time domain and may perform a better estimate a frequency domain channel when the WTRU 102 uses a PUCHH DM-RS type with enhanced frequency density.

FIG. 44 is an example 4400 of PUCCH DM-RS 4402 with an enhanced DM-RS frequency density and an example of another PUCCH DM-RS 4404 without enhancement.

In certain representative embodiments, a WTRU 102 may use an enhanced PUCCH DM-RS type which includes frequency hopping of PUCCH DM-RS 4402. For example, a WTRU 102 may apply different frequency RE positions (e.g., REs 4502, 4504, 4506) of PUCCH DM-RS REs based on time resources of PUCCH (e.g., symbol, mini-slot and/or slot). The time resources may be consecutive or may be non-consecutive. An access point, such as a gNB, may assume a same channel in the time domain and may perform a better estimate a frequency domain channel when the WTRU 102 uses an enhanced PUCCH DM-RS 4402 type which includes frequency hopping of the PUCCH DM-RS 4402.

FIG. 45 is an example 4500 of frequency hopping of a PUCCH DM-RS 4402.

In certain representative embodiments, a WTRU 102 may use an enhanced PUCCH DM-RS type which includes skipping of PUCCH DM-RS and/or PUCHH DM-RS with an enhanced frequency density. For example, a WTRU 102 may not transmit PUCCH DM-RS REs or may transmit PUCCH DM-RS REs with lower frequency density in certain PUCCH symbols (e.g., first one or more PUCCH symbols) in a PUCCH resource. A WTRU 102 may transmit PUCCH DM-RS REs or may transmit PUCCH DM-RS REs with higher frequency density in other certain PUCCH symbols (e.g., second one or more PUCCH symbols) in a PUCCH resource.

Figure 46:
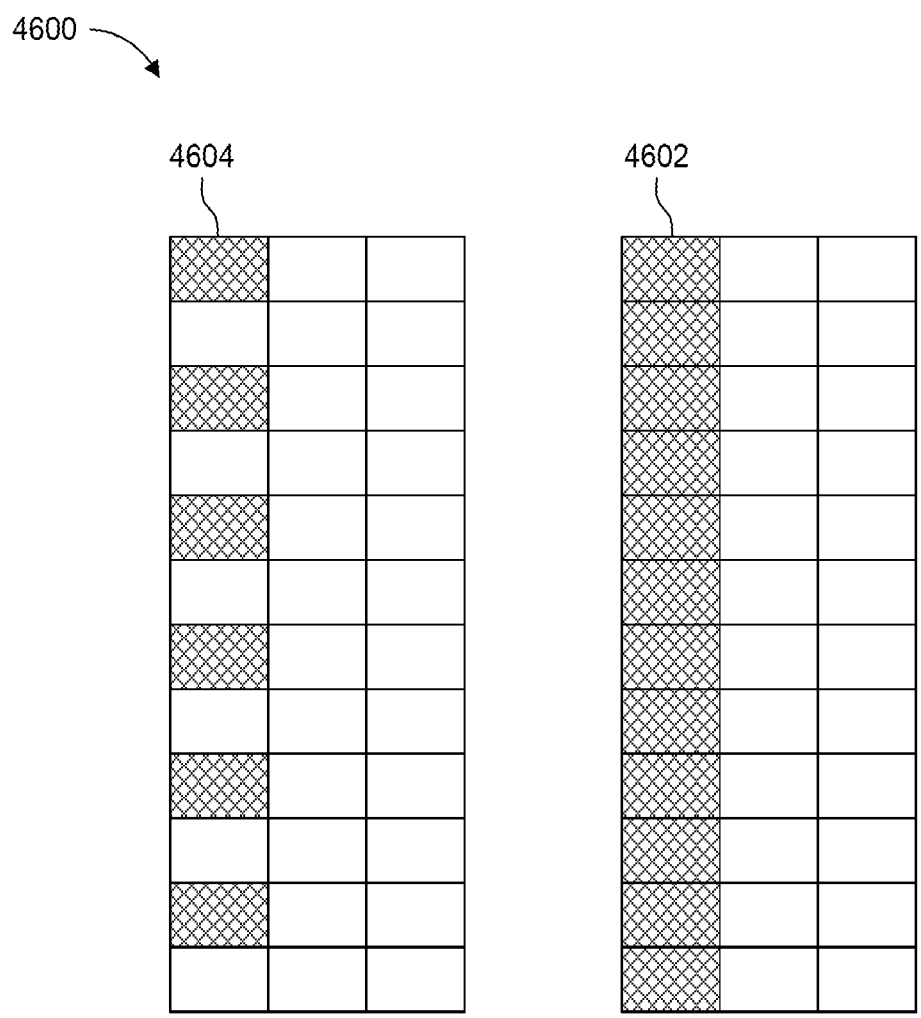
FIG. 46 is an example of PUCCH DM-RS skipping and PUCCH DM-RS with an enhanced DM-RS frequency density.

FIG. 46 is an example 4600 of PUCCH DM-RS skipping and PUCCH DM-RS with an enhanced DM-RS frequency density.

A first PUCCH DM-RS type or pattern (e.g., one or more of PUCCH DM-RS with enhanced frequency density, PUCCH DM-RS frequency hopping and PUCCH DM-RS skipping/DM-RS with enhanced frequency domain density) may be referred to as an enhanced PUCCH DM-RS 4602. A second PUCCH DM-RS type or pattern may be referred to as a normal PUCCH DM-RS 4604.

A WTRU 102 may determine a DM-RS type for PUCCH transmission based on any of an explicit indication, an implicit indication, a time duration, a PUCCH format, a PUCCH type, UCI, DM-RS multiplexing type, frequency resources of PUCCH, an additional DM-RS configuration, system bandwidth, a BWP size, a SCS, slot bundling, a number of slots, an interlace allocation, and/or intra-slot frequency hopping.

A WTRU 102 may determine a configuration of a PUCCH DM-RS enhancement based on an indication (e.g., explicit indication and/or implicit indication) from a network access point, such as a gNB 180. For example, a WTRU 102 may receive an indication from a gNB 180 via any of RRC, MAC CE and/or DCI. The indication may indicate whether to use an enhanced PUCCH DM-RS or not. Based on the indication, the UE may transmit one or more PUCCHs with enhanced PUCCH DM-RS. The DCI may be a group DCI. For example, when a WTRU 102 receives a group DCI which is indicating PUCCH DM-RS enhancement, the WTRU 102 may apply an enhanced PUCCH DM-RS for (e.g., any applicable) PUCCH resources and/or PUCCH formats. The indication of the group DCI may be per PUCCH resource, PUCCH resource group, BWP and/or WTRU.

A WTRU 102 may determine a configuration of a PUCCH DM-RS enhancement based on a configured time duration. The time duration may be a number of symbols, mini-slots and/or slots for PUCCH transmission. For example, a WTRU 102 may receive one or more RRC messages indicating a time duration (e.g., number of symbols/mini-slots/slots) to be used for PUCCH transmission. If the time duration is smaller than (or equal to) a threshold, the WTRU 102 may determine a first DM-RS pattern (e.g., normal PUCCH DM-RS) for PUCCH transmission. If the time duration is larger than the threshold, the WTRU 102 may determine a second DM-RS pattern (e.g., enhanced PUCCH DM-RS).

A WTRU 102 may determine a configuration of a PUCCH DM-RS enhancement based on a PUCCH format and/or a PUCCH type. For example, a WTRU 102 may determine whether to use an enhanced PUCCH DM-RS or not based on a configured PUCCH format for a PUCCH resource. For example, when a WTRU 102 is to transmit a PUCCH having a first PUCCH format and/or a first PUCCH type (e.g., any of PUCCH format 0, PUCCH format 1 and/or short PUCCH), the WTRU 102 may transmit the PUCCH with normal PUCCH DM-RS. When the WTRU 102 is transmitting a second PUCCH format and/or a second PUCCH type (e.g., any of PUCCH format 2, PUCCH format 3, PUCCH format 4 and/or long PUCCH), the WTRU 102 may transmit the PUCCH with enhanced PUCCH DM-RS.

A WTRU 102 may determine a configuration of a PUCCH DM-RS enhancement based on UCI and/or a DM-RS multiplexing type. For example, a WTRU 102 may determine whether to use an enhanced PUCCH DM-RS or not based on UCI and/or DM-RS multiplexing type for a PUCCH format. For example, when a WTRU 102 is to transmit a first PUCCH format with a first multiplexing type (e.g., TDM), the WTRU 102 may transmit the PUCCH with normal PUCCH DM-RS. When the WTRU 102 is to transmit a second PUCCH format with a second multiplexing type (e.g., FDM), the WTRU 102 may transmit the PUCCH with enhanced PUCCH DM-RS.

A WTRU 102 may determine a configuration of a PUCCH DM-RS enhancement based on frequency resources of a PUCCH resource and/or a PUCCH format. For example, the frequency resources may be a number of PRBs. For example, a WTRU 102 may determine whether to use an enhanced PUCCH DM-RS or not based on frequency resources of a PUCCH resource and/or a PUCCH format. For example, a WTRU 102 may receive one or more RRC messages indicating a frequency resource (e.g., number of PRBs) to be used for PUCCH transmission. If a size (e.g., number of PRBs) of the frequency resource is smaller than (or equal to) a threshold, the WTRU 102 may determine a first DM-RS pattern (e.g., normal PUCCH DM-RS) for PUCCH transmission. If a size of the frequency resource is larger than the threshold, the WTRU 102 may determine a second DM-RS pattern (e.g., enhanced PUCCH DM-RS).

As another example, a WTRU 102 may determine whether to use an enhanced PUCCH DM-RS or not based on available frequency resources of a configured PUCCH format for a PUCCH resource. For example, when a WTRU 102 is to transmit a first PUCCH format (e.g., any of PUCCH format 0, PUCCH format 1 and/or PUCCH format 4) with a first number of PRBs (e.g., one PRB), the WTRU 102 may transmit the PUCCH with normal PUCCH DM-RS. When the WTRU 102 is to transmit a second PUCCH format (e.g., any of PUCCH format 2 and/or PUCCH format 3) with a second number of PRBs (e.g., two or more PRBs), the WTRU 102 may transmit the PUCCH with enhanced PUCCH DM-RS.

A WTRU 102 may determine a configuration of a PUCCH DM-RS enhancement based on an additional DM-RS configuration. For example, a WTRU 102 may determine whether to use an enhanced PUCCH DM-RS or not based on an additional DM-RS configuration for a PUCCH format. For example, when a WTRU 102 is to transmit a first PUCCH format with additional DM-RS, the WTRU 102 may transmit the PUCCH with normal PUCCH DM-RS. When the WTRU 102 is to transmit a second PUCCH format without additional DM-RS, the WTRU 102 may transmit the PUCCH with enhanced PUCCH DM-RS (e.g., enhanced frequency domain density). In another example, when a WTRU 102 is to transmit a first PUCCH format without additional DM-RS, the WTRU 102 may transmit the PUCCH with normal PUCCH DM-RS. When the WTRU 102 is to transmit a second PUCCH format with additional DM-RS, the WTRU 102 may transmit the PUCCH with enhanced PUCCH DM-RS (e.g., frequency hopping).

A WTRU 102 may determine a configuration of a PUCCH DM-RS enhancement based on a system bandwidth and/or a BWP. For example, WTRU 102 may determine whether to use an enhanced PUCCH DM-RS or not based on a system bandwidth and/or a BWP size. For example, when the WTRU 102 is to transmit one or more PUCCHs, the WTRU 102 may determine whether to use PUCCH DM-RS enhancement or not based on system bandwidth or a BWP size. For example, when system bandwidth or BWP size (e.g., DL or UL) of the WTRU 102 is larger than a threshold, the WTRU 102 may transmit PUCCH without enhanced PUCCH DM-RS. When system bandwidth or the BWP size of the WTRU 102 is smaller than or equal to the threshold, the WTRU 102 may transmit PUCCH with enhanced PUCCH DM-RS.

A WTRU 102 may determine a configuration of a PUCCH DM-RS enhancement based on SCS. For example, a WTRU 102 may determine whether to apply enhanced PUCCH DM-RS or not based on a SCS of a BWP (e.g., uplink or downlink) and/or a PUCCH resource, such as on condition that the WTRU 102 is monitoring a SS and/or a CORESET. For example, if the SCS of the BWP and/or the PUCCH resource is larger than a threshold, the WTRU 102 may transmit PUCCH with enhanced PUCCH DM-RS. If the SCS of the BWP and/or the PUCCH resource is smaller than or equal to the threshold, the WTRU 102 may transmit PUCCH with normal PUCCH DM-RS.

A WTRU 102 may determine a configuration of a PUCCH DM-RS enhancement based on slot bundling and/or a number of slots for scheduling a shared channel. For example, WTRU 102 may determine whether to use an enhanced PUCCH DM-RS or not based on slot bundling and/or a number of slots for scheduling a shared channel. For example, when a WTRU 102 is to transmit one or more PUCCHs, the WTRU 102 may determine whether to use PUCCH DM-RS enhancement or not based on usage of slot bundling or the number of slots for scheduling. For example, when a WTRU 102 receives DCI which schedules a number of bundled slots which is larger than a threshold, the WTRU 102 may transmit the PUCCH without enhanced PUCCH DM-RS. When the WTRU 102 receives DCI which schedules a number of bundled slots which is smaller than or equal to the threshold, the WTRU 102 may transmit the PUCCH with enhanced PUCCH DM-RS.

A WTRU 102 may determine a configuration of a PUCCH DM-RS enhancement based on a configuration of an interlace allocation for a PUCCH resource and/or a PUCCH format. For example, when a WTRU 102 is to transmit one or more PUCCHs having a first PUCCH format and/or a first PUCCH resource with interlace allocation, the WTRU 102 may transmit the one or more PUCCHs with normal PUCCH DM-RS. When the WTRU 102 is to transmit one or more PUCCHs having a second PUCCH format and/or a second PUCCH resource without interlace allocation, the WTRU 102 may transmit the PUCCH with enhanced PUCCH DM-RS.

A WTRU 102 may determine a configuration of a PUCCH DM-RS enhancement based on a configuration of intra-slot frequency hopping. For example, when a WTRU 102 is to transmit one or more PUCCHs having a first PUCCH format and/or a first PUCCH resource with intra-slot frequency hopping, the WTRU 102 may transmit the one or more PUCCHs with normal PUCCH DM-RS. When the WTRU 102 is transmitting a second PUCCH format and/or a second PUCCH resource without intra-slot frequency hopping, the WTRU 102 may transmit the PUCCH with enhanced PUCCH DM-RS.

Figure 47:
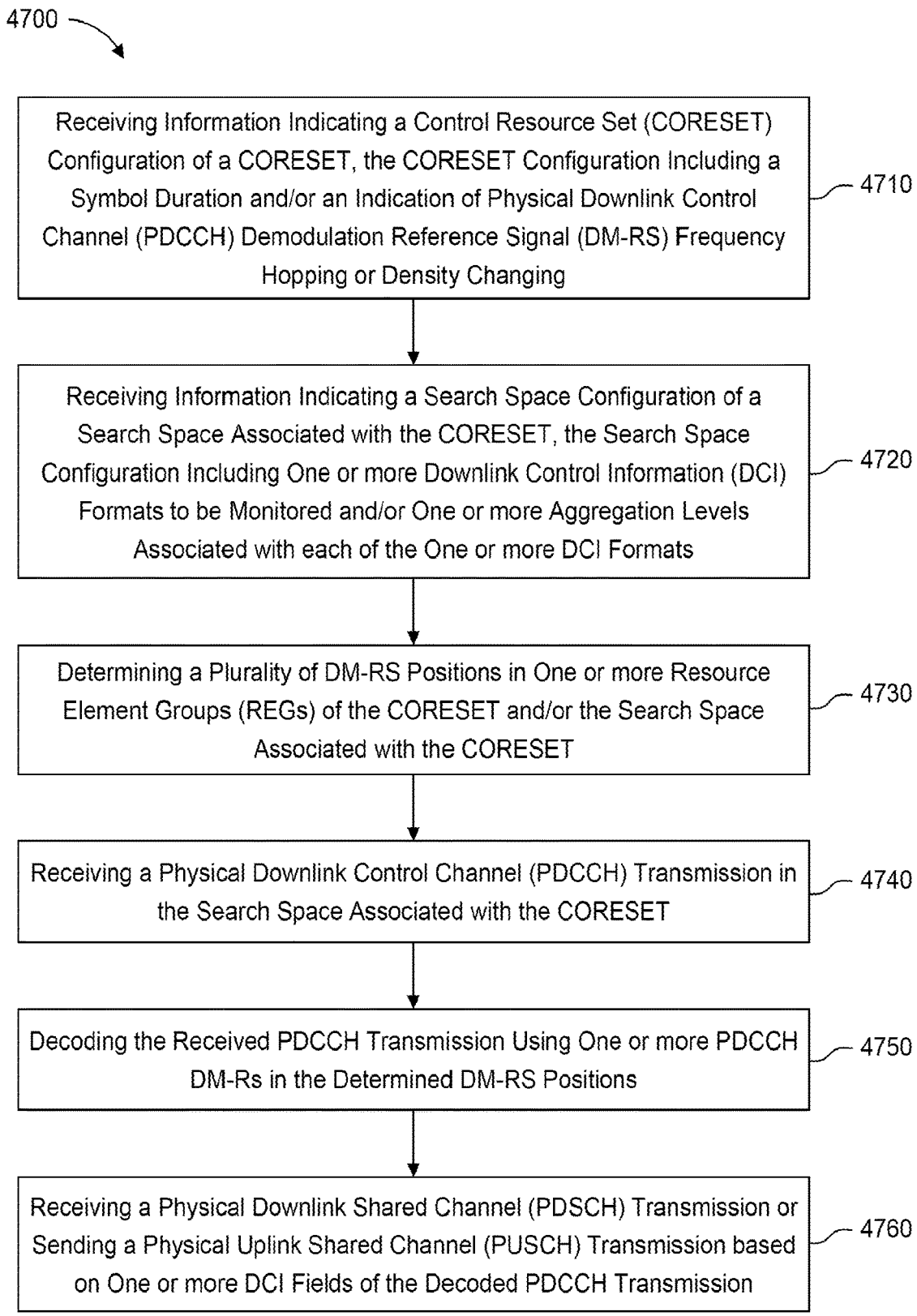
FIG. 47 is an example procedure that may be implemented by a WTRU to decode a PDDCH transmission with DM-RS using frequency hopping or density changing.

FIG. 47 is an example procedure that may be implemented by a WTRU 102 to decode a PDDCH transmission with DM-RS using frequency hopping or density changing. As shown in FIG. 47, a WTRU 102 may implement a procedure 4700 to decode a PDDCH transmission with DM-RS using frequency hopping or density changing. The procedure 4700 may begin at 4710 with the WTRU 102 receiving (e.g., from a gNB 180 or similar entity) information indicating a CORESET configuration of a CORESET. The CORESET configuration may include a symbol duration and/or an indication of PDCCH DM-RS frequency hopping or density changing. At 4720, the WTRU 102 may proceed to receiving information indicating a search space configuration of a search space associated with the CORESET. The search space configuration may include one or more DCI formats to be monitored and/or one or more aggregation levels associated with each of the one or more DCI formats. The reception at 4710 and/or 4720 may be performed, for example, according to the techniques described herein. At 4730, the WTRU 102 may determine a plurality of DM-RS positions in one or more REGs of the CORESET and/or the search space associated with the CORESET. After 4730, the WTRU 102 may receive a PDCCH transmission in the search space associated with the CORESET at 4740. The WTRU 102 perform decoding of the received PDCCH transmission using one or more PDCCH DM-RS in the determined DM-RS positions at 4750. After 4750, the WTRU 102 may proceed to receiving a PDSCH transmission or sending a PUSCH transmission based on one or more DCI fields of the decoded PDCCH transmission at 4760.

Figure 48:
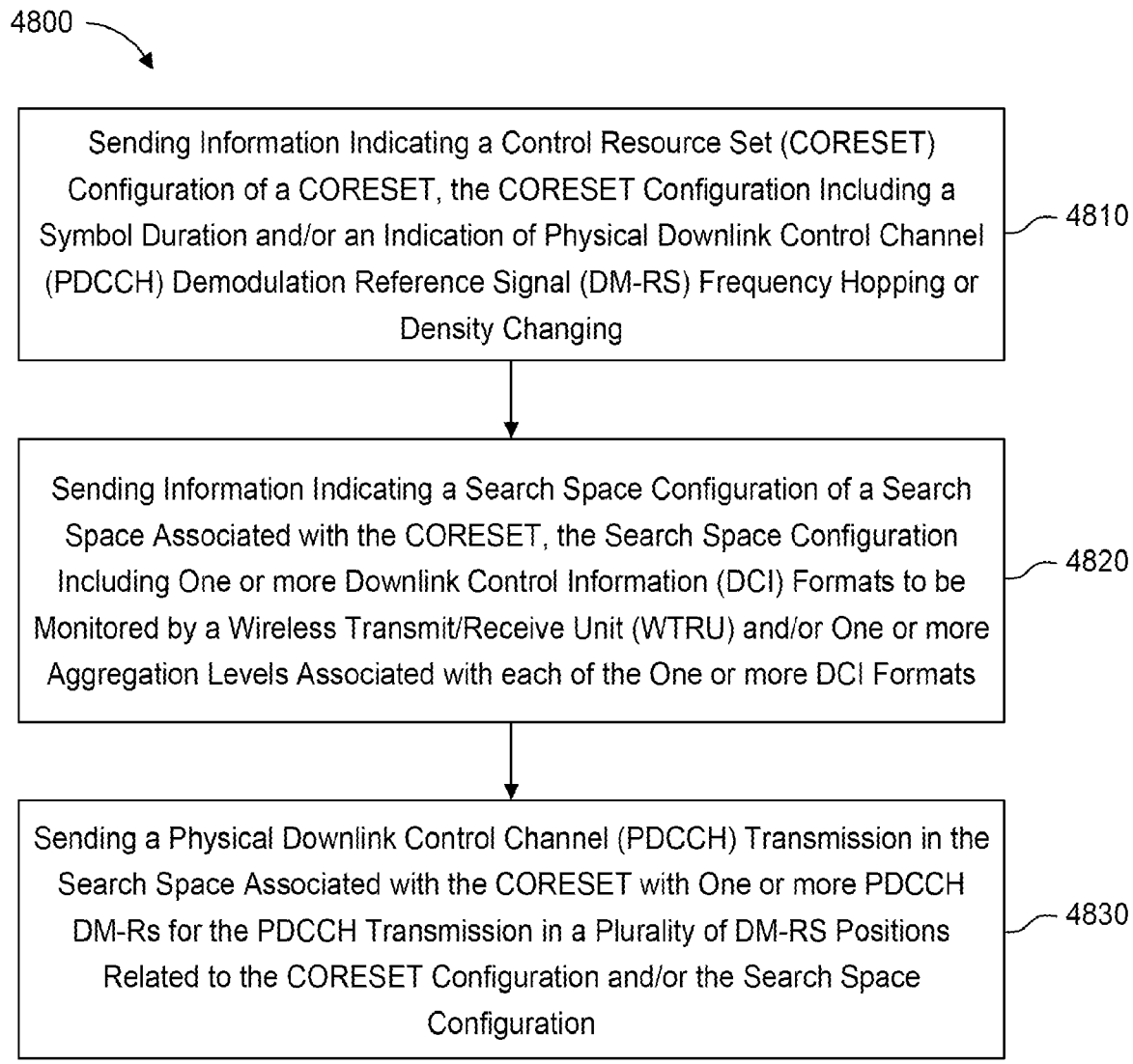
FIG. 48 is an example procedure that may be implemented by a RAN entity to send a PDDCH transmission with DM-RS using frequency hopping or density changing.

FIG. 48 is an example procedure that may be implemented by a RAN entity to send a PDDCH transmission with DM-RS using frequency hopping or density changing. As shown in FIG. 48, a RAN entity (e.g., a gNB 180 or similar entity) may implement a procedure 4800 to send a PDDCH transmission with DM-RS using frequency hopping or density changing. The procedure 4800 may begin at 4810 with the RAN entity sending (e.g., to a WTRU) information indicating a CORESET configuration of a CORESET. The CORESET configuration may include a symbol duration and/or an indication of PDCCH DM-RS frequency hopping or density changing. At 4820, the RAN entity may proceed to send information indicating a search space configuration of a search space associated with the CORESET. The search space configuration may include one or more DCI formats to be monitored by a WTRU 102 and/or one or more aggregation levels associated with each of the one or more DCI formats. The sending (e.g., transmission) at 4710 and/or 4720 may be performed, for example, according to the techniques described herein. After 4820, the RAN entity may send a PDCCH transmission in the search space associated with the CORESET with one or more PDCCH DM-RS for the PDCCH transmission in a plurality of DM-RS positions related to the CORESET configuration and/or the search space configuration. For example, the RAN entity may receive a PUSCH transmission or send a PDSCH transmission to the WTRU 102 following step 4830 based on DCI of the PDDCH transmission (e.g., as scheduled by the DCI) at 4830.

In certain representative embodiments, the plurality of DM-RS positions for the PDCCH DM-RS (e.g., in one or more REGS of the CORESET and/or the search space associated with the CORESET) may be determined based on (1) any of: the indication (e.g., frequency hopping or density changing), the symbol duration, the one or more DCI formats and/or the one or more aggregation levels, and (2) a respective REG index of each of the one or more REGs). For example, FIG. 6 shows an example 600 of a PDCCH 606 and FIG. 10 shows an example 1000 of CORESETs 1002, REGs 1004 and REs 1008.

In certain representative embodiments, the plurality of DM-RS positions may be in at least a first REG having a lowest respective REG index among the (e.g., one or more) REGs of the CORESET and/or the search space associated with the CORESET. For example, FIGS. 41 and 43 show examples 4100 4300 of frequency hopping of a PDCCH DM-RS 4102 and frequency skipping of a PDCCH DM-RS 4102. For example, in FIG. 41, the PDCCH DM-RS 4102 of REG 1 may have 1 RE distance with PDCCH DM-RS 4102 of REG 0. PDCCH DM-RS 4102 of REG 2 may have 2 REs distance with PDCCH DM-RS 4102 of REG 0 (e.g., as well as 1 RE distance with PDCCH DM-RS of REG 1). As another example, in FIG. 43, a REG with an even REG index may have an enhanced PDCCH DM-RS 4102 while a REG with an odd REG index may not have a PDCCH DM-RS (e.g., no PDCCH DM-RS located in the REs associated with the odd REG index). Lower PDCCH DM-RS density may be supported, for example, instead of skipping a PDCCH DM-RS transmission. One or more representative criteria and/or conditions as described herein may be used for determining the PDDCH DM-RS positions.

Figure 49:
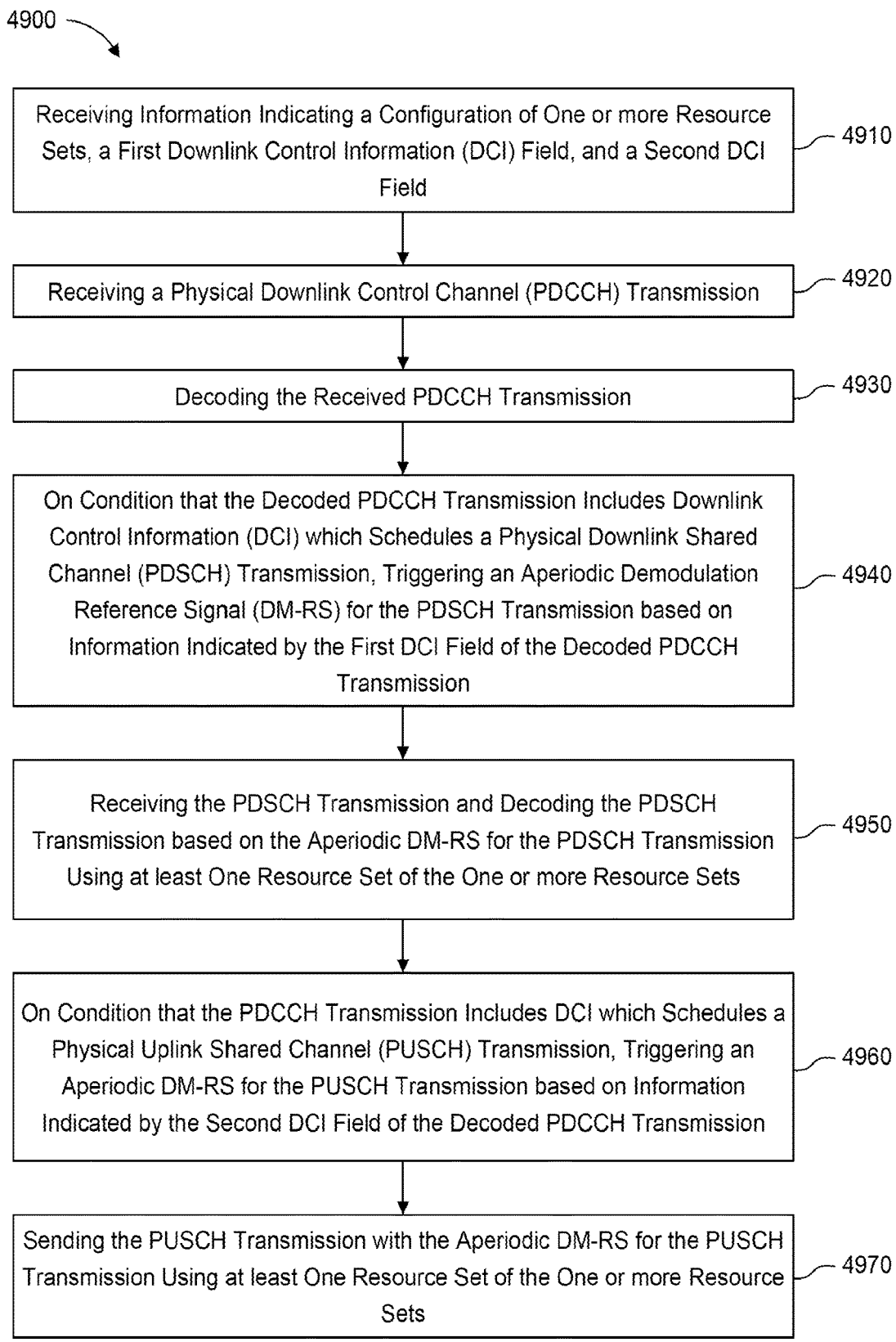
FIG. 49 is an example procedure that may be implemented by a WTRU to trigger DM-RS enhancement for a PDSCH transmission and/or a PUSCH transmission.

FIG. 49 is an example procedure that may be implemented by a WTRU 102 to trigger DM-RS enhancement for a PDSCH transmission and/or a PUSCH transmission. As shown in FIG. 49, a WTRU 102 may implement a procedure 4900 to trigger DM-RS enhancement for any of a PDSCH transmission and/or a PUSCH transmission. The procedure 4900 may begin at 4910 with the WTRU 102 receiving (e.g., from a gNB 180 or similar entity) information indicating a configuration of one or more resource sets, a first DCI field, and a second DCI field. For example, the information indicating the configuration may be received via any of RRC, MAC CE and/or DCI. The one or more resource sets of the configuration may include any of CSI-RS resource sets and/or SRS resource sets. The CSI-RS resource sets may include aperiodic CSI-RS resources (e.g., AP CSI-RS resource sets). The SRS resource sets may include aperiodic SRS resources (e.g., AP SRS resource sets). At 4920, the WTRU 102 may proceed to receiving (e.g., from a gNB 180 or similar entity) a PDCCH transmission. The PDCCH transmission may be decoded at 4930. At 4940, on condition that the decoded PDCCH transmission includes DCI which schedules a PDSCH transmission, triggering may occur (e.g., at the WTRU) for at least one aperiodic demodulation reference signal (DM-RS) for the PDSCH transmission based on information indicated by the first DCI field of the decoded PDCCH transmission. For example, the aperiodic DM-RS may use the same resources and/or signal of the aperiodic CSI-RS and/or SRS as described herein. The first DCI field may be a CSI request field. The CSI request field may trigger the WTRU 102 to determine one or more CSI-RS resource sets (e.g., associated with the one or more CSI report configs) for any additional DM-RSs. From 4940, the WTRU 102 may proceed at 4950 to receiving (e.g., from a gNB or similar entity) the PDSCH transmission based on the (e.g., one or more) aperiodic DM-RS for the PDSCH transmission using at least one resource set of the one or more resource sets (e.g., the determined resource sets). After receiving the PDSCH transmission, the WTRU 102 may proceed to decode the PDSCH transmission using the aperiodic DM-RS for the PDSCH transmission.

At 4960, on condition that the PDCCH transmission includes DCI which schedules a PUSCH transmission, triggering may occur (e.g., at the WTRU) for at least one aperiodic DM-RS for the PUSCH transmission based on information indicated by the second DCI field of the decoded PDCCH transmission. For example, the second DCI field may be a SRS request field. The SRS request field may trigger the WTRU 102 to determine one or more SRS resource sets for any additional DM-RSs (e.g., AP SRS resource sets activated by the SRS field). From 4960, the WTRU 102 may proceed at 4970 to sending (e.g., from a gNB 180 or similar entity) the PUSCH transmission with the (e.g., one or more) aperiodic DM-RS for the PUSCH transmission using at least one resource set of the one or more resource sets.

In certain representative embodiments, the WTRU 102 may omit any of 4940 to 4970. The omission may be based on whether one of the first DCI field or the second DCI field is absent from the configuration at 4910. In some representative embodiments, on condition that an indication for the first DCI field is received, the WTRU 102 may omit processing (e.g., 4960 and 4970) associated with the PUSCH transmission. In other representative embodiments, on condition that an indication for the second DCI field is received, the WTRU 102 may omit processing (e.g., 4940 and 4950) associated with the PDSCH transmission.

Figure 50:
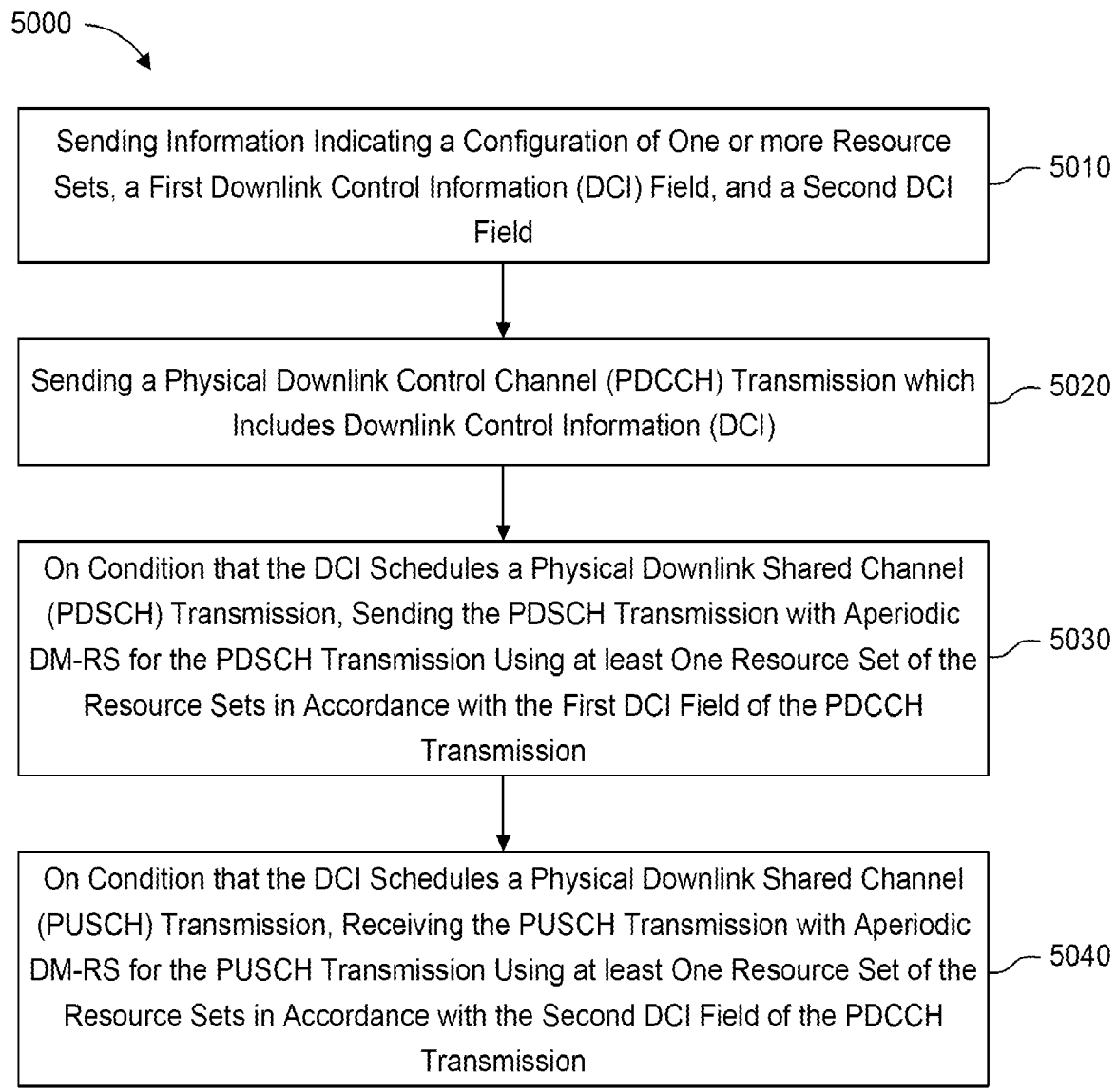
FIG. 50 is an example procedure that may be implemented by a RAN entity to trigger DM-RS enhancement at a WTRU for a PDSCH transmission and/or a PUSCH transmission.

FIG. 50 is an example procedure that may be implemented by a RAN entity to trigger DM-RS enhancement at a WTRU 102 for a PDSCH transmission and/or a PUSCH transmission. As shown in FIG. 50, a RAN entity (e.g., a gNB 180 or similar entity) may implement a procedure 5000 to trigger DM-RS enhancement for any of a PDSCH transmission and/or a PUSCH transmission. The procedure 5000 may begin at 5010 with the RAN entity sending information indicating a configuration of one or more resource sets, a first downlink control information (DCI) field, and a second DCI field. For example, the information indicating the configuration may be received via any of RRC, MAC CE and/or DCI. The one or more resource sets of the configuration may include any of CSI-RS resource sets and/or SRS resource sets. The CSI-RS resource sets may include aperiodic CSI-RS resources (e.g., AP CSI-RS resource sets). The SRS resource sets may include aperiodic SRS resources (e.g., AP SRS resource sets). After 5010, the RAN entity may proceed at 5020 with sending a PDCCH transmission which includes DCI. At 5030, on condition that the DCI schedules a PDSCH transmission, the RAN entity may proceed to sending (e.g., as scheduled) the PDSCH transmission with the AP DM-RS for the PDSCH transmission. The RAN entity may send the (e.g., one or more) AP DM-RS for the PDSCH transmission using at least one resource set of the resource sets (e.g., of the configuration) in accordance with the first DCI field of the PDCCH transmission. For example, the first DCI field may be a CSI request field. The CSI request field may trigger the WTRU 102 to determine the one or more CSI-RS resource sets (e.g., associated with the one or more CSI report configs) for any additional DM-RSs. As another example, the second DCI field may be a SRS request field. The SRS request field may trigger the WTRU 102 to determine the one or more SRS resource sets for any additional DM-RSs (e.g., AP SRS resource sets activated by the SRS field). At 5040, on condition that the DCI schedules a PUSCH transmission, the RAN entity may proceed to receiving (e.g., as scheduled) the PUSCH transmission with the AP DM-RS for the PUSCH transmission. The RAN entity may send the (e.g., one or more) AP DM-RS for the PUSCH transmission using at least one resource set of the resource sets (e.g., of the configuration) in accordance with the second DCI field of the PDCCH transmission.

In certain representative embodiments, the 5030 or 5040 may be omitted. The omission may be based on whether one of the first DCI field or the second DCI field is present/absent from the configuration at 5010. In some representative embodiments, on condition that an indication for the first DCI field is sent, the processing (e.g., 5040) associated with the PUSCH transmission may be omitted. In other representative embodiments, on condition that an indication for the second DCI field is sent, the processing (e.g., 5030) associated with the PDSCH transmission may be omitted.

Examples of additional DM-RS with AP CSI-RS for PDSCH and PUSCH decoding are described herein, such as in relation to FIGS. 13 and 14. Examples of additional DM-RS using SRS for PDSCH and PUSCH decoding are described herein, such as in relation to FIGS. 18 and 19.

Figure 51:
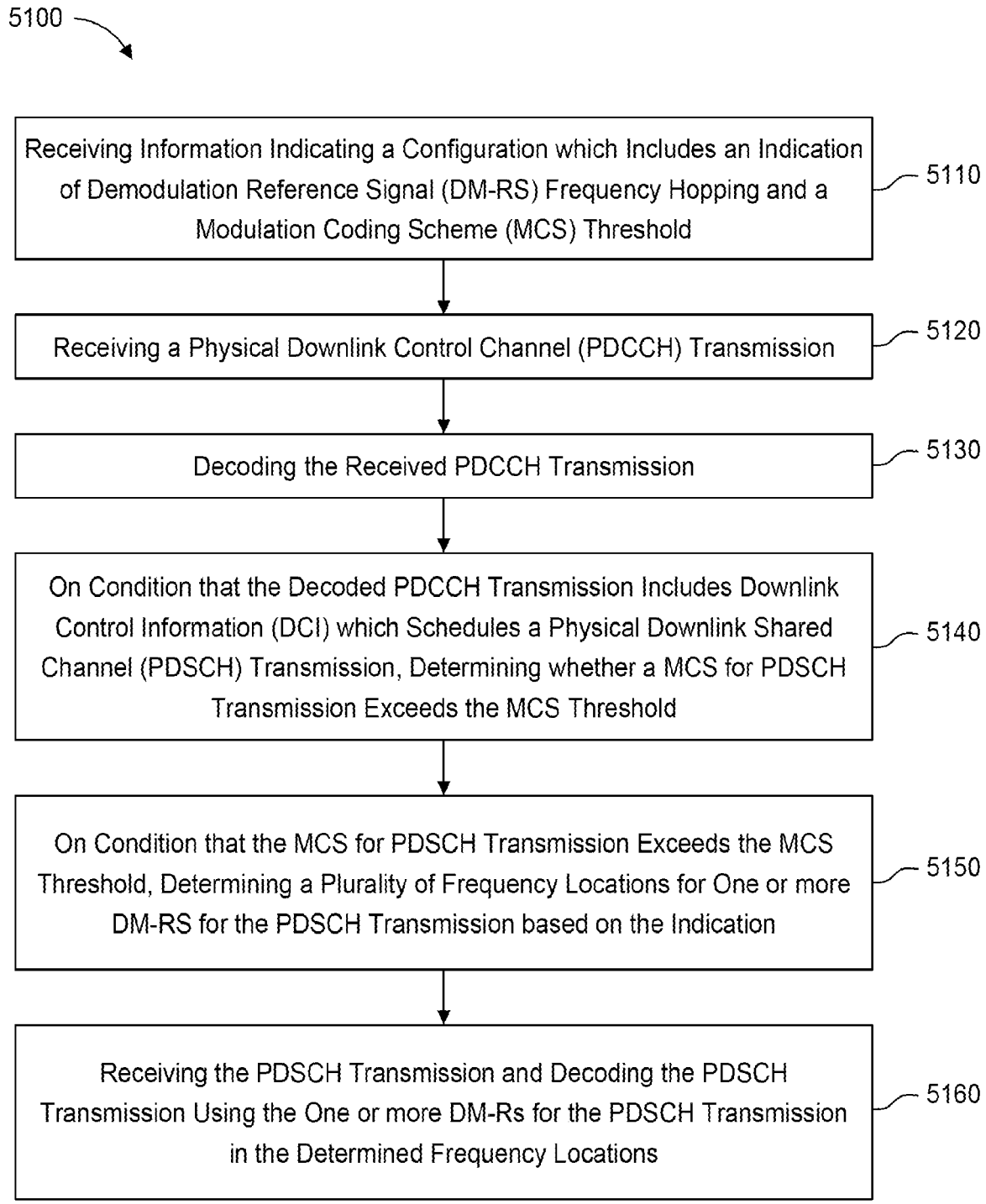
FIG. 51 is an example procedure that may be implemented by a WTRU to receive a PDSCH transmission using a modulation and coding scheme (MCS) threshold and DM-RS frequency hopping.

FIG. 51 is an example procedure that may be implemented by a WTRU 102 to receive a PDSCH transmission using a modulation and coding scheme (MCS) threshold and DM-RS frequency hopping. As shown in FIG. 51, a WTRU 102 may implement a procedure 5100 to receive a PDSCH transmission and decode the PDSCH transmission. The procedure 5100 may begin with the WTRU 102 receiving (e.g., from a gNB 180 or similar entity) information indicating a configuration which includes an indication of demodulation reference signal (DM-RS) frequency hopping and a MCS threshold at 5110. After, the WTRU 102 may proceed to receiving a PDCCH transmission at 5120. The WTRU 102 may perform decoding of the PDCCH transmission at 5130. On condition that the decoded PDCCH transmission includes downlink control information (DCI) which schedules a PDSCH transmission, the WTRU 102 may proceed to determining whether a MCS for the PDSCH transmission exceeds the MCS threshold at 5140. On condition that the MCS for PDSCH transmission exceeds the MCS threshold, the WTRU 102 may proceed to determining a plurality of frequency locations of one or more DM-RSs for the PDSCH transmission based on the indication at 5150. After 5150, the WTRU 102 may proceed to receiving (e.g., as scheduled) the PDSCH transmission with the (e.g., one or more) DM-RS for the PDSCH transmission at 5160. The WTRU 102 may also perform receiving of one or more DM-RSs for the PDSCH transmission in the determined frequency locations. The WTRU 102 may perform decoding of the PDSCH transmission using the one or more DM-RSs for the PDSCH transmission which are received in the determined frequency locations at 5160.

Figure 52:
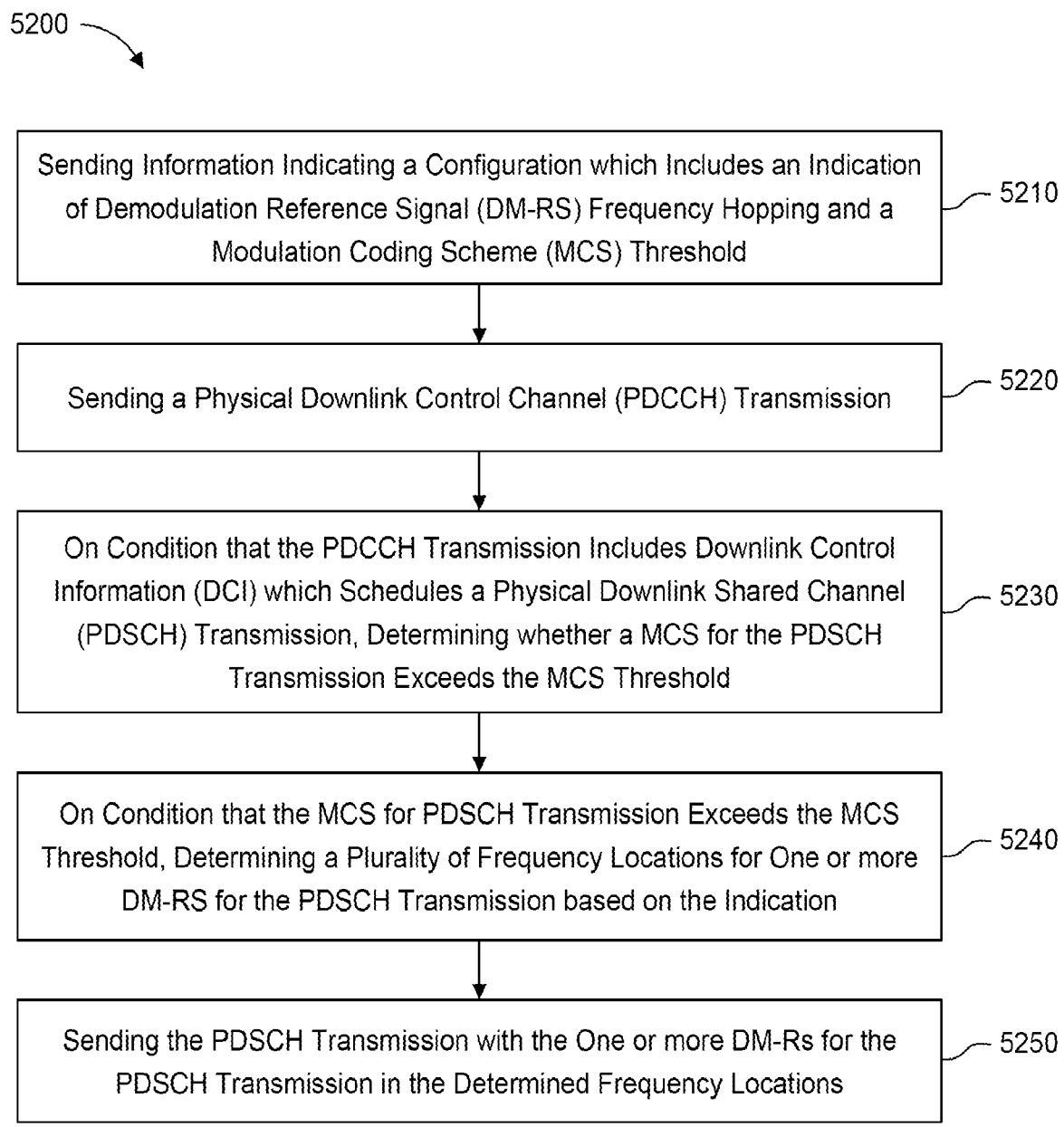
FIG. 52 is an example procedure that may be implemented by a RAN entity to send a PDSCH transmission using a MCS threshold and DM-RS frequency hopping.

FIG. 52 is an example procedure that may be implemented by a RAN entity to send a PDSCH transmission using a MCS threshold and DM-RS frequency hopping. As shown in FIG. 52, a RAN entity (e.g., a gNB 180 or similar entity) may implement a procedure 5200 to send a PDSCH transmission. The procedure 5200 may begin with the RAN entity sending information indicating a configuration which includes an indication of demodulation reference signal (DM-RS) frequency hopping and a modulation coding scheme (MCS) threshold at 5210. After, the RAN entity may proceed to sending a PDCCH transmission. At 5230, on condition that the PDCCH transmission includes downlink control information (DCI) which schedules a PDSCH transmission, the RAN entity may determine whether a MCS for the PDSCH transmission exceeds the MCS threshold at 5230. At 5240, on condition that the MCS for PDSCH transmission exceeds the MCS threshold, determining a plurality of frequency locations for one or more DM-RS for the PDSCH transmission based on the indication. After, at 5250, the RAN entity may proceed to sending the PDSCH transmission (e.g., as scheduled) with the (e.g., one or more) DM-RS for the PDSCH transmission in the determined frequency locations.

Figure 53:
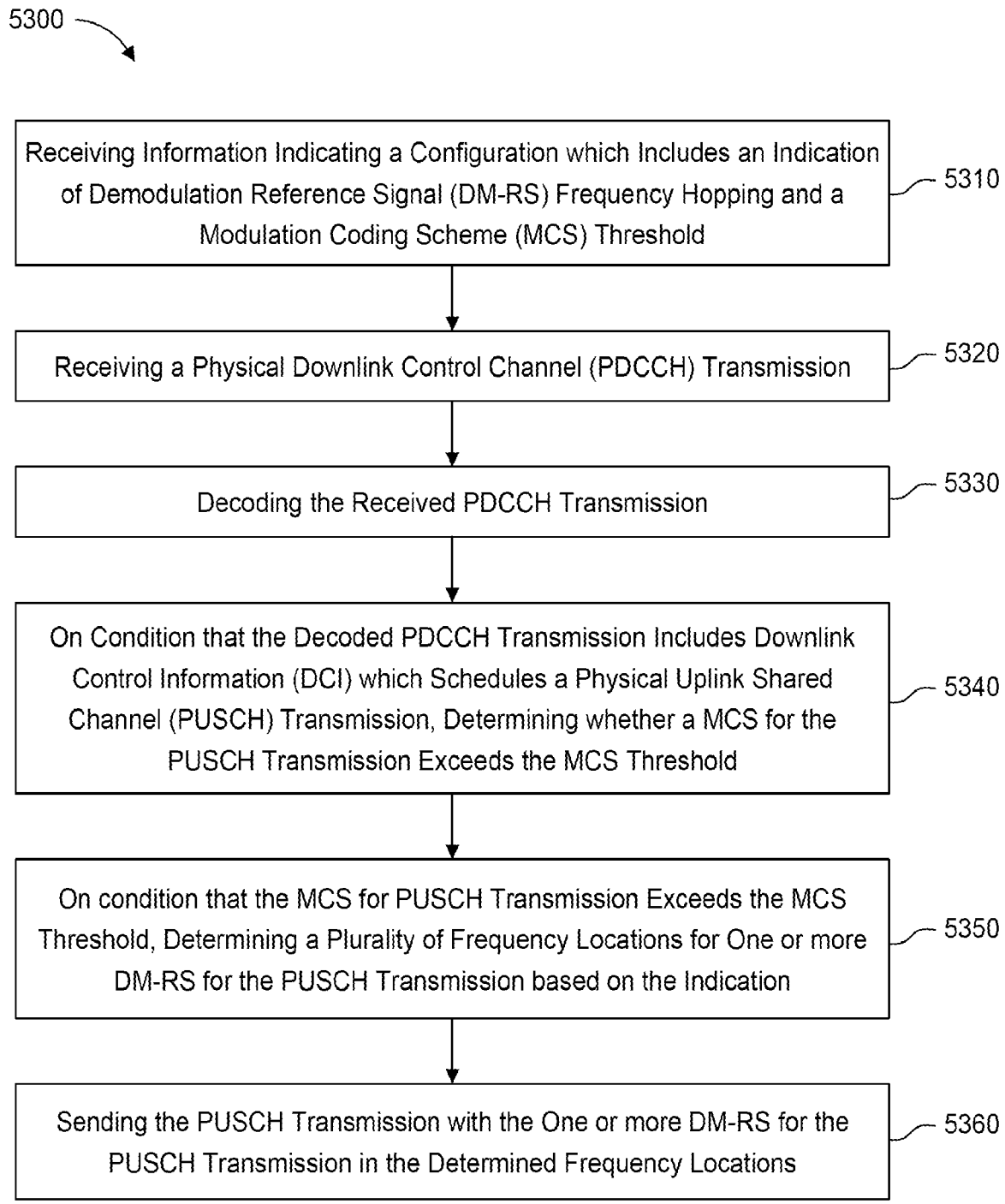
FIG. 53 is an example procedure that may be implemented by a WTRU to send a PUSCH transmission using a MCS threshold and DM-RS frequency hopping.

FIG. 53 is an example procedure that may be implemented by a WTRU 102 to send a PUSCH transmission using a MCS threshold and DM-RS frequency hopping. As shown in FIG. 53, a WTRU 102 may implement a procedure 5300 to receive a PUSCH transmission and decode the PUSCH transmission. The procedure 5300 may begin with the WTRU 102 receiving (e.g., from a gNB 180 or similar entity) information indicating a configuration which includes an indication of demodulation reference signal (DM-RS) frequency hopping and a modulation coding scheme (MCS) threshold at 5310. After, the WTRU 102 may proceed to receiving a PDCCH transmission at 5320. The WTRU 102 may perform decoding of the PDCCH transmission at 5130. On condition that the decoded PDCCH transmission includes downlink control information (DCI) which schedules a PUSCH transmission, the WTRU 102 may proceed to determining whether a MCS for the PUSCH transmission exceeds the MCS threshold at 5340. On condition that the MCS for PUSCH transmission exceeds the MCS threshold, the WTRU 102 may proceed to determining a plurality of frequency locations of one or more DM-RSs for the PUSCH transmission based on the indication at 5350. After 5350, the WTRU 102 may proceed to sending (e.g., as scheduled) the PUSCH transmission with the (e.g., one or more) DM-RS for the PUSCH transmission in the determined frequency locations at 5360.

Figure 54:
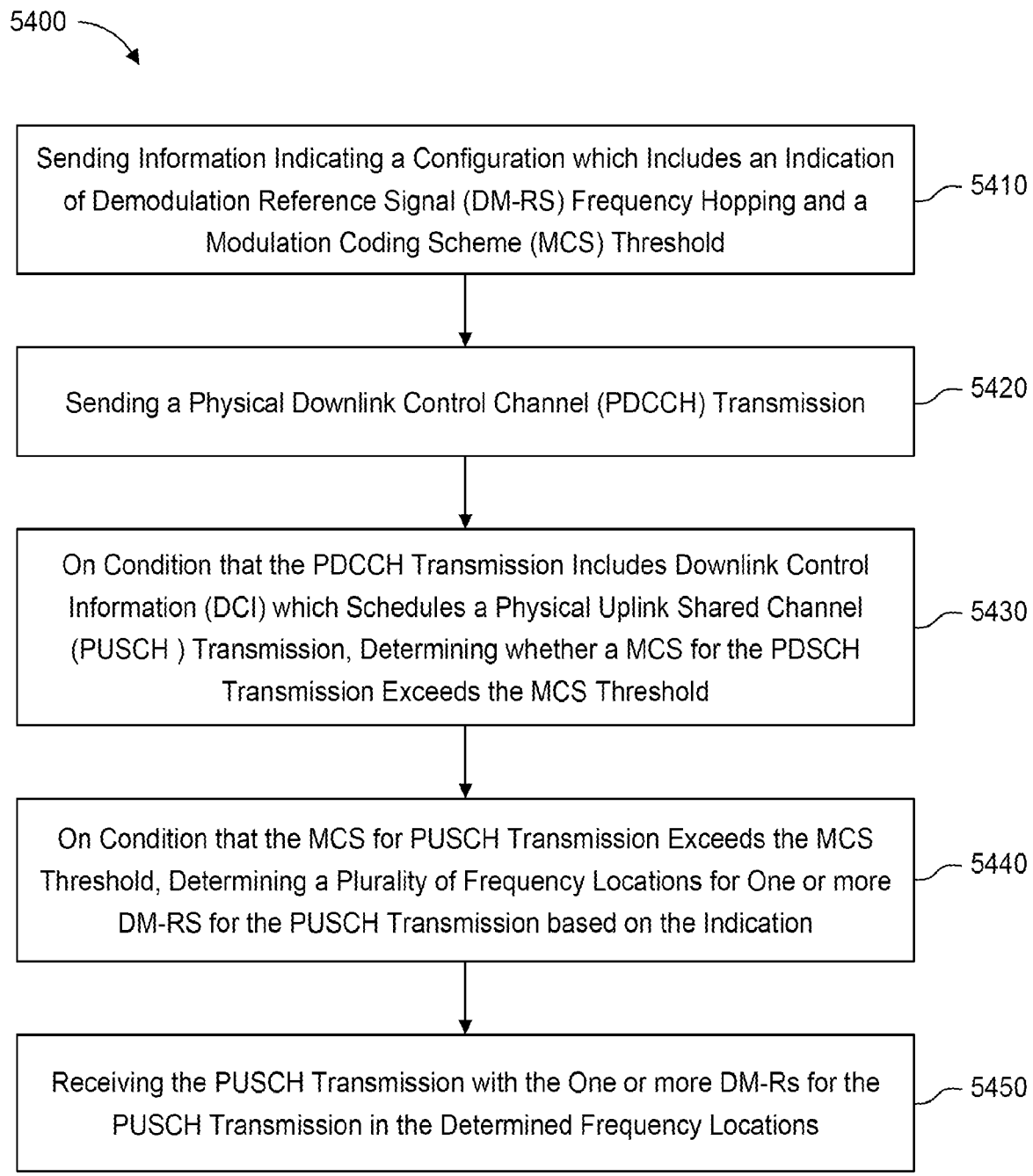
FIG. 54 is an example procedure that may be implemented by a RAN entity to receive a PUSCH transmission using a MCS threshold and DM-RS frequency hopping.

FIG. 54 is an example procedure that may be implemented by a RAN entity to receive a PUSCH transmission using a MCS threshold and DM-RS frequency hopping. As shown in FIG. 54, a RAN entity (e.g., a gNB 180 or similar entity) may implement a procedure 5400 to receive a PUSCH transmission. The procedure 5400 may begin with the RAN entity sending information indicating a configuration which includes an indication of demodulation reference signal (DM-RS) frequency hopping and a modulation coding scheme (MCS) threshold at 5410. After, the RAN entity may proceed to sending a PDCCH transmission. At 5430, on condition that the PDCCH transmission includes downlink control information (DCI) which schedules a PUSCH transmission, the RAN entity may determine whether a MCS for the PUSCH transmission exceeds the MCS threshold at 5230. At 5440, on condition that the MCS for PUSCH transmission exceeds the MCS threshold, determining a plurality of frequency locations for one or more DM-RS for the PUSCH transmission based on the indication. After, at 5450, the RAN entity may proceed to receiving (e.g., as scheduled) the PUSCH transmission with the (e.g., one or more DM-RS) for the PDSCH transmission in the determined frequency locations. The PUSCH transmission may then be decoded based on the received one or more DM-RSs.

In certain representative embodiments, the MCS for a PUSCH and/or a PDSCH may be above (e.g., exceeds) the SCS threshold (e.g., 480 or 960 kHz). For example, the determined frequency locations may be used to respectively receive and/or transmit higher density DM-RSs as described herein. A WTRU 102 may determine REs (e.g., frequency locations) for reception and/or transmission of the higher density DM-RSs. For example, the DM-RSs may be single-symbol or double-symbol DM-RSs.

Figure 55:
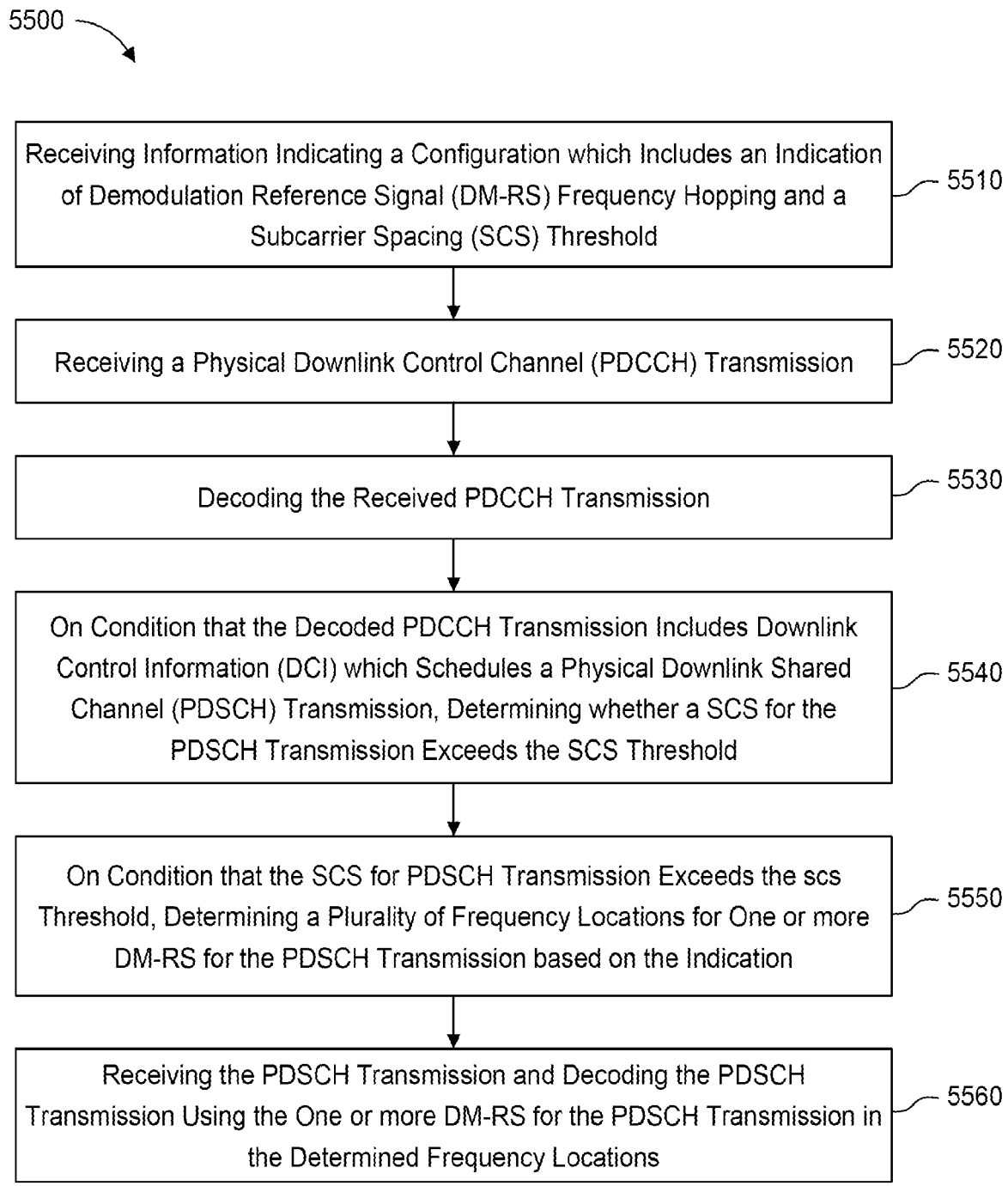
FIG. 55 is an example procedure that may be implemented by a WTRU to receive a PDSCH transmission using a subcarrier spacing (SCS) threshold and DM-RS frequency hopping.

FIG. 55 is an example procedure that may be implemented by a WTRU 102 to receive a PDSCH transmission using a subcarrier spacing (SCS) threshold and DM-RS frequency hopping. As shown in FIG. 55, a WTRU 102 may implement a procedure 5500 to receive a PDSCH transmission and decode the PDSCH transmission. The procedure 5500 may begin with the WTRU 102 receiving (e.g., from a gNB 180 or similar entity) information indicating a configuration which includes an indication of demodulation reference signal (DM-RS) frequency hopping and a subcarrier spacing (SCS) threshold at 5510. After, the WTRU 102 may proceed to receiving a PDCCH transmission at 5520. The WTRU 102 may perform decoding of the PDCCH transmission at 5530. On condition that the decoded PDCCH transmission includes downlink control information (DCI) which schedules a PDSCH transmission, the WTRU 102 may proceed to determining whether a SCS for the PDSCH transmission exceeds the SCS threshold at 5540. On condition that the SCS for PDSCH transmission exceeds the SCS threshold, the WTRU 102 may proceed to determining a plurality of frequency locations of one or more DM-RSs for the PDSCH transmission based on the indication at 5550. After 5550, the WTRU 102 may proceed to receiving (e.g., as scheduled) the PDSCH transmission (e.g., as scheduled) with the (e.g., one or more) DM-RS and decoding the PDSCH transmission using the DM-RS for the PDSCH transmission in the determined frequency locations at 5560.

Figure 56:
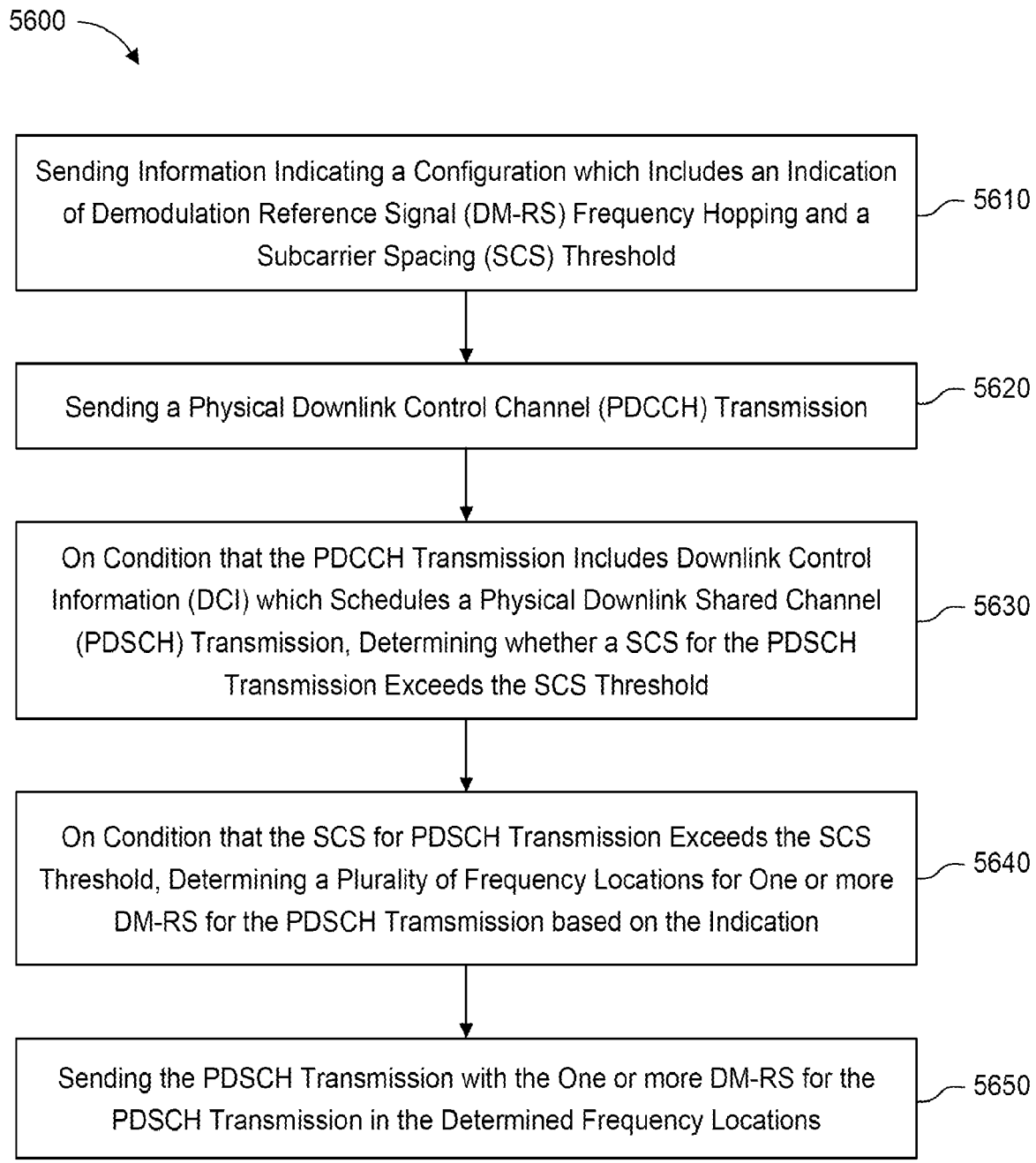
FIG. 56 is an example procedure that may be implemented by a RAN entity to send a PDSCH transmission using a SCS threshold and DM-RS frequency hopping.

FIG. 56 is an example procedure that may be implemented by a RAN entity to send a PDSCH transmission using a SCS threshold and DM-RS frequency hopping. As shown in FIG. 56, a RAN entity (e.g., a gNB 180 or similar entity) may implement a procedure 5600 to send a PDSCH transmission. The procedure 5600 may begin with the RAN entity sending information indicating a configuration which includes an indication of demodulation reference signal (DM-RS) frequency hopping and a SCS threshold at 5610. After, the RAN entity may proceed to sending a PDCCH transmission at 5620. At 5630, on condition that the PDCCH transmission includes downlink control information (DCI) which schedules a PDSCH transmission, the RAN entity may determine whether a SCS for the PDSCH transmission exceeds the SCS threshold at 5630. At 5640, on condition that the SCS for PDSCH transmission exceeds the SCS threshold, determining a plurality of frequency locations for one or more DM-RS for the PDSCH transmission based on the indication. After, at 5650, the RAN entity may proceed to sending (e.g., as scheduled) the PDSCH transmission with the (e.g., one or more) DM-RS for the PDSCH transmission. The RAN entity may send the one or more DM-RSs for the PDSCH transmission in the determined frequency locations at 5650.

Figure 57:
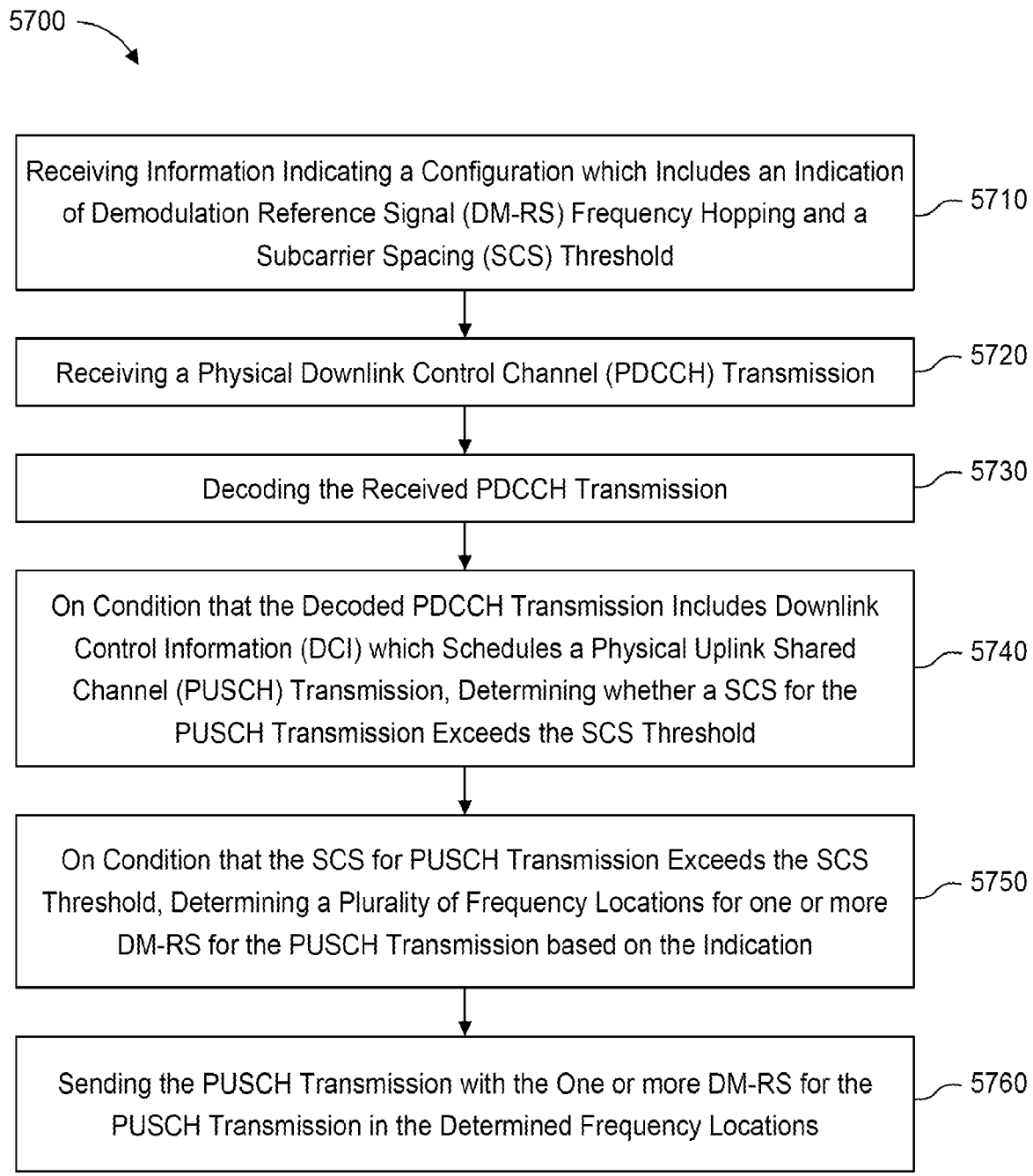
FIG. 57 is an example procedure that may be implemented by a WTRU to send a PUSCH transmission using a SCS threshold and DM-RS frequency hopping.

FIG. 57 is an example procedure that may be implemented by a WTRU 102 to send a PUSCH transmission using a SCS threshold and DM-RS frequency hopping. As shown in FIG. 57, a WTRU 102 may implement a procedure 5700 to receive a PUSCH transmission and decode the PUSCH transmission. The procedure 5700 may begin with the WTRU 102 receiving (e.g., from a gNB 180 or similar entity) information indicating a configuration which includes an indication of demodulation reference signal (DM-RS) frequency hopping and a SCS threshold at 5710. After, the WTRU 102 may proceed to receiving a PDCCH transmission at 5720. The WTRU 102 may perform decoding of the PDCCH transmission at 5730. On condition that the decoded PDCCH transmission includes downlink control information (DCI) which schedules a PUSCH transmission, the WTRU 102 may proceed to determining whether a SCS for the PUSCH transmission exceeds the SCS threshold at 5740. On condition that the SCS for the PUSCH transmission exceeds the SCS threshold, the WTRU 102 may proceed to determining a plurality of frequency locations of one or more DM-RSs for the PUSCH transmission based on the indication at 5750. After 5750, the WTRU 102 may proceed to sending (e.g., as scheduled) the PUSCH transmission (e.g., as scheduled) with the (e.g., one or more) DM-RS for the PUSCH transmission at 5760. The WTRU 102 may perform the sending of the one or more DM-RS for the PUSCH transmission in the determined frequency locations at 5760.

Figure 58:
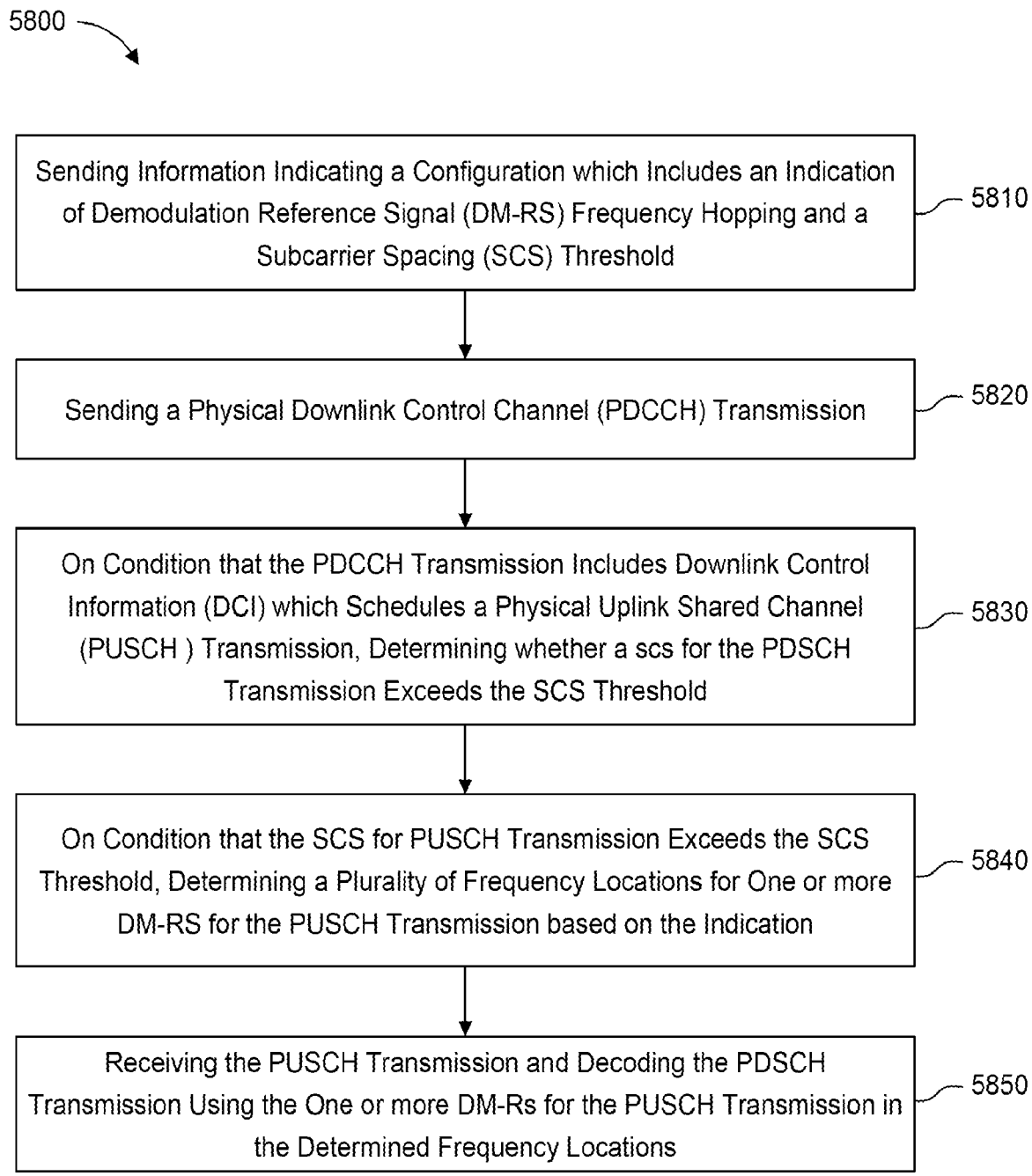
FIG. 58 is an example procedure that may be implemented by a RAN entity to receive a PUSCH transmission using a SCS threshold and DM-RS frequency hopping.

FIG. 58 is an example procedure that may be implemented by a RAN entity to receive a PUSCH transmission using a SCS threshold and DM-RS frequency hopping. As shown in FIG. 58, a RAN entity (e.g., a gNB 180 or similar entity) may implement a procedure 5800 to send a PDSCH transmission. The procedure 5800 may begin with the RAN entity sending information indicating a configuration which includes an indication of demodulation reference signal (DM-RS) frequency hopping and a SCS threshold at 5810. After, the RAN entity may proceed to sending a PDCCH transmission at 5820. At 5830, on condition that the PDCCH transmission includes downlink control information (DCI) which schedules a PUSCH transmission, the RAN entity may determine whether a SCS for the PUSCH transmission exceeds the SCS threshold at 5830. At 5840, on condition that the SCS for PUSCH transmission exceeds the SCS threshold, the RAN entity may perform determining of a plurality of frequency locations for one or more DM-RS for the PUSCH transmission based on the indication. After, at 5850, the RAN entity may proceed to receiving (e.g., as scheduled) the PUSCH transmission with the (e.g., one or more) DM-RS for the PUSCH transmission. The RAN entity may perform receiving of the one or more DM-RSs for the PUSCH transmission in the determined frequency locations at 5850. The PUSCH transmission may then be decoded based on the received DM-RSs.

In certain representative embodiments, the SCS for a PUSCH and/or a PDSCH may be above (e.g., exceeds) the SCS threshold (e.g., 480 or 960 kHz). For example, the determined frequency locations may be used to respectively receive and/or transmit higher density DM-RSs as described herein. A WTRU 102 may determine REs (e.g., frequency locations) for reception and/or transmission of the higher density DM-RSs. For example, the DM-RSs may be single-symbol or double-symbol DM-RSs.

In certain representative embodiments, a WTRU 102 may be configured with the SCS threshold and the MCS threshold as part of a same configuration. As an example, if the SCS threshold and the MCS threshold are received, the foregoing procedures for PUSCH and/or PDSCH transmission may be combined. For example, an SCS threshold and/or an MCS threshold may be informed to the WTRU 102 in one or more configurations via any of RRC messages, MAC CEs and/or DCI.

Figure 59:
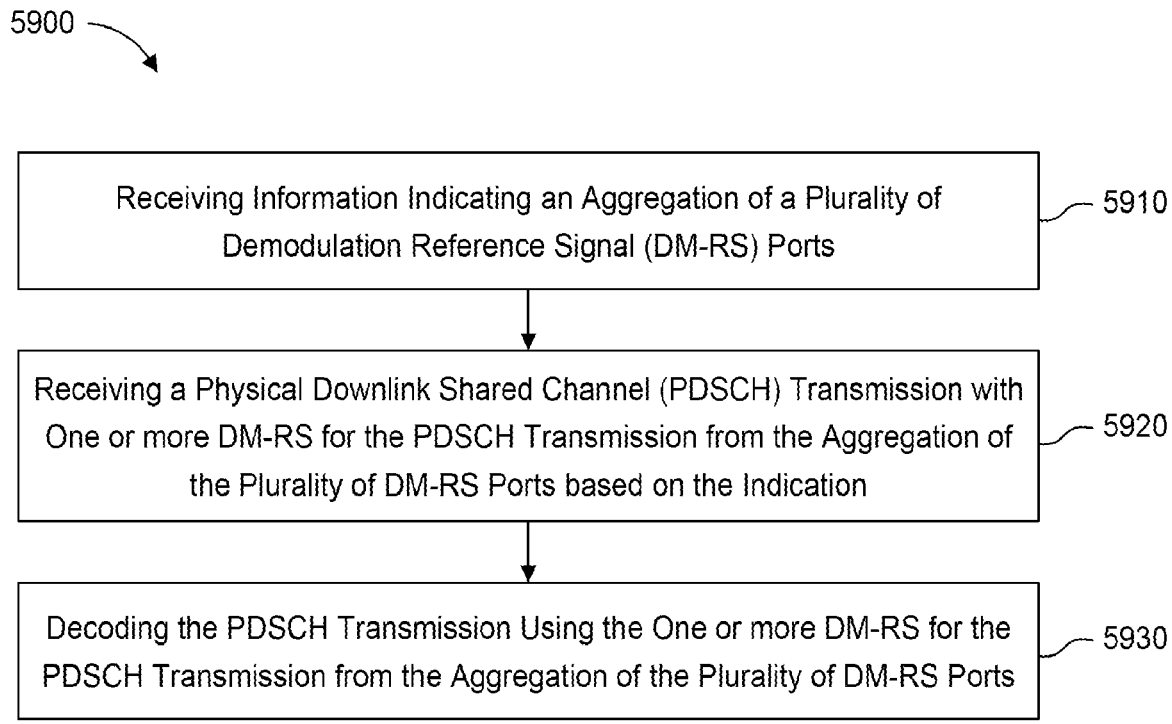
FIG. 59 is an example procedure that may be implemented by a WTRU to receive a PDSCH transmission using DM-RS port aggregation.

FIG. 59 is an example procedure that may be implemented by a WTRU 102 to receive a PDSCH transmission using DM-RS port aggregation. As shown in FIG. 59, a WTRU 102 may implement a procedure 5900 to receive and decode a PDSCH transmission. The procedure 5900 may begin with a WTRU 102 receiving information indicating an aggregation of a plurality of demodulation reference signal (DM-RS) ports at 5910. After, the WTRU 102 may proceed to receiving (e.g., as scheduled) a PDSCH transmission at 5920 with the (e.g., one or more) DM-RS for the PDSCH transmission. The WTRU 102 may perform the receiving of the one or more DM-RS for the PDSCH transmission from the aggregation of the plurality of DM-RS ports at 5920 based on the indication. At 5930, the WTRU 102 may perform decoding of the PDSCH transmission using the one or more DM-RS for the PDSCH transmission received from the aggregation of the plurality of DM-RS ports based on the indication.

Figure 60:
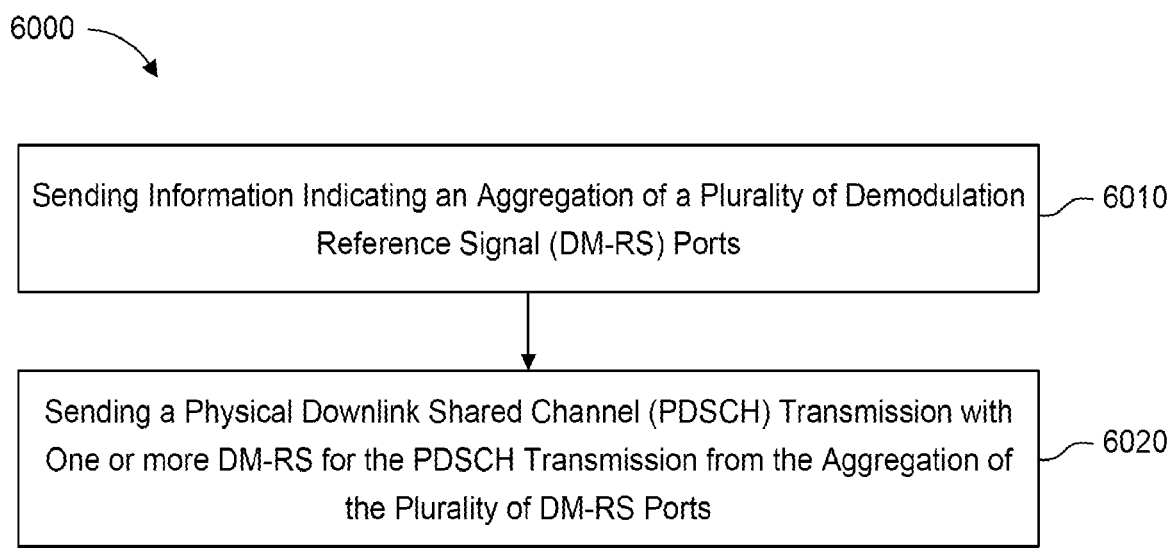
FIG. 60 is an example procedure that may be implemented by a RAN entity to send a PDSCH transmission using DM-RS port aggregation.

FIG. 60 is an example procedure that may be implemented by a RAN entity to send a PDSCH transmission using DM-RS port aggregation. As shown in FIG. 60, a RAN entity (e.g., a gNB 180 or similar entity) may implement a procedure 6000 to send a PDSCH transmission. The procedure 6000 may begin with the RAN entity sending information indicating an aggregation of a plurality of DM-RS ports at 6010. At 6020, the RAN entity may proceed to sending (e.g., as scheduled) a PDSCH transmission with the (e.g., one or more) DM-RS for the PDSCH transmission. The RAN entity may perform the sending of the one or more DM-RS for the PDSCH transmission from the aggregation of the plurality of DM-RS ports at 6020 based on the indication.

Figure 61:
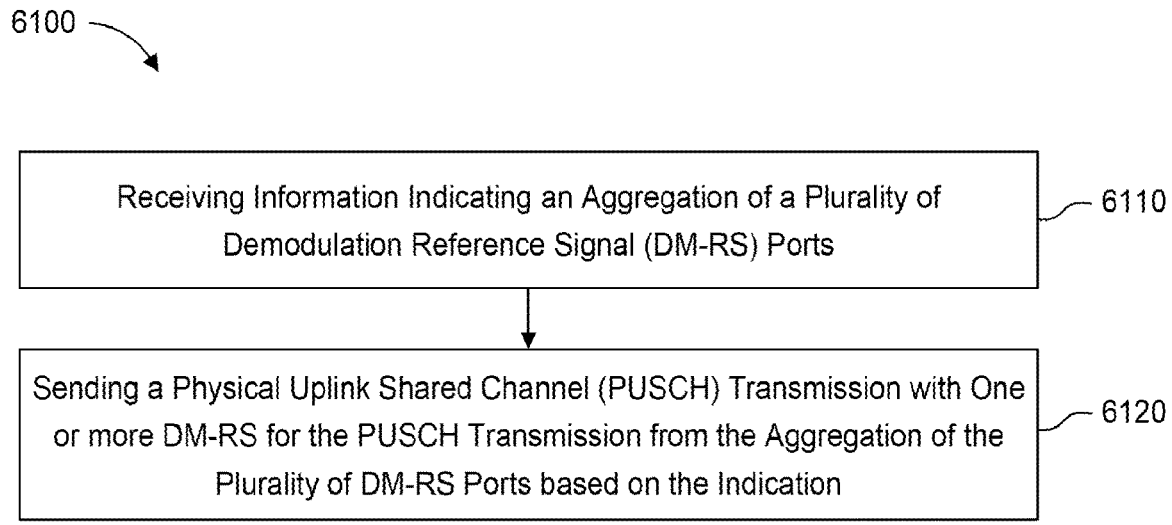
FIG. 61 is an example procedure that may be implemented by a WTRU to send a PUSCH transmission using DM-RS port aggregation.

FIG. 61 is an example procedure that may be implemented by a WTRU 102 to send a PUSCH transmission using DM-RS port aggregation. As shown in FIG. 61, a WTRU 102 may implement a procedure 6100 to send a PUSCH transmission. The procedure 6100 may begin with the WTRU 102 receiving information indicating an aggregation of a plurality of demodulation reference signal (DM-RS) ports at 6110. After, the WTRU 102 may proceed to sending (e.g., as scheduled) a PUSCH transmission with the (e.g., one or more) DM-RS for the PUSCH transmission at 6120. The WTRU 102 may perform the sending of the one or more DM-RSs for the PUSCH transmission from the aggregation of the plurality of DM-RS ports based on the indication at 6120.

Figure 62:
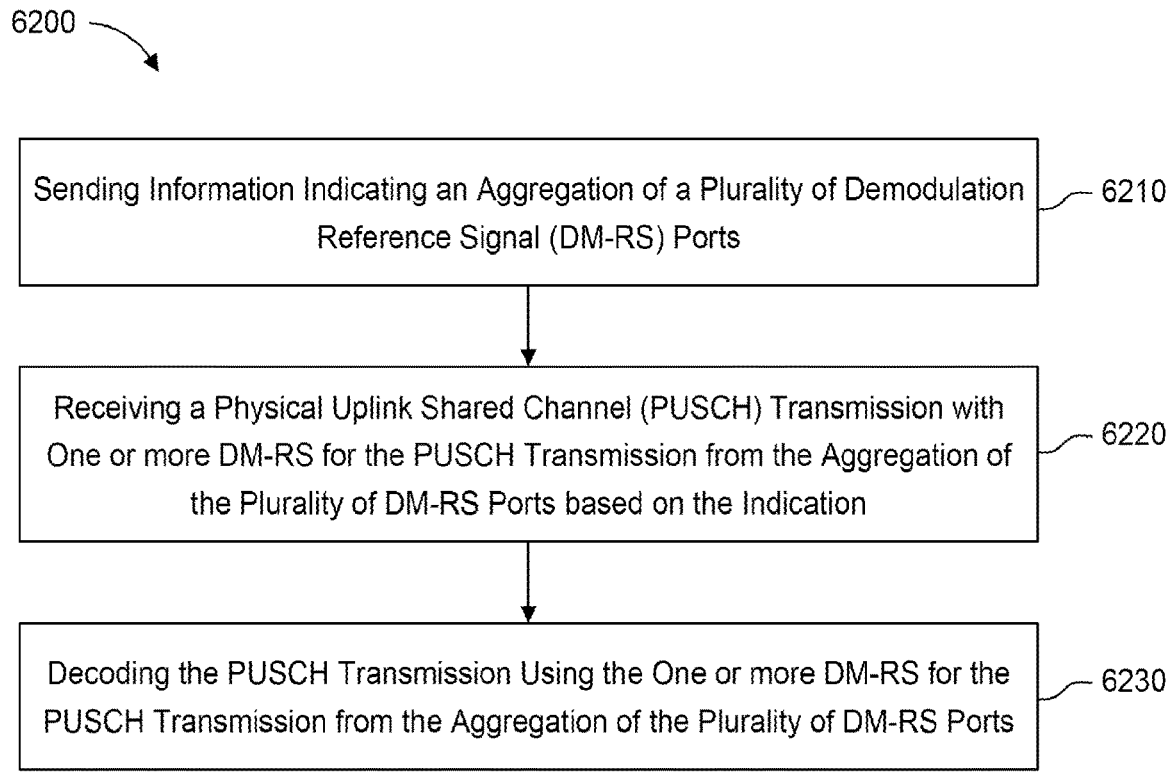
FIG. 62 is an example procedure that may be implemented by a RAN entity to receive a PUSCH transmission using DM-RS port aggregation.

FIG. 62 is an example procedure that may be implemented by a RAN entity to receive a PUSCH transmission using DM-RS port aggregation. As shown in FIG. 62, a RAN entity (e.g., a gNB 180 or similar entity) may implement a procedure 6200 to receive a PUSCH transmission. The procedure 6200 may begin with the RAN entity sending information indicating an aggregation of a plurality of demodulation reference signal (DM-RS) ports at 6210. After, the RAN entity may proceed to receiving (e.g., as scheduled) a PUSCH transmission with the (e.g., one or more) DM-RS for the PUSCH transmission at 6220. The RAN entity may perform the receiving of the one or more DM-RSs for the PUSCH transmission from the aggregation of the plurality of DM-RS ports at 6220 based on the indication. At 6230, the RAN entity may perform decoding of the PUSCH transmission using one or more DM-RSs received from the aggregation of the plurality of DM-RS ports.

In certain representative embodiments, DM-RS symbols in a DM-RS port may be transmitted in different frequency locations. Examples of frequency hopping are shown in FIGS. 34 to 38 as described herein. For example, in FIG. 33 and FIG. 34, two DM-RS symbols in a DM-RS port are located in different frequency locations, such as to achieve enhanced channel estimation in the frequency domain In certain representative embodiments, two or more DM-RS ports may be aggregated to provide enhanced channel estimation of DM-RS in the frequency domain. For example, DM-RS ports in different frequency locations or different CDM groups may be aggregated, such as to achieve enhanced channel estimation in the frequency domain. For example, in FIG. 39, DM-RS port #0 and DM-RS port #2 in different frequency locations or different CDM groups may be aggregated. Aggregated DM-RS ports may be used to demodulate a same layer of a (e.g., downlink) transmission. A same precoder may be used for aggregated DM-RS ports of a (e.g., uplink) transmission.

In certain representative embodiments, a transmission (e.g., a scheduled PDSCH or PUSCH transmission) with a given rank (e.g., rank 2) may use aggregated DM-RS ports. The actual rank of the transmission may be a lower rank (e.g., rank 1).

Figure 63:
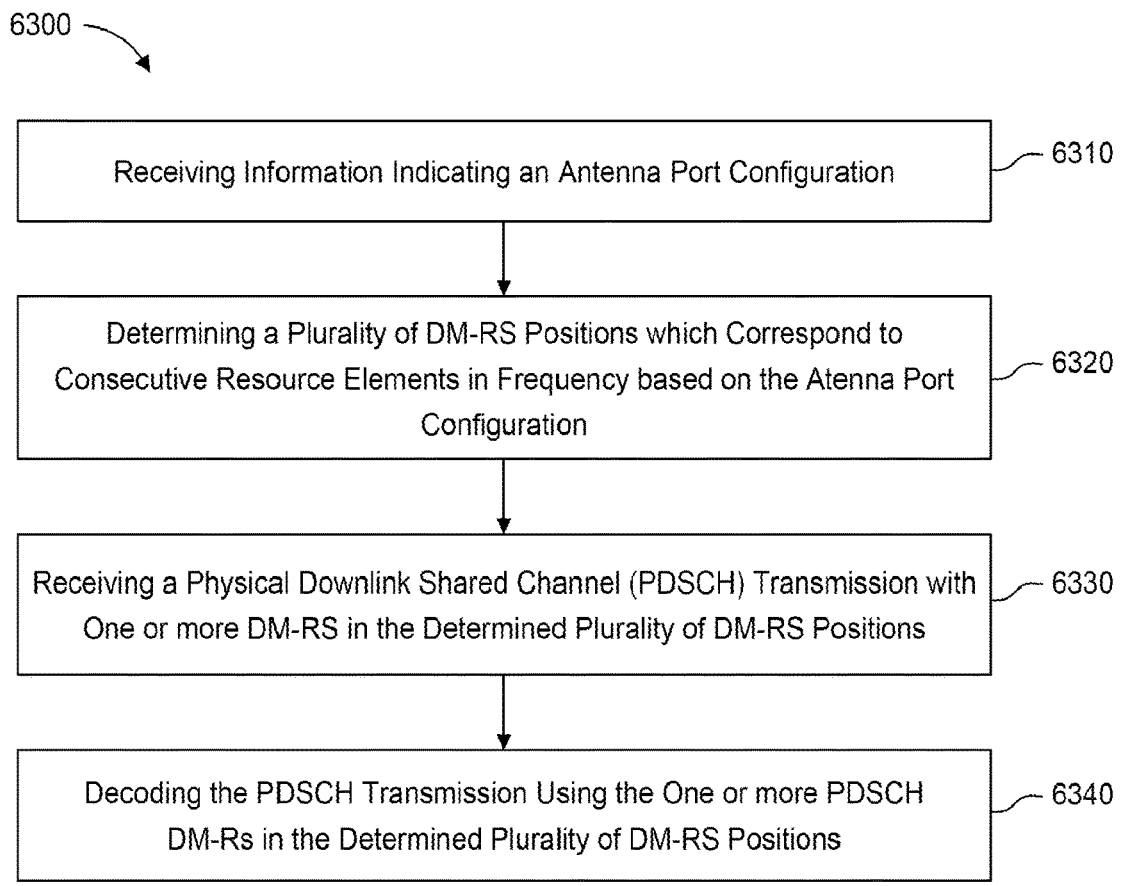
FIG. 63 is an example procedure that may be implemented by a WTRU to receive a PDSCH transmission using higher density DM-RS.

FIG. 63 is an example procedure that may be implemented by a WTRU 102 to receive a PDSCH transmission using higher density DM-RS. As shown in FIG. 63, a WTRU 102 may implement a procedure 6300 to receive a PDSCH transmission. The procedure 6300 may begin with the WTRU 102 receiving information indicating an antenna port configuration at 6310. After, the WTRU 102 may proceed to determining a plurality of DM-RS positions which correspond to consecutive resource elements in frequency based on the antenna port configuration at 6320. At 6330, the WTRU 102 may perform receiving (e.g., as scheduled) a PDSCH transmission with the (e.g., one or more) DM-RS for the PDSCH transmission. The WTRU 102 may receive the one or more DM-RS for the PDSCH transmission in the determined plurality of DM-RS positions at 6330. At 6340, the WTRU 102 may perform decoding of the PDSCH transmission using the one or more DM-RSs received in the determined plurality of DM-RS positions.

Figure 64:
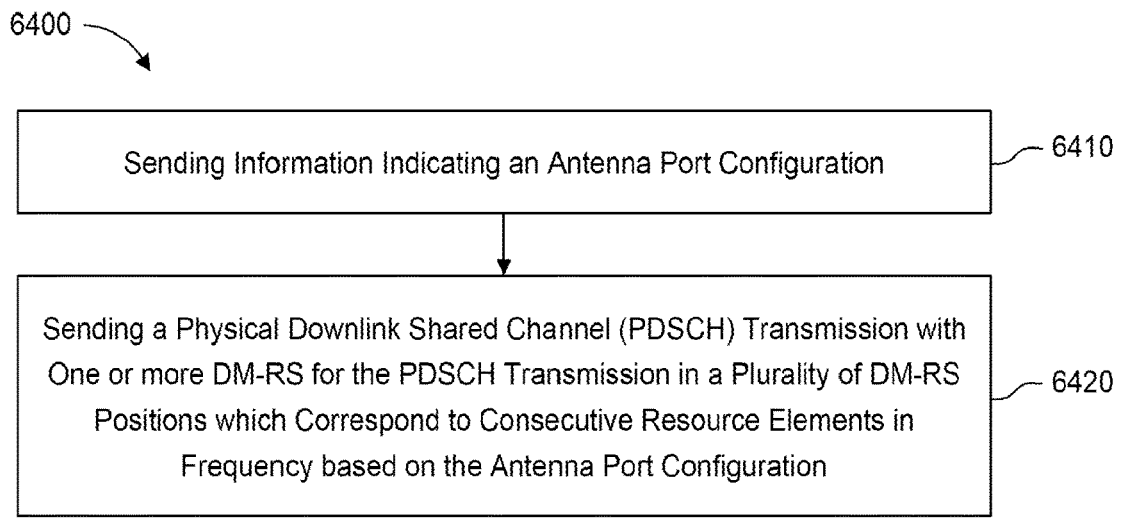
FIG. 64 is an example procedure that may be implemented by a RAN entity to send a PDSCH transmission using higher density DM-RS.

FIG. 64 is an example procedure that may be implemented by a RAN entity to send a PDSCH transmission using higher density DM-RS. As shown in FIG. 64, a RAN entity (e.g., a gNB 180 or similar entity) may implement a procedure 6400 to send a PDSCH transmission. The procedure 6400 may begin with the RAN entity sending information indicating an antenna port configuration at 6410. After, the RAN entity may proceed to sending (e.g., as scheduled) a PDSCH transmission with the (e.g., one or more) DM-RS for the PDSCH transmission at 6420. The RAN entity may send the one or more DM-RS for the PDSCH transmission in a plurality of DM-RS positions which correspond to consecutive resource elements in frequency based on the antenna port configuration.

Figure 65:
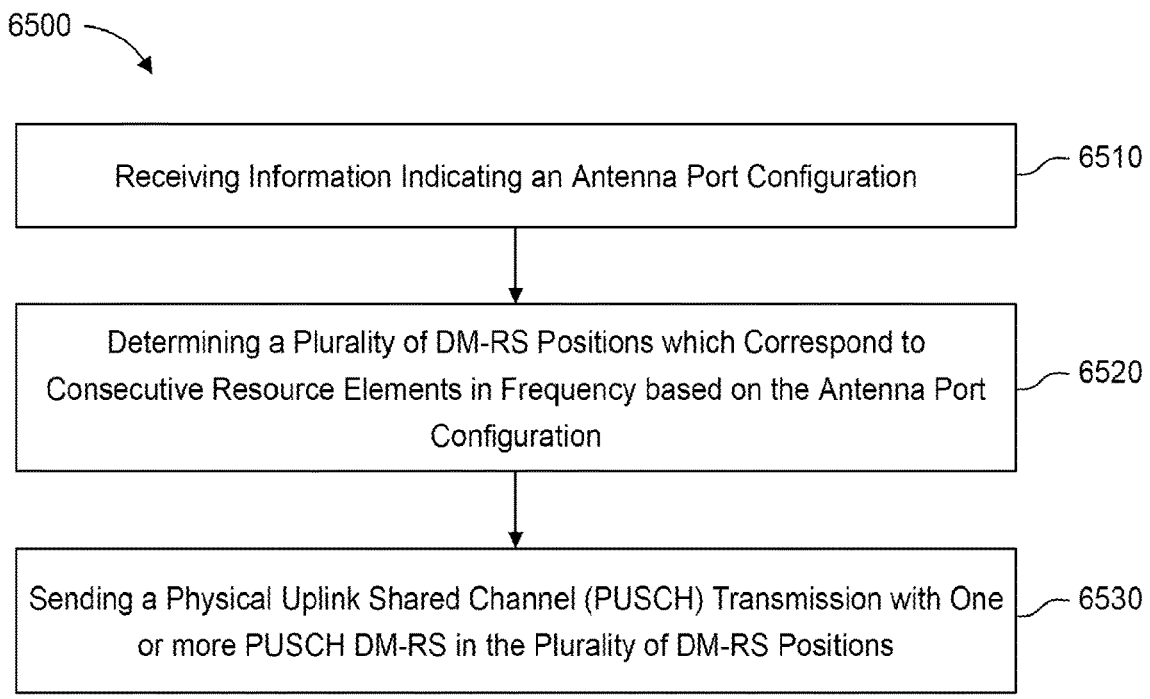
FIG. 65 is an example procedure that may be implemented by a WTRU to send a PUSCH transmission using higher density DM-RS.

FIG. 65 is an example procedure that may be implemented by a WTRU 102 to send a PUSCH transmission using higher density DM-RS. As shown in FIG. 65, a WTRU 102 may implement a procedure 6500 to receive a PUSCH transmission. The procedure 6500 may begin with the WTRU 102 receiving information indicating an antenna port configuration at 6510. After, the WTRU 102 may proceed to determining a plurality of DM-RS positions which correspond to consecutive resource elements in frequency based on the antenna port configuration at 6520. At 6530, the WTRU 102 may perform sending (e.g., as scheduled) a PUSCH transmission with the (e.g., one or more) DM-RS for the PUSCH transmission. The WTRU 102 may send the one or more DM-RS for the PUSCH transmission in the determined plurality of DM-RS positions at 6530.

Figure 66:
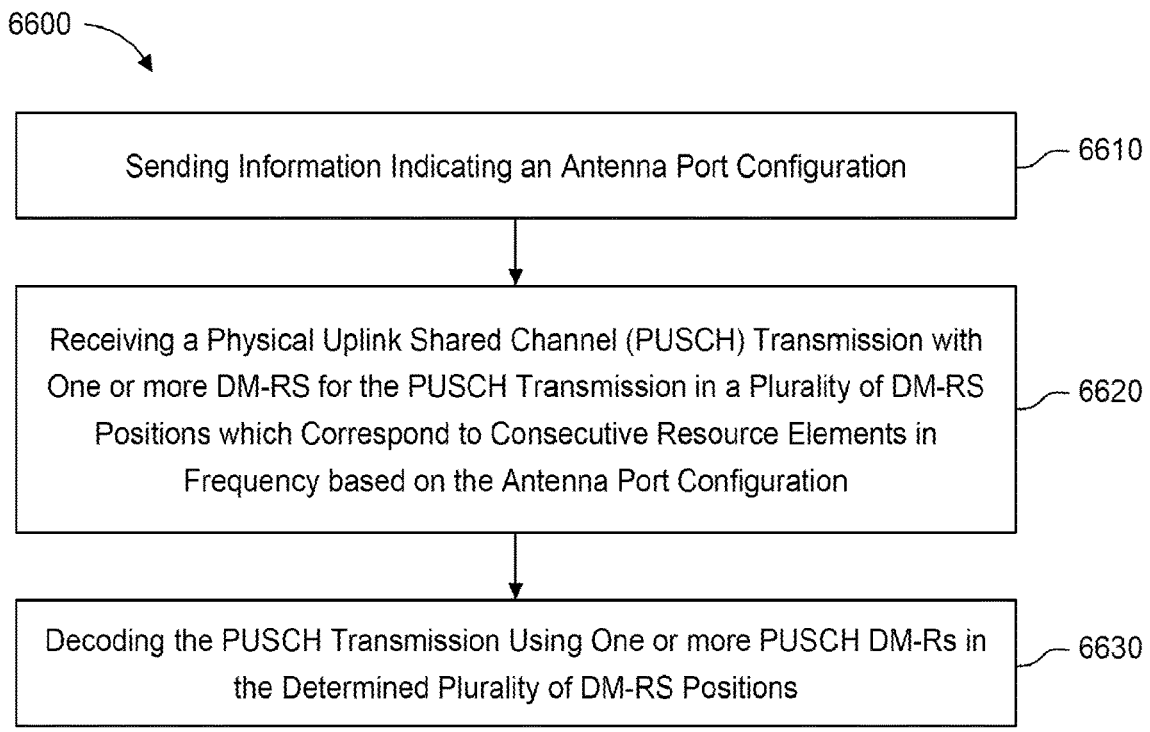
FIG. 66 is an example procedure that may be implemented by a RAN entity to receive a PDSCH transmission using higher density DM-RS.

FIG. 66 is an example procedure that may be implemented by a RAN entity to receive a PDSCH transmission using higher density DM-RS. As shown in FIG. 66, a RAN entity (e.g., a gNB 180 or similar entity) may implement a procedure 6600 to receive a PDSCH transmission. The procedure 6600 may begin with the RAN entity sending information indicating an antenna port configuration at 6610. After, the RAN entity may proceed to receive (e.g., as scheduled) a PUSCH transmission with the (e.g., one or more) DM-RS for the PUSCH transmission at 6620. The RAN entity may receive the one or more DM-RS for the PUSCH transmission in a plurality of DM-RS positions which correspond to consecutive resource elements in frequency based on the antenna port configuration at 6620. At 6630, the RAN entity may perform decoding of the PUSCH transmission using the one or more DM-RS received in the determined plurality of DM-RS positions.

In certain representative embodiments, the antenna port configuration may be based on an antenna port indication table as shown in FIG. 23 to configure higher density DM-RS. For example, the antenna port configuration may be based on RRC messages and a DCI indication for receiving (e.g., by the WTRU) a PDSCH with a higher density DM-RS and/or transmitting a PUSCH (e.g., by the WTRU) with a higher-density DM-RS. For example, REs of other DM-RS ports may be used for scheduled DM-RS ports, for example, to achieve better channel estimation performance in the frequency domain with the higher density DM-RS as described herein.

As shown by example in FIG. 24, multiple (e.g., two) CDM mappings (e.g., pattern #1 and pattern #2) for higher DM-RS density of single-symbol type-1 DM-RS may be provided. Pattern #1 may support CDM between consecutive REs in the frequency domain (e.g., as well as single-symbol type-1 DM-RS). Pattern #1 may be easier to implement, for example, if pattern #1 allocates codes with adjacent REs and/or does not need to use memory. Pattern #1 may not support coexistence between a single-symbol type-1 DM-RS ports and single-symbol higher density DM-RS ports, for example, since CDM sequences of single-symbol type-1 DM-RS ports and single-symbol higher density DM-RS ports may not be orthogonal.

Pattern #1 may support CDM with consecutive REs. Pattern #2 may support CDM based on a comb (e.g., a comb-like pattern) with 1 RE spacing. Pattern #1 may not support orthogonal multiplexing between single-symbol type-1 DM-RS ports and single-symbol high density DM-RS ports. Pattern #2 may support orthogonal multiplexing between DM-RS ports and single-symbol high density DM-RS ports. Other example patterns for higher density DM-RS are described herein.

As shown by example in FIG. 25, multiple (e.g., two) sequence mappings (e.g., sequence mapping #1 and sequence mapping #2) may be provided for a higher DM-RS density of a single-symbol type-1 DM-RS. Sequence mapping #1 may map sequences sequentially. Sequence mapping #1 may be easier to implement and may not need to use memory. Sequence mapping #1 may provide higher correlation between single-symbol type-1 DM-RS ports and single-symbol higher density DM-RS, for example, if pseudo-random (PN) sequence mappings are not designed to be low correlation.

As shown by example in FIG. 25, multiple (e.g., two) sequence mappings (e.g., sequence mapping #1 and sequence mapping #2) may be provided for a higher DM-RS density of a single-symbol type-1 DM-RS. Sequence mapping #1 may map sequences sequentially. Sequence mapping #1 may be easier to implement and may not need to use memory. Sequence mapping #2 may provide simultaneous usage of existing DM-RS and higher density DM-RS. For example, as shown in FIG. 25, sequence mapping #1 may have high correlation with existing DM-RS as pseudo-noise (PN) sequences with different sequence length are partially overlapped. However, sequence mapping #2 provides low correlation as PN sequences with identical sequence length are fully overlapped as designed.

Additional examples of higher density DM-RS and sequence mappings for higher density DM-RS are also shown FIGS. 26, 27, 28, 29, 30, 31 and 32 as described herein. As can be seen in the examples shown in FIGS. 24-32, higher density DM-RS may be achieved by arranging DM-RS in consecutive REs in the frequency domain. For example, FIGS. 29 to 32 show that such arrangements may be applied to single-symbol DM-RS as well as double-symbol DM-RS. Based on a sequence mapping type, sequential sequence mapping or sequence mapping based on existing DM-RS locations may be achieved.

Figure 67:
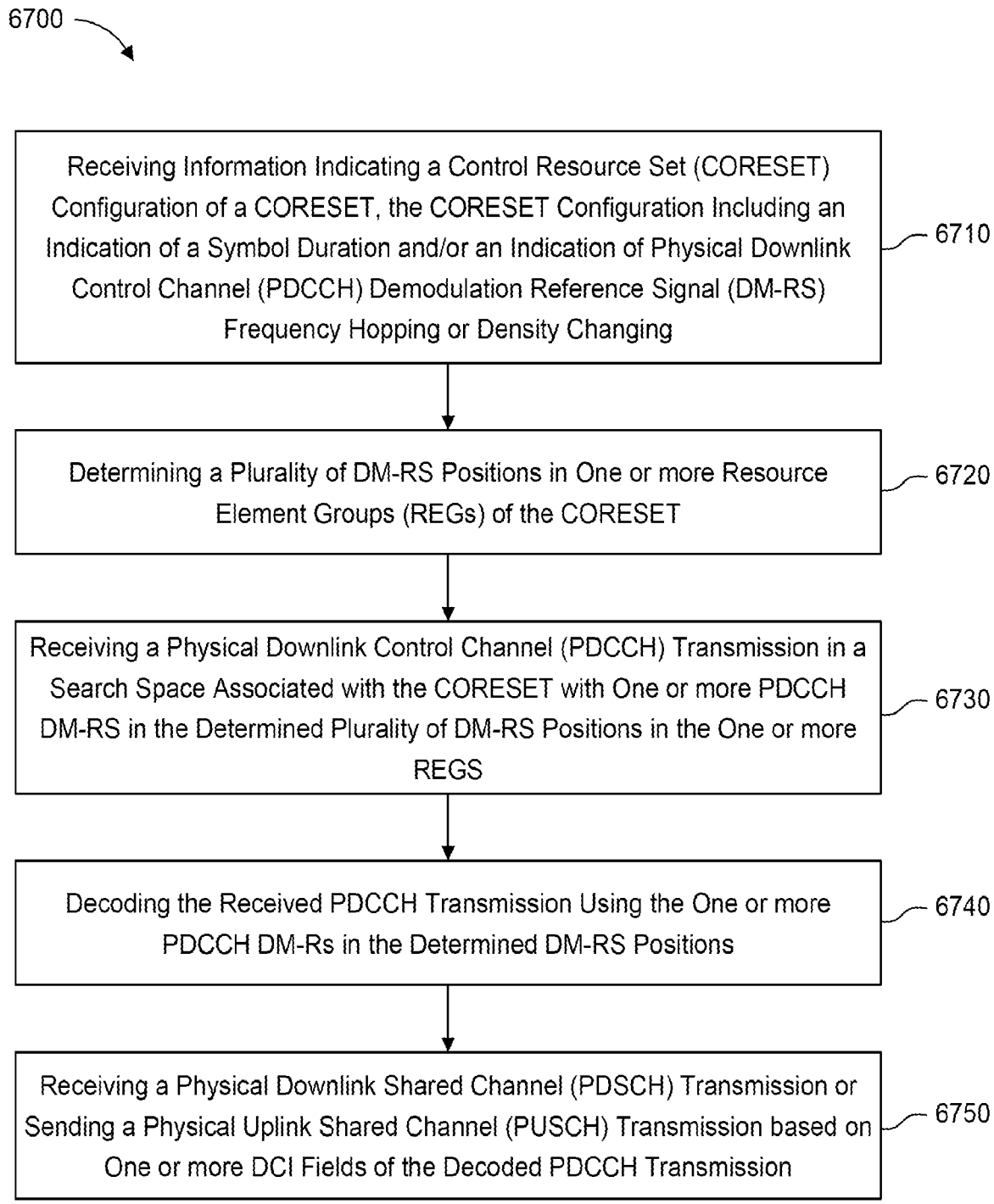
FIG. 67 is an example procedure that may be implemented by a WTRU to decode a PDDCH transmission with DM-RS using frequency hopping or density changing.

FIG. 67 is an example procedure that may be implemented by a WTRU 102 to decode a PDDCH transmission with DM-RS using frequency hopping or density changing. As shown in FIG. 67, a WTRU 102 may implement a procedure 6700 to decode a PDDCH transmission with DM-RS using frequency hopping or density changing. The procedure 6700 may begin at 6710 with the WTRU 102 receiving (e.g., from a gNB 180 or similar entity) information indicating a CORESET configuration of a CORESET. The CORESET configuration may include an indication of a symbol duration and/or an indication of PDCCH DM-RS frequency hopping or density changing. The reception at 4710 and/or 4720 may be performed, for example, according to the techniques described herein. At 6720, the WTRU 102 may proceed to determining a plurality of DM-RS positions in one or more REGs of the CORESET. After 6720, the WTRU 102 may receive a PDCCH transmission in a search space associated with the CORESET with one or more PDCCH DM-RSs in the determined plurality of DM-RS positions in the one or more REGs at 6730. The WTRU 102 perform decoding of the received PDCCH transmission using the one or more PDCCH DM-RS in the determined DM-RS positions at 6740. After 6740, the WTRU 102 may proceed to receiving a PDSCH transmission or sending a PUSCH transmission based on one or more DCI fields of the decoded PDCCH transmission at 6750.

Figure 68:
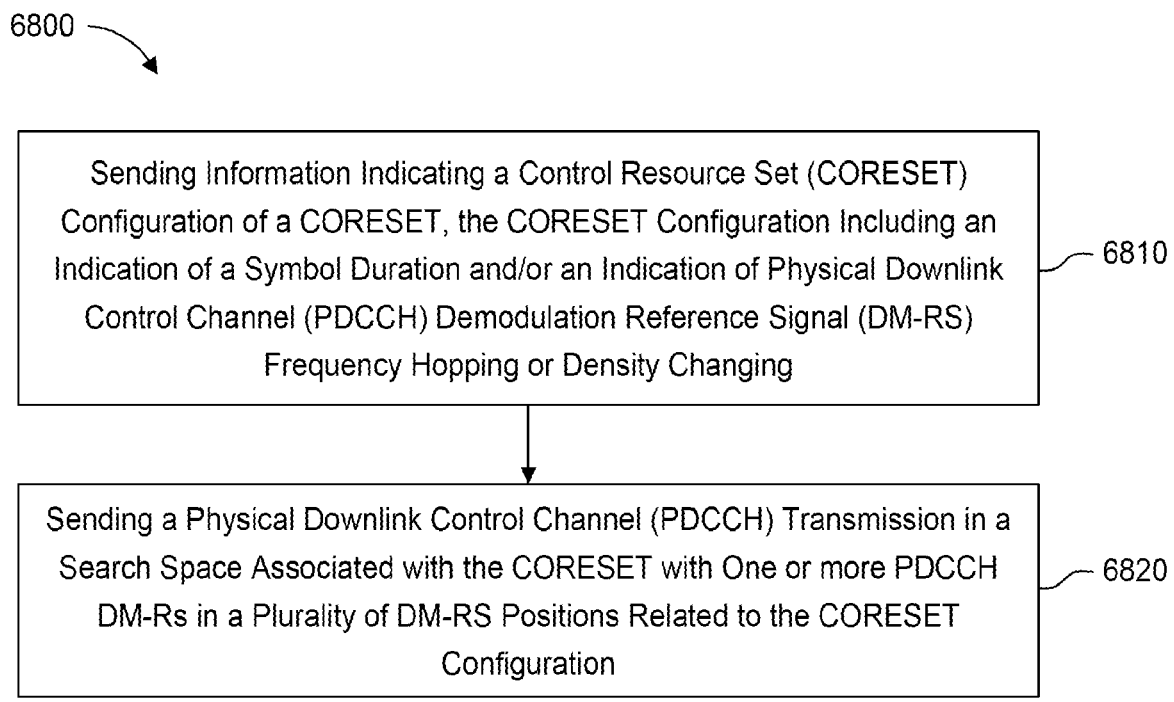
FIG. 68 is an example procedure that may be implemented by a RAN entity to send a PDDCH transmission with DM-RS using frequency hopping or density changing.

FIG. 68 is an example procedure that may be implemented by a RAN entity to send a PDDCH transmission with DM-RS using frequency hopping or density changing. As shown in FIG. 68, a RAN entity (e.g., a gNB 180 or similar entity) may implement a procedure 6800 to send a PDDCH transmission with DM-RS using frequency hopping or density changing. The procedure 6800 may begin at 6810 with the RAN entity sending (e.g., to a WTRU) information indicating a CORESET configuration of a CORESET. The CORESET configuration may include an indication of a symbol duration and/or an indication of PDCCH DM-RS frequency hopping or density changing. At 6820, the RAN entity may proceed to send a PDCCH transmission in a search space associated with the CORESET with one or more PDCCH DM-RS for the PDCCH transmission in a plurality of DM-RS positions related to the CORESET configuration. For example, the RAN entity may receive a PUSCH transmission or send a PDSCH transmission to the WTRU 102 following step 6820 based on DCI of the PDDCH transmission (e.g., as scheduled by the DCI) at 6820.

In certain representative embodiments, the plurality of DM-RS positions for the PDCCH DM-RS (e.g., in one or more REGS of the CORESET) may be determined based on (1) any of: the indication (e.g., frequency hopping or density changing), the symbol duration, a DCI format and/or an aggregation level, and (2) a respective REG index of each of the one or more REGs. For example, FIG. 6 shows an example 600 of a PDCCH 606 and FIG. 10 shows an example 1000 of CORESETs 1002, REGs 1004 and REs 1008.

In certain representative embodiments, the plurality of DM-RS positions may be in at least a first REG having a lowest respective REG index among the (e.g., one or more) REGs of the CORESET. For example, FIGS. 41 and 43 show examples 4100 4300 of frequency hopping of a PDCCH DM-RS 4102 and frequency skipping of a PDCCH DM-RS 4102. For example, in FIG. 41, the PDCCH DM-RS 4102 of REG 1 may have 1 RE distance with PDCCH DM-RS 4102 of REG 0. PDCCH DM-RS 4102 of REG 2 may have 2 REs distance with PDCCH DM-RS 4102 of REG 0 (e.g., as well as 1 RE distance with PDCCH DM-RS of REG 1). As another example, in FIG. 43, a REG with an even REG index may have an enhanced PDCCH DM-RS 4102 while a REG with an odd REG index may not have a PDCCH DM-RS (e.g., no PDCCH DM-RS located in the REs associated with the odd REG index). Lower PDCCH DM-RS density may be supported, for example, instead of skipping a PDCCH DM-RS transmission. One or more representative criteria and/or conditions as described herein may be used for determining the PDDCH DM-RS positions.

Although features and elements described above are described in particular combinations, each feature or element may be used alone without the other features and elements of the respective embodiments, or in various combinations with or without other features and elements.

Although the implementations described herein may consider 3GPP specific protocols, it is understood that the implementations described herein are not restricted to this scenario and may be applicable to other wireless systems. For example, although the solutions described herein consider LTE, LTE-A, New Radio (NR) or 5G specific protocols, it is understood that the solutions described herein are not restricted to this scenario and are applicable to other wireless systems as well.

Systems and methods for processing data according to representative embodiments may be performed by one or more processors executing sequences of instructions contained in a memory device. Such instructions may be read into the memory device from other computer-readable mediums such as secondary data storage device(s). Execution of the sequences of instructions contained in the memory device causes the processor to operate, for example, as described above. In alternative embodiments, hard-wire circuitry may be used in place of or in combination with software instructions to implement the present invention. Such software may run on a processor which is housed within a vehicle and/or another mobile device remotely. In the later a case, data may be transferred via wireline or wirelessly between the vehicles or other mobile device.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the representative embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods. It should be understood that the representative embodiments are not limited to the above-mentioned platforms or CPUs and that other platforms and CPUs may support the provided methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost vs. efficiency tradeoffs. There may be various vehicles by which processes and/or systems and/or other technologies described herein may be affected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments only, and is not intended to be limiting. As used herein, when referred to herein, the terms "station" and its abbreviation "STA", "user equipment" and its abbreviation "UE" may mean (i) a wireless transmit and/or receive unit (WTRU), such as described infra; (ii) any of a number of embodiments of a WTRU, such as described infra; (iii) a wireless-capable and/or wired-capable (e.g., tetherable) device configured with, inter alia, some or all structures and functionality of a WTRU, such as described infra; (iii) a wireless-capable and/or wired-capable device configured with less than all structures and functionality of a WTRU, such as described infra; or (iv) the like. Details of an example WTRU, which may be representative of any UE recited herein, are provided below with respect to FIGS. 1A-1D.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶6 or means-plus-function claim format, and any claim without the terms "means for" is not so intended.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used m conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Throughout the disclosure, one of skill understands that certain representative embodiments may be used in the alternative or in combination with other representative embodiments.

In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method implemented by a wireless transmit/receive unit (WTRU), the method comprising:
   receiving information indicating a control resource set (CORESET) configuration of a CORESET, the CORESET configuration including an indication of a symbol duration and/or an indication of physical downlink control channel (PDCCH) demodulation reference signal (DM-RS) frequency hopping or density changing;
   determining a plurality of DM-RS positions in one or more resource element groups (REGs) of the CORESET based on (1) the indication of the symbol duration and/or the indication of the PDCCH DM-RS frequency hopping or density changing, and (2) respective indices of the one or more REGs;
   receiving a PDCCH transmission in a search space associated with the CORESET with one or more PDCCH DM-RSs in the plurality of DM-RS positions in the one or more REGs;
   decoding the received PDCCH transmission using the one or more PDCCH DM-RSS in the plurality of DM-RS positions; and
   receiving a physical downlink shared channel (PDSCH) transmission or sending a physical uplink shared channel (PUSCH) transmission based on one or more downlink control information (DCI) fields of the decoded PDCCH transmission.

2. The method of claim 1, wherein the determining of the plurality of DM-RS positions in the one or more REGs of the CORESET is further based on any of (3) a DCI format and/or (4) an aggregation level.

3. The method of claim 1, wherein the plurality of DM-RS positions are in at least a first REG having a lowest index among the one or more REGs of the CORESET.

4. The method of claim 1, wherein the determining of the plurality of DM-RS positions in the one or more REGs of the CORESET is based on the indication of PDCCH DM-RS frequency hopping and the respective indices of each of the one or more REGs, and the plurality of DM-RS positions have different locations in frequency in each of the one or more REGs.

5. The method of claim 4, wherein the plurality of DM-RS positions in adjacent REGs of the one or more REGs are in consecutive resource elements in frequency.

6. The method of claim 1, wherein the plurality of DM-RS positions in adjacent REGs of the one or more REGs are in consecutive resource elements in frequency.

7. The method of claim 1, wherein the plurality of DM-RS positions in the one or more REGs of the CORESET are different in different ones of the one or more REGs of the CORESET.

8. The method of claim 1, wherein the determining of the plurality of DM-RS positions in the one or more REGs of the CORESET are based on the indication of PDCCH DM-RS density changing and the respective indices of each of the one or more REGs, and the plurality of DM-RS positions are in only one REG of the one or more REGs.

9. The method of claim 8, wherein the plurality of DM-RS positions in the one or more REGs of the CORESET are different in different ones of the one or more REGs of the CORESET.

10. The WTRU of claim 8, wherein the processor is configured to determine the plurality of DM-RS positions in the one or more REGs of the CORESET is based on the indication of PDCCH DM-RS frequency hopping and the respective indices of each of the one or more REGs, and the plurality of DM-RS positions have different locations in frequency in each of the one or more REGs.

11. A wireless transmit/receive unit (WTRU), comprising:
   a processor and a transceiver which are configured to:
   receive information indicating a control resource set (CORESET) configuration of a CORESET, the CORESET configuration including an indication of a symbol duration and/or an indication of physical downlink control channel (PDCCH) demodulation reference signal (DM-RS) frequency hopping or density changing,
   determine a plurality of DM-RS positions in one or more resource element groups (REGs) of the CORESET based on (1) the indication of the symbol duration and/or the indication of the PDCCH DMRS frequency hopping or density changing, and (2) respective indices of the one or more REGs,
   receive a PDCCH transmission in a search space associated with the CORESET with one or more PDCCH DM-RSs in the plurality of DM-RS positions in the one or more REGs, decode the received PDCCH transmission using the one or more PDCCH DM-RSs in the plurality of DM-RS positions, and receive a physical downlink shared channel (PDSCH) transmission or send a physical uplink shared channel (PUSCH) transmission based on one or more downlink control information (DCI) fields of the decoded PDCCH transmission.

12. The WTRU of claim 11, wherein the processor is configured to determine the plurality of DM-RS positions in the one or more REGs of the CORESET further based on any of (3) a DCI format and/or (4) an aggregation level.

13. The WTRU of claim 11, wherein the plurality of DM-RS positions are in at least a first REG having a lowest index among the one or more REGs of the CORESET.

14. The WTRU of claim 11, wherein the plurality of DM-RS positions in adjacent REGs of the one or more REGs are in consecutive resource elements in frequency.

15. The WTRU of claim 11, wherein the plurality of DM-RS positions in adjacent REGs of the one or more REGs are in consecutive resource elements in frequency.

16. The WTRU of claim 11, wherein the plurality of DM-RS positions in the one or more REGs of the CORESET are different in different ones of the one or more REGs of the CORESET.

17. The WTRU of claim 11, wherein the determining of the plurality of DM-RS positions in the one or more REGs of the CORESET are based on the indication of PDCCH DM-RS density changing and based on the respective REG index of each of the one or more REGs, and the plurality of DM-RS positions are in only one REG of the one or more REGs.

18. The WTRU of claim 17, wherein the plurality of DM-RS positions in the one or more REGs of the CORESET are different in different ones of the one or more REGs of the CORESET.

19. The WTRU of claim 11, wherein the plurality of DM-RS positions in the one or more REGs of the CORESET are located in less than all of the REGs of the CORESET.

* * * * *